US011137841B2

(12) United States Patent
Kinrot et al.

(10) Patent No.: US 11,137,841 B2
(45) Date of Patent: Oct. 5, 2021

(54) DEVICES AND METHODS FOR DETERMINING RELATIVE MOTION

(71) Applicant: OTM TECHNOLOGIES LTD., Ra'anana (IL)

(72) Inventors: Uri Kinrot, Hod HaSharon (IL); Opher Kinrot, Ra'anana (IL); Eli Billauer, Haifa (IL)

(73) Assignee: OTM TECHNOLOGIES LTD., Ra'anana (IL)

( * ) Notice: Subject to any disclaimer, the term of this patent is extended or adjusted under 35 U.S.C. 154(b) by 0 days.

(21) Appl. No.: 16/895,974

(22) Filed: Jun. 8, 2020

(65) Prior Publication Data

US 2020/0301522 A1 Sep. 24, 2020

Related U.S. Application Data

(63) Continuation of application No. 16/099,888, filed as application No. PCT/IB2017/000617 on May 9, 2017, now Pat. No. 10,719,144.

(Continued)

(51) Int. Cl.
*G06F 3/0354* (2013.01)
*G06F 3/03* (2006.01)
(Continued)

(52) U.S. Cl.
CPC ........ *G06F 3/03545* (2013.01); *G06F 3/0304* (2013.01); *G06F 3/0383* (2013.01); *G06F 3/04883* (2013.01)

(58) Field of Classification Search
CPC ............... G06F 3/03545; G06F 3/0304; G06F 3/03083; G06F 3/04883; G01B 9/02018;
(Continued)

(56) References Cited

U.S. PATENT DOCUMENTS 6,225,617 B1 5/2001 Daendliker
6,424,407 B1 7/2002 Kinrot
(Continued)

FOREIGN PATENT DOCUMENTS

WO   WO 01/42824 A1   6/2001
WO   WO 02/17222 A2   2/2002
WO   WO 2016/116810 A1   7/2016

OTHER PUBLICATIONS

International Search Report dated Aug. 9, 2017 in International Application No. PCT/IB2017/000617; 3 pages.

*Primary Examiner* — Rodney Amadiz
(74) *Attorney, Agent, or Firm* — Finnegan, Henderson, Farabow, Garrett & Dunner LLP

(57) ABSTRACT

Devices and methods are disclosed for determining relative motion. In one implementation, an interferometer is provided. The interferometer may include a body, a light source configured to project a coherent light to an opposing surface, a plurality of pairs of light detectors configured to convert reflections of the coherent light into photocurrents, and a processor. The processor may be configured to detect changes in the photocurrents, wherein a first change in the photocurrents, which occurs in response to a relative motion between the body and the opposing surface, represents a motion signal, and a second change in the photocurrents represents a noise signal. The processor may also determine the relative motion between the body and the opposing surface based on the first change in the photocurrents when a ratio between a power of the motion signal and a power of the noise signal is below about 10.

20 Claims, 29 Drawing Sheets

Related U.S. Application Data

(60) Provisional application No. 62/334,784, filed on May 11, 2016.

(51) Int. Cl.
    *G06F 3/038*     (2013.01)
    *G06F 3/0488*     (2013.01)

(58) Field of Classification Search
    CPC .......... G01D 5/35306; G01D 5/35309; G01D 5/35319; G01J 2003/4534; G01J 3/26; G01M 11/331; G02B 2006/12159; G02B 6/29353; G02F 1/3517
    See application file for complete search history.

(56) References Cited

U.S. PATENT DOCUMENTS

| | | |
|---|---|---|
| 6,592,039 B1 | 7/2003 | Smith |
| 6,741,335 B2 | 5/2004 | Kinrot et al. |
| 2002/0033803 A1 | 3/2002 | Holzrichter |
| 2002/0148655 A1* | 10/2002 | Cho .................... G06F 3/03545 178/18.09 |
| 2004/0227954 A1 | 11/2004 | Xie |
| 2005/0057492 A1 | 3/2005 | Bathiche |
| 2011/0255096 A1* | 10/2011 | Deck ........................ G01D 5/38 356/488 |
| 2012/0200901 A1* | 8/2012 | Dubois ................ G03H 1/0443 359/15 |

* cited by examiner

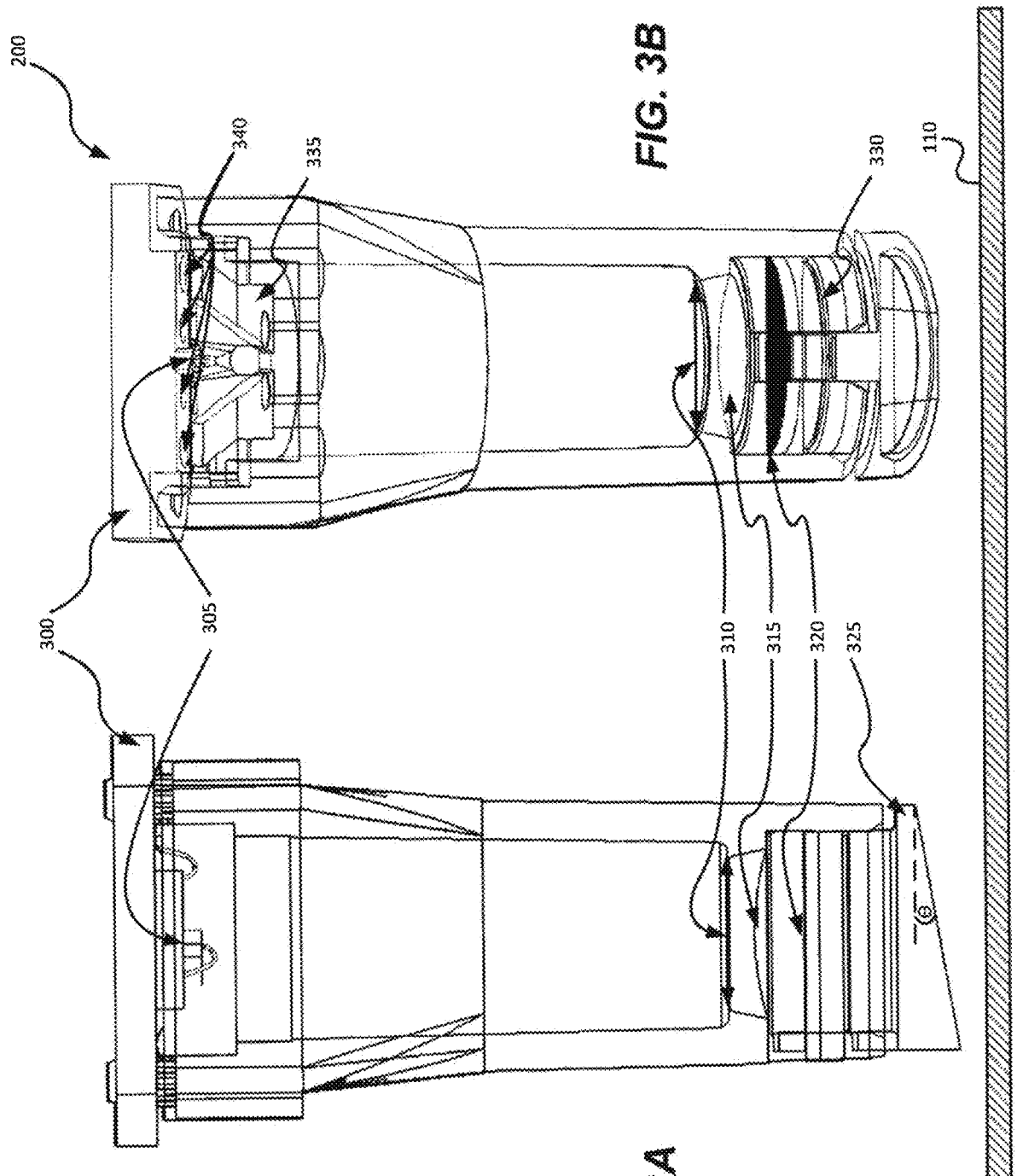

FIG. 29

DEVICES AND METHODS FOR DETERMINING RELATIVE MOTION

CROSS REFERENCE TO RELATED APPLICATIONS

This application is a continuation of application Ser. No. 16/099,888 filed Nov. 8, 2018, which is a is a national phase of International Application No. PCT/162017/000617, filed May 9, 2017, and claims the benefit of priority from U.S. Provisional Patent Application No. 62/334,784, filed on May 11, 2016. The entire contents of the above-referenced applications are expressly incorporated herein by reference

BACKGROUND

I. Technical Field

This disclosure generally relates to devices and methods for determining relative motion between an interferometer and an opposing surface.

II. Background Information

Smartphone and tablet use has grown rapidly and, in many aspects, these devices have replaced traditional computers (e.g., laptops and PCs). One advantage of traditional computers over smartphones and tablets is ease of text input. While smartphones and tablets have built-in touch keyboards in their touchscreen interfaces, the touch keyboards are significantly less convenient than traditional keyboards. The characters in these touch keyboards are positioned closely together and the user often needs to access different versions of the touch keyboard for special characters and numerals. In addition, to display the touch keyboard, the area displaying previously-entered text is reduced on the touchscreen interface. All these limitations make typing text using touch keyboards a laborious and potentially error prone task.

Understanding the limitations of a user's finger as an input device, various companies offer different types of surface-dependent styluses as an input device for smartphones and tablets. A common type of surface-dependent stylus is a capacitive-based stylus. The capacitive-based stylus works in the same way as the user's finger, it has a capacitive tip that distorts the screen's electrostatic field when touching it. While providing better accuracy than the user's finger, capacitive-based styluses are still far from being an ideal solution since capacitive-based styluses are limited to writing on the same area used for displaying previously-entered text.

Another type of surface-dependent styluses is a camera-based stylus. The camera-based stylus can electronically save copies of written notes when the camera-based stylus is paired with a coded surface. An example of a coded surface is a special paper that has dots that a camera can use to track movement of the stylus. In another example, a camera-based stylus may have a camera with a very high resolution that can track an LCD display output and identify individual pixels on the LCD display. Again, the camera-based stylus is limited to specific surfaces.

The disclosed devices and methods are directed to provide a new type of interferometer; one that may be integrated with a stylus to solve one or more problems outlined above.

SUMMARY

Consistent with a disclosed embodiment, an interferometer is provided. The interferometer may include a body, a light source located within the body and configured to project a coherent light (or a coherent light beam) to an opposing surface exterior to the body, and a plurality of light detectors located within the body and configured to convert reflections of the coherent light into photocurrents. The interferometer may also include at least one processor configured to detect changes in the photocurrents, wherein a first change in the photocurrents, which occurs in response to a relative motion between the body and the opposing surface, represents a motion signal, a second change in the photocurrents, which does not occur in response to a relative motion between the body and the opposing surface, represents a noise signal. The at least one processor may also be configured to determine relative motion between the body and the opposing surface based on the first change in the photocurrents when a ratio between a power of the motion signal and a power of the noise signal is below about 10.

Consistent with another disclosed embodiment, a method for determining relative motion between an interferometer and an opposing surface is provided. The method comprises: projecting a coherent light to an opposing surface exterior to a body of the interferometer; using a plurality of light detectors located within the body to convert reflections of the coherent light into photocurrents; detecting changes in the photocurrents, wherein a first change in the photocurrents, which occurs in response to a relative motion between the body and the opposing surface, represents a motion signal, and a second change in the photocurrents, which does not occur in response to a relative motion between the body and the opposing surface, represents a noise signal; and determining the relative motion between the body and the opposing surface based on the first change in the photocurrents when a ratio between a power of the motion signal and a power of the noise signal is below about 10.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3A is a side-view cross-section illustration of an example interferometer that may be used in the example input device shown in FIG. 1;

FIG. 3B is a perspective-view cross-section illustration of the example interferometer shown in FIG. 3A;

FIG. 8 is a schematic illustration that depicts coordinate systems of the example input device shown in FIG. 1 and the surface it moves relative to;

FIG. 29 is a chart illustrating multi-rate processing interleaving phases.

DETAILED DESCRIPTION

Figure 1:
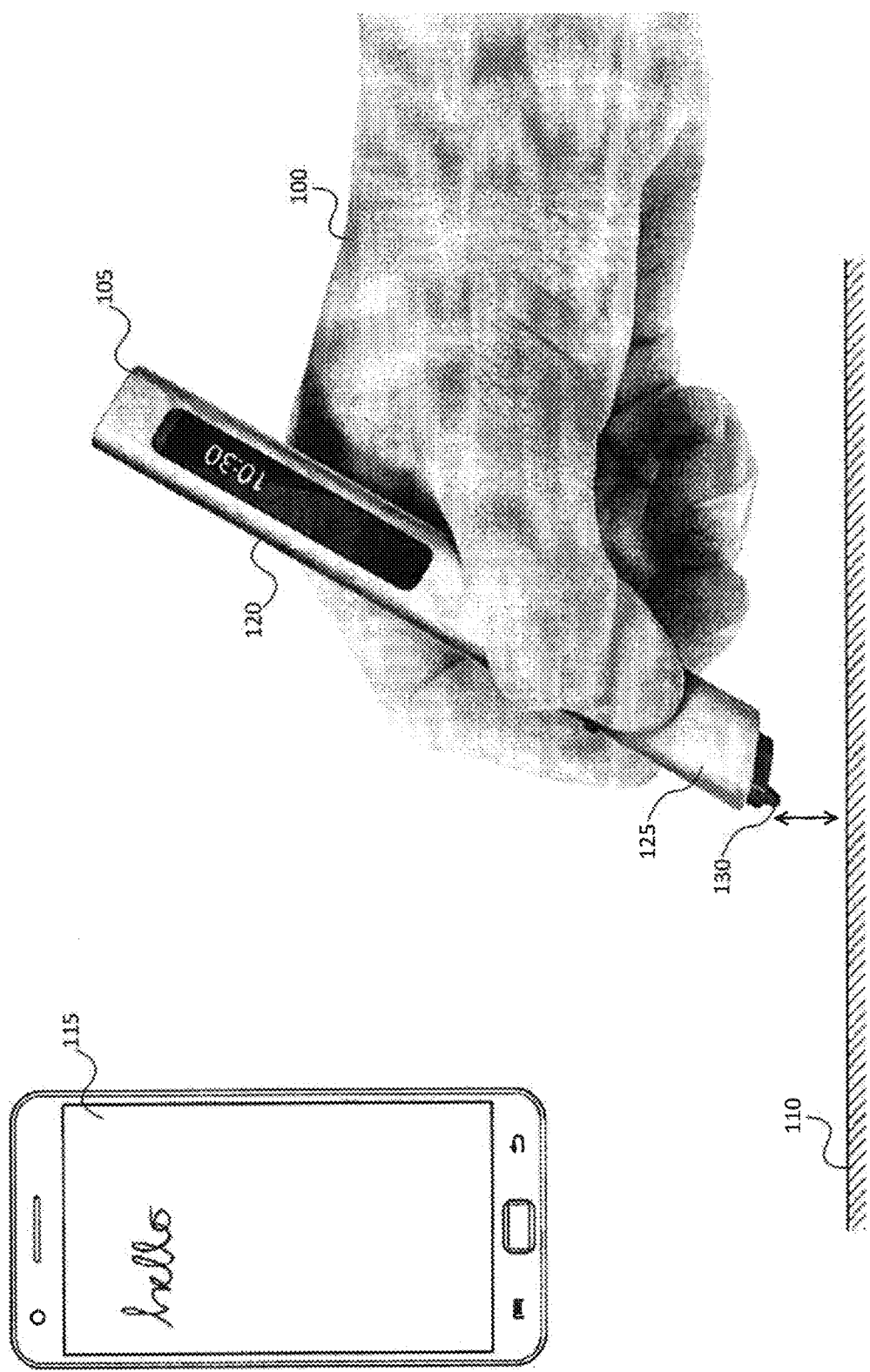
FIG. 1 is a schematic illustration of a user using an example input device to generate writing input for an associated smartphone.

The following detailed description refers to the accompanying drawings. Wherever possible, the same reference numbers are used in the drawings and the following description to refer to the same or similar parts. The disclosure is not limited to the described embodiments and examples. Instead, the proper scope is defined by the appended claims.

Disclosed embodiments may involve an interferometer. As used herein, the term "interferometer" broadly includes any device that utilizes the interference of beams of light to determine information. By way of example only, the interferometer may be included in an input device that may be formed in the shape of a pen or pencil, such as, a stylus. The cross section of the input device may be round, square, triangular, rectangular, oval, or any other shape. The width of the input device may be uniform or varied and may have a flattened appearance where a thickness is substantially greater or smaller than the width. The edges of an input device may be abrupt or may be curved. One example of an input device is a stylus including an interferometer according to the present disclosure, which is depicted in FIG. 1.

In some embodiments, the interferometer may include a plurality of light detectors within the body. The term "light detector" includes any device configured to measure properties (e.g., power, frequency) of electromagnetic waves and to generate an output relating to the measured properties. In one embodiment, the light detectors may be configured to convert reflections of the coherent light into photocurrents. Each light detector may have a similar construction or the light detectors may be of differing constructions that are electrically connected or disconnected from each other. For example, the light detectors may be of a different size or a different shape. When more than one light detector is used, the light detectors may be configured to operate independently or collaboratively. The light detectors may be coupled electrically, optically, mechanically or by other means that permit them to interact. As used herein, the term "measuring reflections of the coherent light" may include receiving at least part of the coherent light reflected from the opposing surface, and collecting data associated with the reflections of the coherent light. The collected data may be provided to a processor so that changes in the photocurrents can be detected by the processor.

In some embodiments, the interferometer may be used for generating input. For example, the interferometer may be included in an input device used for generating writing input. As used herein the term "generating writing input" broadly includes creating any type of input that could, for example, have been drawn with a pen on a piece of paper. Examples of types of writing input may include: text input (e.g., words, sentences), punctuation input (e.g., dots, commas), format input (e.g., underlines, highlights), emoji input (e.g., smiley, symbols), text editing input (e.g., delete text, copy-paste text), drawing input (e.g., free hand sketching), commands input, and more. However, unlike a pen, writing input as used herein may not necessarily leave any discernible marking on the surface on which the input device is moved. Rather, as discussed later in greater detail, movements of the input device may be sensed electronically, and data derived from those movements may constitute "writing input," despite the lack of markings on a writing surface. Alternatively, other embodiments may employ a stylus with a marking element.

In other embodiments, the interferometer may be used for generating input for controlling a paired device. For example, the interferometer may be included in a conveyer belt encoder. The paired device may include a portable computing device with a screen; for example, a smartwatch, a smartphone, a tablet, a television, a telephone, a personal computer, a laptop, a home entertainment device, virtual reality devices, augmented reality devices, mixed-reality devices or any other portable or non-portable electronic device for which there is a desire to exert control or transmit information. In other embodiments, the paired device may include a computing device without a screen; for example, a smart lamp, smart clothing, a smart appliance (e.g., refrigerator, freezer, washer, dryer, air conditioner, dishwasher, HVAC system (thermostat) or any other wearable or non-wearable electronic device for which there is a desire to exert control or transmit information). As used herein the term "controlling a paired device" broadly includes transmitting information to a device having a receiver which may cause the device to execute an action. Examples of the actions may include, controlling operational modes of the prior mentioned appliances, changing the brightness of a smart lamp, varying the temperature of a smart shirt, activating a screen of the paired device, opening a specific application in the paired device, causing text captured to be presented on the screen of the paired device, initiating a communication session, performing a text editing function, or any other action that alters in any way the mode, function, or display of the paired device.

An interferometer in accordance with embodiments of the disclosure may include or be associated with a body having a distal end. As used herein the term "body" broadly includes any casing or enclosure. In one example, the body may have an elongated portion that is capable of being grasped in the hand of a user, with a length substantially longer than a width or thickness. The body may be tubular such as may be consistent with the shape of a barrel of a pen. The elongated portion may have a cross-section that is round, triangular, square, rectangular, oval, or any other regular or irregular shape capable of being grasped. In some examples, the cross section may be flat, with a width substantially greater than a thickness. Such a structure may permit repeatable, consistent grasping during use. A distal end of the body may be arranged to be moved over one or more multiple surfaces to generate input. The distal end may share dimension with other portions of the housing or may, for example, include a tip or some other structure with lesser dimension than a typical dimension of the housing or the elongated portion.

Consistent with disclosed embodiments, the interferometer may include or be associated with a light source configured to project coherent light. The light source may include any device configured to emit coherent light. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1000 nm. Alternatively, the light source may include a laser diode configured to emit light at a wavelength between 800 nm and 900 nm.

As used herein the term "projecting coherent light" may include radiating a monochromatic wave having a well-defined phase relationship across its wavefront in a defined direction. The interferometer may be associated with optics for directing the coherent wave towards an opposing surface adjacent the distal end. The spot diameter of the projected light, when the distal end is spaced up to about 30 mm from the opposing surface, may be between 1.6 mm to 8 mm. In one embodiment, the projected light beam may be essentially collimated. In addition, the light projected from the light source may have a coherence length higher than 10 mm, higher than 25 mm, higher than 50 mm, or higher than 75 mm. In some embodiments, the light source may project coherent light on an opposing surface adjacent to the distal end. The term "surface" includes any type of tangible material, such as a surface made of wood, metal, ceramic, plastic, paper, fabric, glass, crystal, stone, or any other synthetic or natural material.

In disclosed embodiments, the interferometer may include or be associated with at least one sensor. The term "sensor" broadly includes any device, element, or system that responds to a physical condition and transmits a signal based on that condition. In one embodiment, the sensor may be used to determine the changing positions of the distal cod when the body of a device housing the interferometer is moved relative to the opposing surface. In one example, the at least one sensor may include an ultrasonic transducer that converts ultrasound waves to electrical signals. In this example, the sensor may generate high-frequency sound waves and evaluate the echo which is received back. By measuring the time interval between sending the signal and receiving the echo, the interferometer may determine the changing positions of the distal end. In another example, the at least one sensor may include a Force Sensitive Resistor (FSR) that changes its resistive value depending on how much force is applied by the body of the device housing the interferometer on the opposing surface.

In some embodiments, the interferometer may measure three non-collinear reflections of the coherent light. Two non-collinear reflections are reflections from a common plane but not along a same line of action. The two non-collinear reflections may be used to determine a two-dimensional position of the distal end. Similarly, three non-collinear reflections are reflections from a common space but not along a same plane of action. The three non-collinear reflections may be used to determine a three-dimensional position of the distal end.

Consistent with disclosed embodiments, the interferometer may include or communicate with at least one processor configured to determine relative motion between the body and the opposing surface based on detected changes in the photocurrents. The at least one processor may constitute any physical device having an electric circuit that performs a logic operation on input or inputs. For example, the at least one processor may include one or more integrated circuits, microchips, microcontrollers, microprocessors, all or part of a central processing unit (CPU), graphics processing unit (GPU), digital signal processor (DSP), field-programmable gate array (FPGA), application specific integrated circuit (ASIC) or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments such as in ASIC, the instructions are implemented in logic transistors. In some embodiments, the memory is configured to store information representative of the movements of the interferometer or the device housing the interferometer. In one example, the memory may store three-dimensional pattern information relating to a user's typical handwriting. In another example, the memory may store data indicative of the changing positions of the distal end when the interferometer is out of reach of the paired device.

In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by any other means that permit them to interact.

In some embodiments, the terms "determine relative motion between the body and the opposing surface" and "determining three dimensional positions of the distal end" may be used interchangeably and may refer to determining the coordinates (X, Y, and Z) of the distal end relative to a reference point in the surface. Alternatively, the terms "determine relative motion between the body and the opposing surface" and "determining three dimensional positions of the distal end" may refer to determining the incremental position change (dX, dY, and dZ) of the distal end relative to a reference point in the surface. For example, a three-dimensional movement of a device housing the interferometer may be considered as three movements along three orthogonal directions. The processor may apply one or more algorithms to estimate a phase shift by comparing the reflections from the surface and a reflection from a reference plane. Specifically, the phase of a portion of a beam whose phase is not changed may be compared with the phase of a portion that is changed, to determine the direction of motion along three dimensions. In other embodiments, the terms "determine relative motion between the body and the opposing surface" and "determining three dimensional positions of the distal end" may refer to collection of data indicative of the speed, direction, and/or location of the distal end from the surface; and transmitting the collected data to the paired device.

In some embodiments, the interferometer is included in an input device that may generate a series of strokes from data indicative of the changing positions relative to the opposing surface. As used herein, the term "generating series of strokes" may include participating in the process of causing indications of input device movement to be presented on a display of the paired device. In one example, the series of strokes may be used to generate writing. Specifically, the input device may transmit to the paired device a data stream of the X and Y coordinates of a cursor position. The data stream may be used by the paired device to present graphical lines on its display. The data stream may be transmitted substantially in real-time, such that any movement of the input device relative to the opposing surface will result in movement of the cursor in the display of the paired device. In addition, the data stream may include additional values, such as the force applied against the opposing surface and/or the location of the distal end along a Z axis. Alternatively, the input device may provide something less than all the information needed to present the writing input on a display. For example, the input device may transmit to the paired device raw data stream collected from the interferometer, thus enabling the paired device to determine the X and Y coordinates of a cursor or a tip position.

In another example, generating a series of strokes may be part of the process of controlling a paired device. For example, the data stream may be used to cause the device to execute an action. In addition, the data stream may include additional values, such as the force applied against the opposing surface. For example, an identified value of force above a predetermined threshold may represent a selection, similar to a mouse click action. Alternatively, the interferometer may provide something less than all the information needed to control the paired device. For example, the interferometer may transmit to the paired device raw data collected from light detectors.

FIG. 1 illustrates a user 100 holding a stylus 105 including an interferometer opposing a surface 110. Consistent with some embodiments, user 100 may move stylus 105 relative to surface 110 to generate writing input. The writing input may concurrently (or at a later time) be displayed on the display of a paired device 115. Consistent with other embodiments, user 100 may move stylus 105 relative to surface 110 to generate input for controlling paired device 115. Examples of commands may include: scroll up/down, select an item, open an application, execute a function, and more.

As shown in FIG. 1, user 100 holds stylus 105 similar to holding a regular pen. In some embodiments, stylus 105 may include a body 120 having a distal end 125 and a tip 130. Body 120 may be an elongated body with a flattened shape which facilitates repeatable grasping orientation by a user to generate input when a distal end 125 is moving relative to surface 110. As described in greater detail below, stylus 105 may generate input when tip 130 is in contact with surface 110, and even when tip 130 is out of contact with surface 110. By generating input when tip 130 is out of contact with surface 110, the present disclosure provides a solution that overcomes some of the drawbacks of surface-dependent styluses.

Figure 2A:
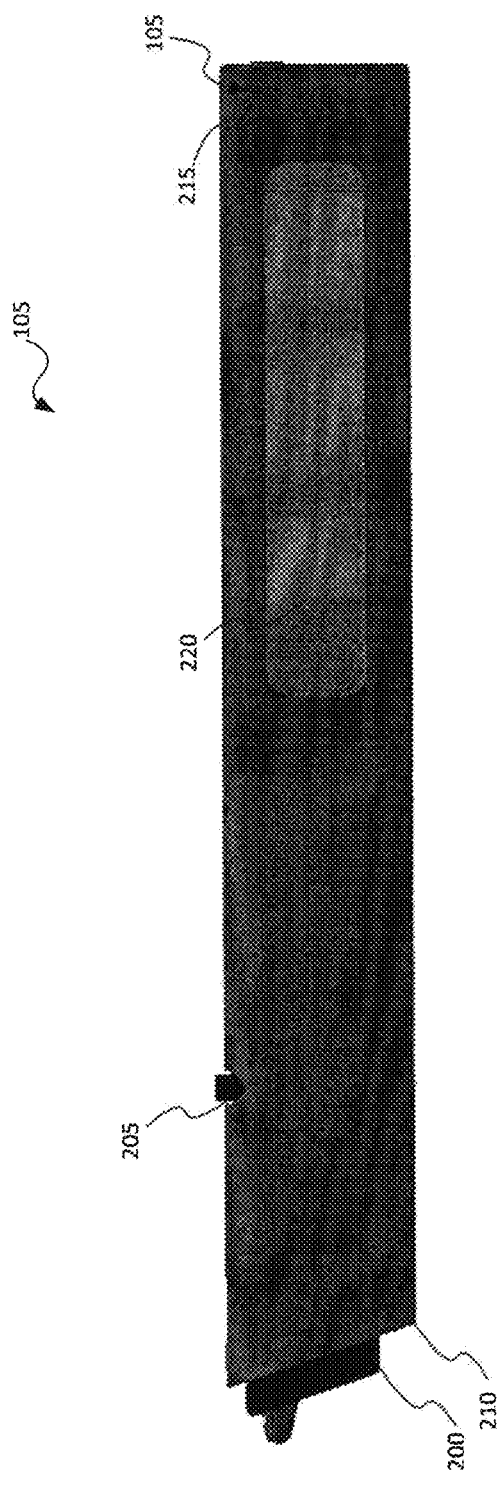
FIG. 2A is a schematic side-view illustration of the example input device shown in FIG. 1.
Figure 2B:
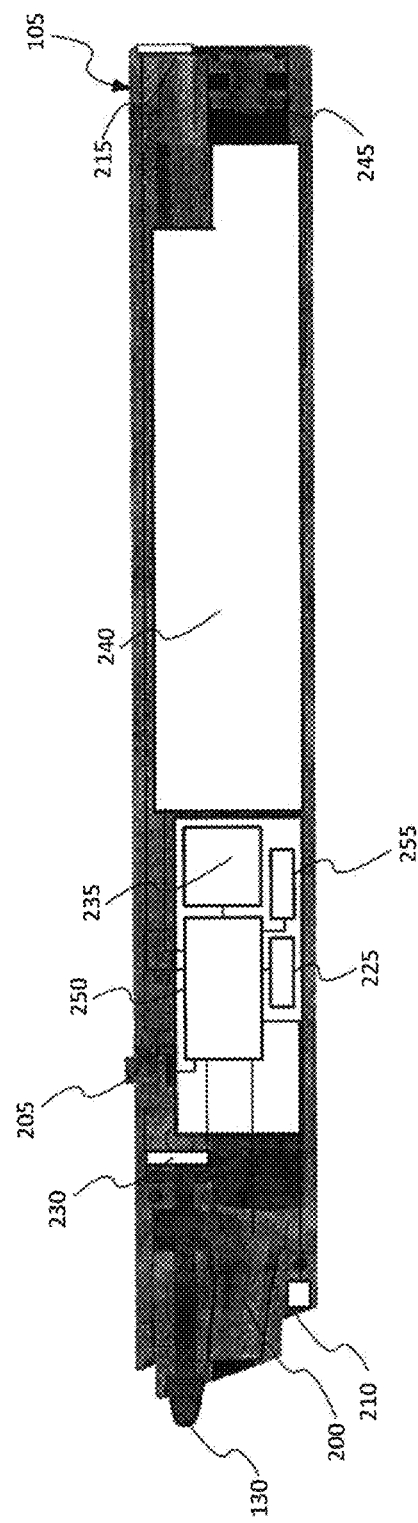
FIG. 2B is a schematic cross-section illustration of the components of the example input device shown in FIG. 1.

FIG. 2A and FIG. 2B depict various components of stylus 105. Specifically, FIG. 2A is a schematic side-view illustration of stylus 105, and FIG. 2B is a cross-section illustration of stylus 105. As shown in FIG. 2A, stylus 105 may include an interferometer 200, a button 205, a microphone 210, a speaker 215, and a screen 220. Additionally, as shown in FIG. 2B, stylus 105 may further include a transmitter 225, a force sensor 230, a movement sensor 235, a mobile power source 240, a charging connector 245, a processor 250, and a memory 255. The various components in stylus 105 may be coupled by one or more communication buses or signal lines. One skilled in the art will appreciate that the configuration of stylus 105 may have numerous variations and modifications.

As shown in FIG. 2B, stylus 105 may include button 205 for accepting an additional type of input from user 100. Button 205 may take the form of one or more press buttons, switches, touch sensitive controls, scroll wheels, and the like. In one example, button 205 may be an on/off switch. In another example, button 205 may be a scroll wheel that enables user 100 to select from among a plurality of paired devices 115. In some embodiments, button 205 may serve as a right mouse for menu control in applications running on paired device 115. Alternatively, when user 100 uses button 205 simultaneously with moving distal end 125 relative to surface 110, it can be used to send commands to processor 250.

In some embodiments, stylus 105 may also function as a head set. Thus, according to these embodiments stylus 105 may include microphone 210 located adjacent to a first distal end of stylus 105 and speaker 215 located adjacent to a second distal end of stylus 105. In one example, user 100 can use stylus 105 for accepting incoming calls from paired device 115 while continuing to enable generating writing input. In other embodiments, microphone 210 may be used for detecting spoken voice commands. Examples of voice commands may include: changing the color of the writing input, changing the size of the writing input, undo last action, and more.

Consistent with some embodiments, stylus 105 includes screen 220 that may or may not be a touchscreen. Screen 220 may be configured to present information and notifications from paired device 115. For example, screen 220 may present incoming text messages, calendar reminders, and incoming emails. User 100 can select to respond to the incoming notifications using paired device 115 or stylus 105. When using stylus 105, user 100 can respond to the incoming notifications either by touch control of screen 220, or by generating a writing input. For example, in response to a text message sent to paired device 115 and presented on screen 220, user 100 may use stylus 105 to scribble a smiley emoji. In other embodiments, screen 220 allows quick switching between various paired devices 115. For example, a representation of the currently paired device 115 may be shown on screen 220. User 100 can use stylus 105 to interact with a first paired device (e.g., smartphone) or switch to interaction with a second paired device (e.g., TV). The shift of control between the various paired devices 115 can happen by selecting an icon on screen 220 or by using button 205.

As shown in FIG. 2B, stylus 105 may include transmitter 225. The term "transmitter" as used herein refers to any device capable of wirelessly transmitting signals to paired device 115. In some embodiments of the disclosure, transmitter 225 may also be capable of wirelessly transmitting and receiving signals from paired device 115 (e.g., a transceiver). Alternatively, stylus 105 may include transmitter 225 and a separate receiver for communicating with paired device 115 using one or more of the following exemplary short range communication standards: Bluetooth, infrared, WiFi, LiFi, near field communication, ultraband, and Zigbee. Additionally, embodiments of the disclosure may involve transmitters, receivers, or transceivers that use other known or future wireless protocols.

Stylus 105 may include force sensor 230 and movement sensor 235. The term "force sensor" may include any type of device configured to measure a parameter representative of the force applied by tip 130 on surface 110. For example, force sensor 230 may include a Force Sensitive Resistor (FSR) that changes its resistive value depending on how much force is applied by tip 130 on surface 110. The read rate of force sensor 230 may be between 50 Hz and 2000 Hz. The term "movement sensor" may include any device configured to measure the linear and/or angular acceleration of stylus 105 in a number of predefined directions. In one example, movement sensor 235 may include a plurality of accelerometers and is configured to detect acceleration in at least two (e.g., three) non-collinear directions. In addition, movement sensor 235 may also include a plurality of gyroscopes, disposed substantially orthogonally with respect to each other, and configured to detect rotations in three directions. Force sensor 230 and movement sensor 235 may provide additional information that may be used to better determine the input from user 100.

In some embodiments, stylus 105 may be powered by power source 240. The term "power source" includes any device that can repeatedly store and dispense electric power, including but not limited to chemical batteries (e.g., a lead-acid battery, a lithium ion battery, a nickel-metal hydride battery, a nickel-cadmium battery). In some embodiments, the power source may be mobile, which means that stylus 105 can be easily carried by a hand (e.g., the total weight of power source 240 may be less than a pound). The mobility of the power source enables user 100 to use stylus 105 in a variety of situations. Consistent with some embodiments, user 100 may recharge power source 240 using charging connector 245. Charging connector 245 may be compatible with one or more charging cables and/or with an inductive charging station. In other embodiments, power source 240 may include one or more energy harvesting devices for converting ambient energy into electrical energy (e.g., human vibration units that convert the handwriting movement to electricity, etc.).

In some embodiments, stylus 105 may generate input from data indicative of the changing positions of distal end 125 relative to surface 110. Processor 250 may determine the data indicative of the changing positions of distal end 125 based on information measured by stylus 105. In one example, stylus 105 may include processor 250 within body 120. In other examples, stylus 105 may communicate directly or indirectly with processor 250 located remotely from stylus 105.

Figure 3D:
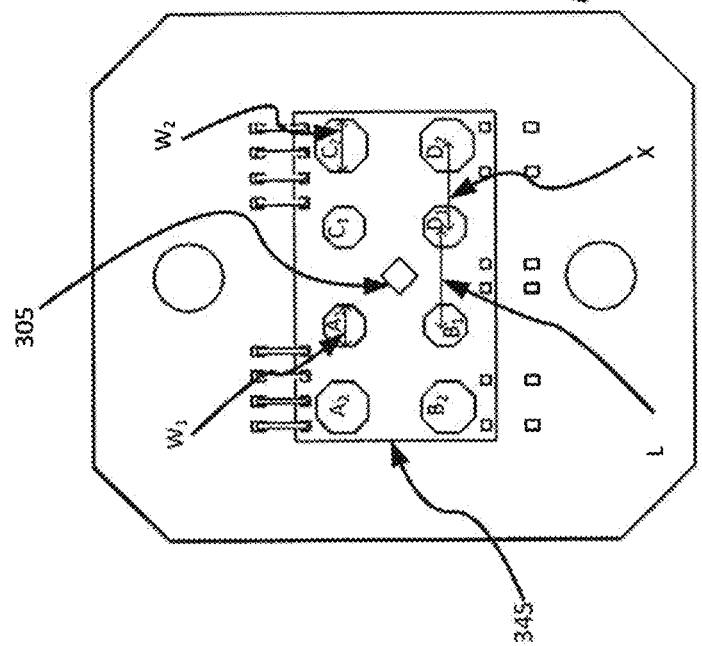
FIG. 3D is a top-view illustration of the base of the example interferometer shown in FIG. 3A.
Figure 3C:
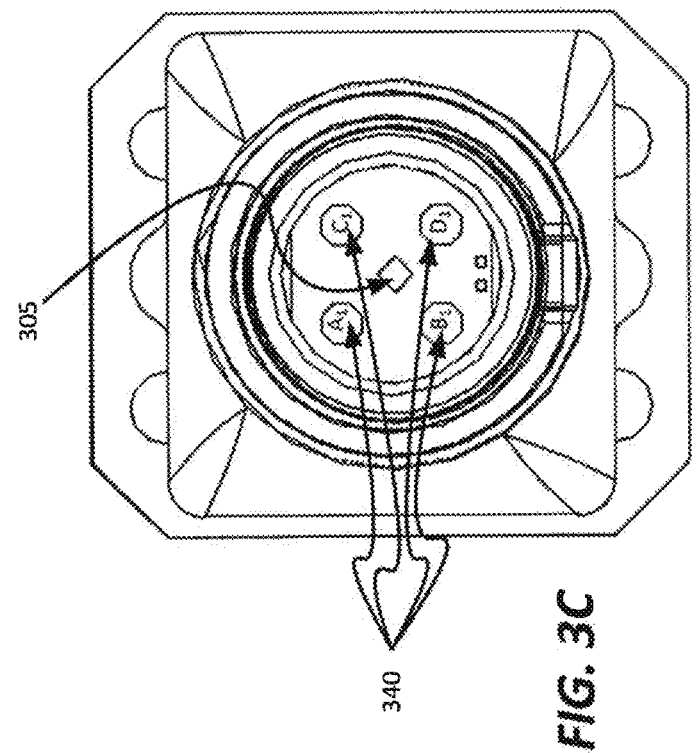
FIG. 3C is a top-view illustration of the example interferometer shown in FIG. 3A.
Figure 3E:
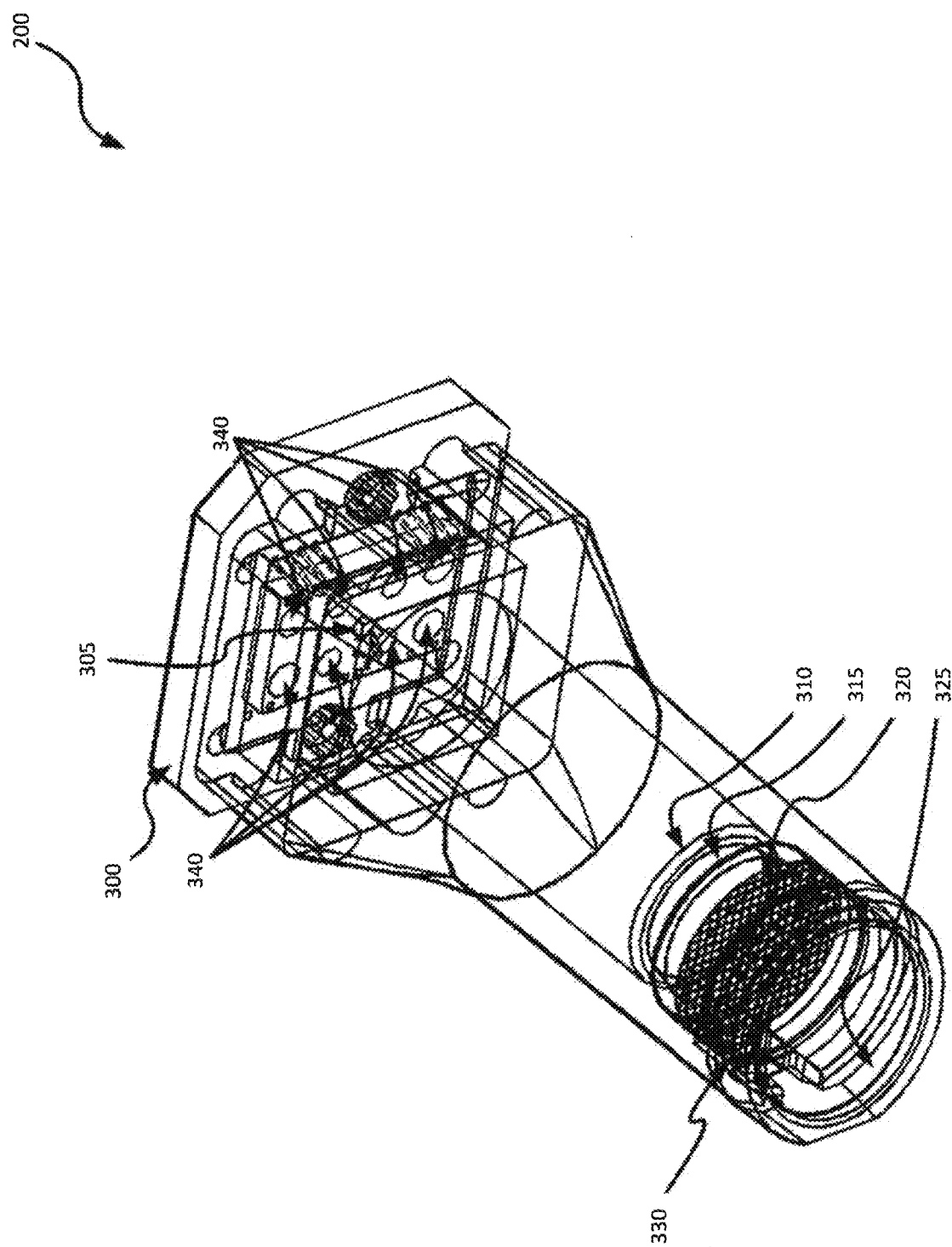
FIG. 3E is a perspective-view illustration of the example interferometer shown in FIG. 3A.

FIGS. 3A-3E depict various components of an example of interferometer 200 configured to detect phase (e.g., "Doppler") shift and perform accurate motion measurements. Specifically, FIG. 3A is a side-view cross-section illustration of the example interferometer; FIG. 3B is a perspective-view cross-section illustration of the example interferometer shown in FIG. 3A; FIG. 3C is a top-view illustration of the example interferometer shown in FIG. 3A; FIG. 3D is a top-view illustration of the base of the example interferometer shown in FIG. 3A; and FIG. 3E is a perspective-view illustration of the example interferometer shown in FIG. 3A. As shown in these figures, interferometer 200 may include a base 300, a light source 305, an optical aperture 310, a lens 315, a grating 320, an optical wedge 325, a circular polarizer 330, a beam splitter 335, and a plurality of light detectors 340.

In one implementation, stylus 105 may include interferometer 200 for measuring reflections of coherent light from surface 110 (hereinafter "surface-reflections") and reflections of coherent light from grating 320 (hereinafter "reference-reflections") to determine the changing positions of distal end 125. In other implementations, interferometer 200 may be integrated in other devices, such as a remote controller, and determine input based on relative motion determination. Additional details regarding the usage and characteristics of other example interferometers that are consistent with some embodiments of interferometer 200 are included in Applicant's U.S. Pat. No. 6,741,335 (the '335 patent), which is incorporated herein by reference in its entirety.

While a single configuration of interferometer 200 is illustrated in FIGS. 3A-3E, numerous variations and/or modifications may be made. Not all components are essential for the operation of interferometer 200, and some of the components may be located in a device housing for interferometer 200. Moreover, the components may be rearranged in a variety of configurations while providing the functionality of the disclosed embodiments. Therefore, the configuration of interferometer 200, as illustrated in FIGS. 3A-3E, should be considered as illustrative only.

FIGS. 3A and 3B are schematic cross-section illustrations of interferometer 200. These figures show the different components located along the projecting path through which projected light is configured to pass. One skilled in the art would recognize that interferometer 200 is configured to concurrently receive both the surface-reflections and the reference-reflections.

As shown in FIGS. 3A and 3B, interferometer 200 may include light source 305 mounted on base 300. Light source 305 is configured to project a coherent light via lens 315 towards surface 110. Consistent with one example of interferometer 200, light source 305 may be configured to project light having a coherence length of at least about 15 mm, and wavelength between about 650 nm and about 1000 nm. Light source 305 is configured to project the coherent light along a projecting path adjacent to tip 130. The term "projecting path" includes the space in which the coherent light travels. Light source 305 may or may not be physically included in interferometer 200. In some embodiments, light source 305 may include a vertical cavity laser. In addition, the operating power of light source 305, as measured outside the interferometer, may be between about 50 microwatts and about 1000 microwatts, between about 100 microwatts and 900 microwatts, or between about 400 microwatts and 800 microwatts.

In some embodiments, interferometer 200 may include optical aperture 310 located in the projecting path between light source 305 and lens 315. In other embodiments, optical aperture 310 may be located in other places along the projecting path. For example, optical aperture 310 may be located between lens 315 and optical wedge 325. The term "optical aperture" includes any hole or opening through which coherent light from light source 305 and/or reflections of the coherent light may pass. Optical aperture 310 may be used to limit the amount of reflections arriving at the plurality of light detectors 340. In some embodiments, optical aperture 310 may have an opening size of between about 1.6 mm and about 8 mm. In some embodiments, the value of the opening size of optical aperture 310 may be fixed. For example, optical aperture 310 may have a fixed opening size of about 2.8 mm, about 4 mm, about 5.6 mm, or about 8 mm. In other embodiments, the value of the opening size of optical aperture 310 may be variable and processor 250 may determine a temporary value of the opening size. For example, optical aperture 310 may have a variable opening size of between about 1.6 mm and about 2.8 mm, between about 2 mm and about 5.6 mm, or between about 2.8 mm and about 8 mm.

In some embodiments, as shown in FIGS. 3A and 3B, lens 315 may be located in the projecting path between optical aperture 310 and grating 320. In other embodiments, lens 315 may be located in other places along the projecting path. For example, lens 315 may be located between light source 305 and optical aperture 310. Lens 315 is configured to direct the coherent light towards opposing surface 110. In some embodiments, lens 315 is configured to collimate coherent light projected from light source 305, such that all the projected light may be substantially aligned in a specific direction. Consequently, the coherent light that leaves lens 315 may have a defined cross section. For example, the cross section of the coherent light that leaves lens 315 may have any value between 1.6 mm and 8 mm. In addition, lens 315 may have a focal length between about 2 mm and about 25 mm. For example, lens 315 may have a focal length of about 9 mm, about 10 mm, about 11 mm, or about 12 mm. In addition, lens 315 is configured to focus light reflected from opposing surface 110 (surface-reflections) and from grating 320 (reference-reflections) and to direct the reflections toward beam splitter 335.

In some embodiments, interferometer 200 may include grating 320 located in the projecting path between lens 315 and optical wedge 325. The term "grating" includes any element with a well-defined repetitive surface pattern. In some embodiments, the grating may be a partially reflecting grating, configured to pass at least a portion of light and to diffractively reflect at least another portion of light. The grating can be made to reflect multiple beams and transmit effectively single beam. For example, grating 320 may reflect at least two non-collinear beams or at least three non-collinear beams. As discussed above, the non-collinear beams reflected from grating 320 may be used, together with the surface-reflections, in determining the relative motion of distal end 125. In some embodiments, grating 320 may be a binary phase grating that includes a two-level pattern where the distance between the two levels is smaller than a wavelength of the coherent light projected by light source 305. For example, grating 320 may have a square grooves pattern with a depth of about one quarter of the wavelength of the light projected by light source 305. The square grooves pattern is shown in FIG. 3E, which provides a better illustration of grating 320. This architecture may allow accurate motion measurement in more than one dimension using a single laser source (e.g., light source 305), and using essentially a single illumination beam to illuminate surface 110.

The specific configuration of the interferometer illustrated in FIGS. 3A-3E includes an optical wedge 325 located in the projecting path. The term "optical wedge" includes any element made from transparent or translucent material and having two opposing non-parallel surfaces. For example, as shown in FIG. 3A, optical wedge 325 may have a profile shaped as a right-angled trapezoid, where angle θ represents the slope of optical wedge 325. In some cases, angle θ of optical wedge 325 may be between about 4° and about 35°, between about 7° and about 15°, or about 10°. Consistent with this specific configuration, optical wedge 325 may be angled to suppress unwanted reflections from impinging on light source 305 and/or from impinging on the plurality of light detectors 340. Specifically, optical wedge 325 may minimize reflections impinging on light source 305 that may cause unwanted optical fluctuations or "self-modulation" of light source 305. In one example, the unwanted reflections may include reflections resulting from the coherent light hitting optical wedge 325 itself. When the angle θ of optical wedge 325 is between about 7° and about 15° the amount of unwanted reflections impinging on the plurality of light detectors 340 may be lower by more than 70% or more than 90%, compared to a scenario when the angle θ of optical wedge 325 is about 0°.

In some embodiments, the projected light and the surface-reflections may enter circular polarizer 330 located between grating 320 and optical wedge 325. The term "retarder" includes any optical device configured to produce a phase shift between light waves having different orientation of linear polarization passing through it. For example, when circular polarizer 330 may include a combination of polarizer and quarter-wave retarder, beams polarized along the slow axis may be retarded by a quarter-wave relative to beams polarized along the fast axis. When the surface-reflections enter a beam splitter, such as beam splitter 335, at least two non-collinear beams or at least three non-collinear beams are split to at least four beams or at least six beams, respectively, reaching the plurality of light detectors 340.

As shown in FIG. 3B, interferometer 200 may also include beam splitter 335. The term "beam splitter" refers to any optical device capable of splitting a beam of light into two or more beams. Beam splitter 335 may also be configured to direct the two or more beams in different directions. For example, beam splitter 335 may be configured to split the surface-reflections and the reference-reflections and to direct the plurality of separated beams towards the plurality of light detectors 340. Consistent with the present disclosure, beam splitter 335 may be a polarization beam splitter. In one embodiment, beam splitter 335 is configured to split each of the at least three non-collinear beams reflected from grating 320 to two spatially separated beams, and to direct at least six separated beams towards at least six of light detectors 340. In another embodiment, beam splitter 335 is configured to split coherent light reflected from surface 110 and to direct each of eight portions of the reflected light towards a different light detector 340.

The plurality of light detectors 340, examples of which are shown in FIG. 3B, may be configured to measure light reflected from opposing surface 110 and grating 320. The optical interference between the surface-reflections and the reference-reflections may be used to determine changing positions of interferometer 200 relative to surface 110. For example, a detected phase shift between the surface-reflections and the reference-reflections may indicate movement. As described in greater detail below with reference to FIGS. 3C and 3D, the plurality of light detectors 340 may be arranged in a substantially coplanar arrangement peripheral to light source 305. For example, the plurality of light detectors 340 and light source 305 may be mounted on a common substrate, such as base 300. The term "mounted on a common substrate" includes situations in which the plurality of light detectors 340 and light source 305 are mounted directly on base 300 with no other intervening elements, as well as situations in which there is one or more intervening elements between the plurality of light detectors 340 or light source 305 and base 300. In one example, light source 305 is located on top of the substrate including the plurality of light detectors 340. In some embodiments, interferometer 200 may include at least three light detectors 340, at least four light detectors 340, at least six light detectors 340, or at least eight light detectors 340, arranged in different configurations. For example, the plurality of light detectors 340 may include four pairs of light detectors 340 arranged in a rectangle.

FIGS. 3C and 3D are schematic top-view illustrations of the example interferometer shown in FIGS. 3A and 3B. FIG. 3C depicts the plurality of light detectors 340 and the light source 305 as seen through optical aperture 310. FIG. 3D depicts the plurality of light detectors 340 and the light source 305 as they are mounted on base 300. Further details regarding the output of plurality of light detectors 340 are provided below with reference to FIGS. 10-12.

The specific configuration of the interferometer illustrated in FIGS. 3A-3E, includes four pairs of light detectors ($A_1$-$A_2$, $B_1$-$B_2$, $C_1$-$C_2$, and $D_1$-$D_2$). Each pair of light detectors has an inner pair member ($A_1$, $B_1$, $C_1$, and $D_1$) and an outer pair member ($A_2$, $B_2$, $C_2$, and $D_2$). In one embodiment, a beam that reaches beam splitter 335 is being split to two sub-beams and being directed to one of the four pairs of light detectors. In this configuration, the first sub-beam is being directed to the inner pair member and the second sub-beam is being directed to the outer pair member. In one embodiment, beam splitter 335 is a polarization beam splitter and the two sub beams each have orthogonal linear polarizations. For example, the sub beams directed towards the inner detectors may have vertical polarization and the sub beams directed towards the outer detectors may have horizontal polarization. As shown in FIG. 3D, the light detectors pairs may be arranged in a rectangle 345 and light source 305 located substantially in the center of rectangle 345. In an alternative configuration, interferometer 200 does not include optical wedge 325 and the plurality of light detectors 340 may be arranged in a different manner. In this alternative configuration (not shown) if the plurality of light detectors 340 may still be arranged in a rectangle, the light source may be located in a position offset from the center of the rectangle.

As shown in FIG. 3D, each light detector 340 may have a typical width, for example, an inner pair member has a typical width of $W_1$ and outer pair member has a typical width of $W_2$. The typical width may be a diameter of a light detector 340 having a substantially round shape (e.g., a hexagonal or an octagonal). In one embodiment, the distance between the centers of two adjacent inner pair members (i.e., $A_1$-$B_1$, $B_1$-$D_1$, $D_1$-$C_1$, and $C_1$-$A_1$) may be the same. Thus, the arrangement of the inner pair members may be represented by a square whose four sides have a length of L. Consistent with embodiments of the present disclosure, the ratio between typical width $W_1$ and length L may be between 0.15 and 0.85. In some configurations, the ratio may be greater than about 0.15, greater than about 0.2, greater than about 0.3, or greater than about 0.7. Additionally, the ratio may be less than about 0.85, less than about 0.7, or less than about 0.5. For example, the ratio between typical width $W_1$ and length L may be:

$$\frac{W_1}{L} = 0.6.$$

In some embodiments, the ratio between typical width $W_1$ and length L enables the plurality of pairs of light detectors 340 to measure at least three non-collinear reflections of the coherent light taking into account optional tolerances in the construction and assembly of the optics of interferometer 200.

In one embodiment, the inner pair member of a pair of light detectors 340 may be spaced from the outer pair member by a distance of X. Similarly, distance X may be the distance between centers of a pair of light detectors 340 (e.g., $A_1$-$A_2$). In this embodiment, the ratio between the typical width of the outer pair member $W_2$ and typical distance X is smaller than about 0.8, smaller than about 0.7. For example, the ratio between typical width $W_2$ and distance X may be:

$$\frac{W_2}{X} = 0.6.$$

When the ratio $$\frac{W_2}{X}$$

is smaller than about 0.8, there is more likelihood that the plurality of light detectors 340 will measure at least three non-collinear reflections of the coherent light while keeping the capacitance of each of the detectors in interferometer 200 below 15 pF.

FIG. 3E is a schematic illustration of interferometer 200 from another viewpoint. The viewpoint shown in FIG. 3E is from a side orientation of interferometer 200 and shows a perspective-view of the specific configuration of the interferometer shown in FIG. 3A. In this viewpoint, the square grooves pattern of grating 320 is shown.

As is evident from the foregoing, stylus 105 may be used for a wide range of functionalities.

Some embodiments consistent with the present disclosure provide a stylus configured to detect on-surface and/or above-surface motions. In most commonly used languages, handwriting involves on-surface and above-surface motions. When using a surface-dependent stylus on coded surfaces or on touch surfaces, the above-surface motions may be less important. The positions of the distal end of surface-dependent stylus (e.g., after the tip is lifted and returned to a different position) are determined using the surfaces. However, when entering text from a non-coded surface, the capability of stylus 105 to detect on-surface and above-surface motions becomes more advantageous. That is because the surface-dependent styluses cannot rely on information from the non-coded surface to determine the position of the tip after an above-surface motion. The term "non-coded surface" broadly includes any type of tangible material without a predefined pattern. The predefined pattern may include any regularly or irregularly spaced visual indicators forming areas on a surface that may be used as a reference for locating the position of a stylus.

Embodiments consistent with the present disclosure provide devices and methods for generating input by determining three dimensional positions of a stylus. In accordance with a disclosed embodiment, a stylus is provided for generating writing input, the stylus may include an elongated body having a distal end, and a light source configured to project coherent light on an opposing surface adjacent the distal end. The stylus may further include an interferometer configured to measure first reflections of the coherent light from the opposing surface while the distal end moves in contact with the opposing surface, and to measure second reflections of the coherent light from the opposing surface while the distal end moves above the opposing surface and out of contact with the opposing surface. The stylus also includes at least one processor configured to receive input from the interferometer and to enable determining three dimensional positions of the distal end based on the first reflections and the second reflections.

In some embodiments, the stylus includes an interferometer comprising at least three pairs of light detectors, each pair configured to detect a differing reflection of the coherent light in non-collinear spatial directions. The at least three pairs of light detectors are arranged in a substantially co-planar relationship with respect to each other. The at least one processor is further configured to determine from the output of the at least three pairs of light detectors the three dimensional positions. The distal end includes a tip configured to contact the opposing surface and to maintain a space between the elongated body and the opposing surface, and wherein the light source includes a laser diode configured to project the coherent light on the opposing surface adjacent to the tip. The stylus further includes an optical aperture through which the coherent light, the first reflections, and the second reflections are configured to pass, and wherein the optical aperture has an opening size of between about 1.6 mm and about 8 mm. The tip is configured to engage the opposing surface without substantially leaving marks on the opposing surface. The stylus further includes a transmitter configured to transmit the writing input to a paired device and to thereby cause a display of the writing input on the paired device. The stylus further includes a force sensor configured to detect when the distal end is in contact with the opposing surface. The at least one processor is further configured to distinguish between measurements of the first reflections and measurements of the second reflections. The at least one processor is configured to determine the three dimensional positions when the distal end is spaced about 10 mm from the opposing surface. The at least one processor is configured to determine the three dimensional positions when the distal end is spaced between 20 mm and 30 mm from the opposing surface. The light source is configured to project coherent light having a coherence length of at least about 50 mm. The light source is configured to project coherent light having a wavelength between about 650 nm and about 1000 nm. The optical power of the light source is between about 50 microwatts and about 1000 microwatts. The light source is configured to project substantially collimated coherent light towards the opposing surface.

Figure 4:
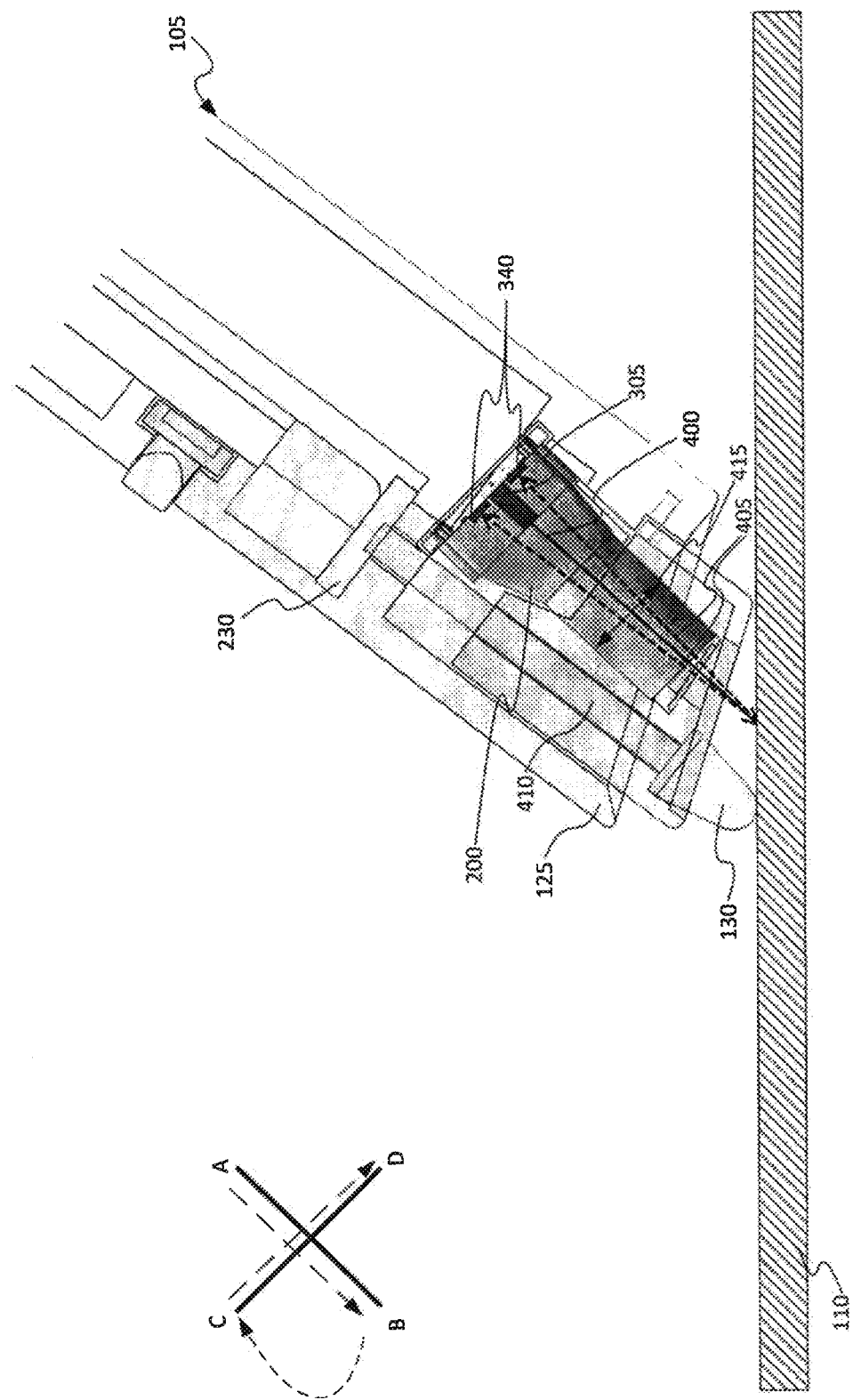
FIG. 4 is another cross-section view of the example input device shown in FIG. 1 that depicts the placement of an example interferometer.

FIG. 4 is a cross-section view of stylus 105 that depicts the relative placement of interferometer 200 in body 120. Interferometer 200 may include a light source 305 for projecting coherent light 400 and a plurality of light detectors 340 for measuring reflections 405 of coherent light 400 from surface 110. In one embodiment, the plurality of light detectors 340 may be arranged in a substantially co-planar relationship with respect to each other. A person skilled in the art would recognize that the example depicted in FIG. 4 is simplified in several aspects. In one aspect, interferometer 200 may include optical equipment that may change the optical path of reflections 405 and/or may split reflections 405. In another aspect, interferometer 200 may include more than two light detectors 340. For example, interferometer 200 may include at least three pairs of light detectors 340 each pair configured to detect a differing reflection of the coherent light in non-collinear spatial directions. The at least three pairs of light detectors 340 may measure three non-collinear reflections 405 of coherent light 400 from surface 110.

Also, as shown in FIG. 4, stylus 105 may include force sensor 230 configured to detect when distal end 125 is in contact with surface 110. Processor 250 may use information from force sensor 230 to distinguish between measurements of first reflections 405 and measurements of second reflections 405. Force sensor 230 may be connected to a rod 410 extending to tip 130. In some embodiments, force sensor 230 may provide feedback when tip 130 is in contact with surface 110, and processor 250 may determine the stylus movements based on a combination of feedback from the interferometer 200 and force sensor 230. In other embodiments, force sensor 230 may provide a value representing the force applied against surface 110, and processor 250 may change the formatting of the writing input based on the value provided. For example, processor 250 may change the thickness of the writing input based on the value provided.

In addition, stylus 105 may include an optical aperture 415 through which coherent light 400, first reflections 405, and second reflections 405 are configured to pass. Optical aperture 415 may be part of interferometer 200 and may be used to limit the amount of reflections 405 arriving at the plurality of light detectors 340. In some embodiments, optical aperture 415 may have an opening size of between about 1.6 mm and about 8 mm. For example, optical aperture 415 may have an opening size of about 3 mm, about 4 mm, about 5 mm, or about 6 mm.

In one embodiment consistent with the present disclosure, stylus 105 may detect two types of movements, a first on-surface motion and a second above-surface motion. FIG. 4 illustrates the first on-surface motion, where tip 130 is in contact with surface 110. In this type of movement, tip 130 may be configured to maintain a space between distal end 125 and surface 110, such that light source 305 can project coherent light 400 on surface 110 adjacent tip 130. Interferometer 200 may be configured to measure first reflections 405 of coherent light 400 from surface 110 while distal end 125 moves in contact with surface 110. In the first on-surface motion, tip 130 is configured to engage surface 110 without substantially leaving marks on surface 110. In the second above-surface motion, tip 130 may be out of contact with surface 110. In this type of movement, interferometer 200 may measure second reflections 405 of coherent light 400 from surface 110 even when distal end 125 may be spaced between 1 mm and 50 mm from surface 110. Processor 250 may be configured to distinguish between the first on-surface motion and the second above-surface motion, based on input from interferometer 200 and/or input from force sensor 230. Processor 250 may also determine three dimensional positions of distal end 125 based on the first and second reflections 405.

FIG. 4 also illustrates a sequence of movements typically used for drawing the English letter "X". The first movement is from point A to point B when stylus 105 moves diagonally left-downward. The second movement is from point B to point C when stylus 105 moves upward and above surface 110. The third movement is from point C to point D when stylus 105 moves diagonally right-downward. One way of understanding the operation of stylus 105 is to consider it as a writing input device that uses virtual ink. While stylus 105 may be configured to engage surface 110 without substantially leaving marks on surface 110. Movements of stylus 105 relative to surface 110 may cause presentation of strokes on the display of paired device 115. For example, the first movement from point A to point B may generate presentation of a virtual ink of the symbol "/" on the display of paired device 115. The second movement from point B to point C may generate a presentation of virtual ink of the symbol "(" or may not cause any presentation. The third movement is from point C to point D may generate presentation of a virtual ink of the symbol "\". Applying these three distinct movements sequentially may cause the presentation of the English letter "X" on the display of paired device 115. Alternatively, applying the three distinct movements sequentially may cause the presentation of the Greek letter "α" on the display of paired device 115.

Figure 5:
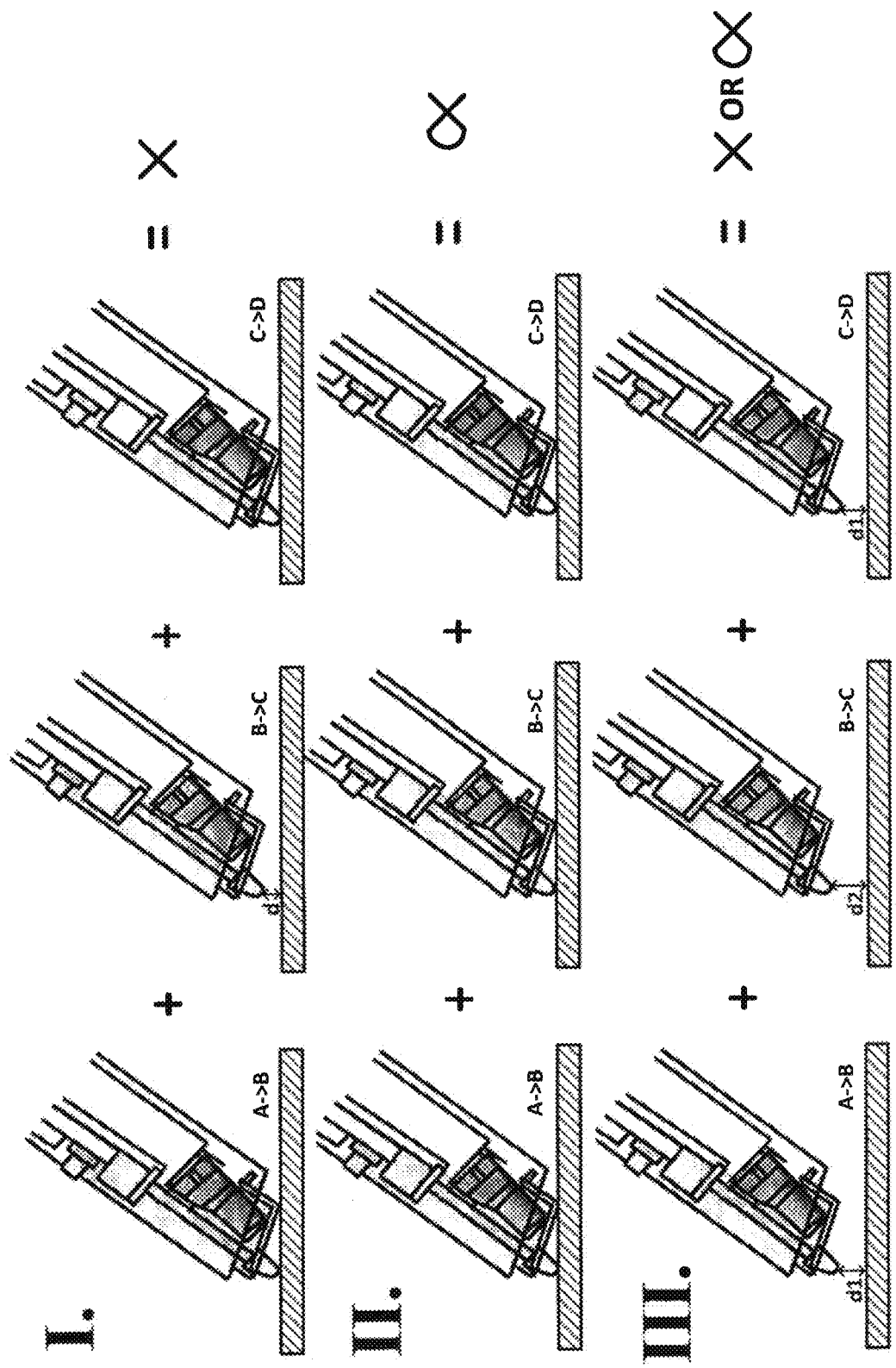
FIG. 5 is a schematic illustration that depicts three situations of generating writing input based on on-surface motions and above-surface motions.

FIG. 5 illustrates three situations of applying the sequence of movements described above. Each of these situations may result in a different output based on the capability of stylus 105 to detect on-surface and above-surface motions. The first situation depicts a sequence of movements that causes the presentation of the English letter "X". The second situation depicts a sequence of movements that causes the presentation of the Greek letter "α". The third situation depicts a sequence of movements that may cause the presentation of the English letter "X" or the presentation of the Greek letter "α".

In the first situation, the first movement, from point A to point B, is when stylus 105 moves diagonally left-downward while being in contact with surface 110. The second movement, from point B to point C, is when stylus 105 moves upward while being spaced up a distance d from surface 110. The third movement, from point C to point D, is when stylus 105 moves diagonally right-downward while being in contact with surface 110. Applying these three distinct movements sequentially may cause the presentation of the English letter "X" on the display of paired device 115. The first situation demonstrates certain capabilities of stylus 105. During the second movement, processor 250 may distinguish that this is a second above-surface motion and avoid from generating virtual ink along the path from point B to point C. In addition, processor 250 may track the changing positions of distal end 125 during the second movement based on input from interferometer 200. Tracking the changing positions of distal end 125 during the second movement is used to locate the starting point of the third movement at point C. If one were to use the same sequence of movements using a typical optical mouse, the result would be: <, because a typical optical mouse cannot track the movement of the mouse when the mouse is out of contact with a surface, there will be no information on the relation between the two motion sequences and the third movement would start from point B.

In the second situation, the first movement, from point A to point B, is when stylus 105 moves diagonally left-downward while being in contact with surface 110. The second movement, from point B to point C, is when stylus 105 moves upward while being in contact with surface 110. The third movement, from point C to point D, is when stylus 105 moves diagonally right-downward while being in contact with surface 110. Applying these three distinct movements sequentially may cause the presentation of the Greek letter "α" on the display of paired device 115.

In the third situation, the first movement, from point A to point B, is when stylus 105 moves diagonally left-downward while being spaced up a distance d1 from surface 110. The second movement, from point B to point C, is when stylus 105 moves upward while being spaced up a distance d2 from surface 110. The third movement, from point C to point D, is when stylus 105 moves diagonally right-downward while being spaced up a distance d1 from surface 110. Applying these three distinct movements sequentially may cause the presentation of the English letter "X" or the Greek letter "α" on the display of paired device 115. According to some embodiments, stylus 105 can not only distinguish between on-surface and above-surface motions, but can continuously track the changing positions of distal end 125 when it moves out of contact with surface 110. Therefore, processor 250 can determine when distance d2 is substantially larger than distance d1, and cause the presentation of the English letter "X". Additionally, processor 250 can determine when distance d2 is substantially equal to distance d1 and cause the presentation of the Greek letter "α".

According embodiments associated with the third situation, processor 250 may be able to determine one or more writing inputs from changing positions of distal end 125 relative to surface 110 when tip 130 is not touching surface 110 at all. In one example, processor 250 may be able to generate text input associated with a complete sentence while distal end 125 moves above surface 110 and out of contact with surface 110. The sequence of movements that generated the text input may include strokes that cause presentation of virtual ink on the display of paired device 115, and strokes that do no cause presentation of virtual ink on the display of paired device 115.

Figure 6:
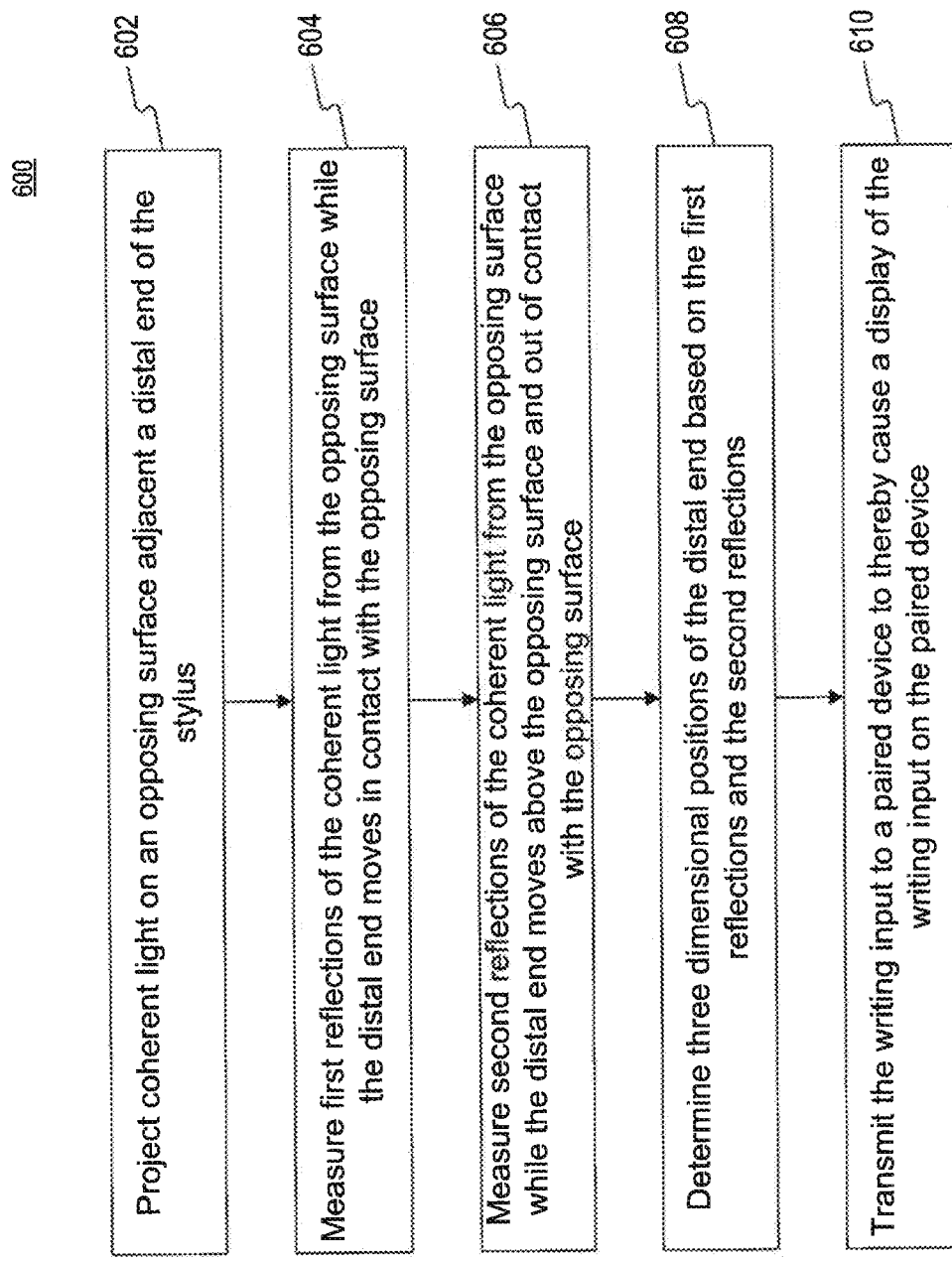
FIG. 6 is a flow diagram of an exemplary process for generating writing input using a input device, consistent with disclosed embodiments.

FIG. 6 is a flowchart showing an exemplary process 600 for generating writing input using stylus 105, consistent with disclosed embodiments. At step 602, light source 305 may project coherent light 400 on surface 110 adjacent distal end 125 of stylus 105. In some embodiments, light source 305 is configured to project substantially collimated coherent light 400 towards surface 110. In addition, light source 305 may be configured to project coherent light 400 having a wavelength between about 700 nm and about 900 nm and having a coherence length of at least about 15 mm. The coherence length refers to the propagation distance over which a coherent wave maintains a predetermined degree of coherence. In some examples, light source 305 is configured to project coherent light 400 having a coherence length of about 25 mm, about 50 mm, about 75 mm, about 100 mm, about 500 mm, or more than 1000 mm.

At step 604, interferometer 200 may measure first reflections 405 of coherent light 400 from surface 110 while distal end 125 moves in contact with surface 110. In some embodiments, interferometer 200 includes at least three pairs of light detectors 340, wherein each pair is configured to detect a differing reflection of coherent light 400 in non-collinear spatial directions. Each of the at least three pairs of light detectors 340 may form a polarization sensitive quadrature signal detector. Moreover, the at least three pairs of light detectors 340 may be arranged in a substantially co-planar relationship with respect to each other.

At step 606, interferometer 200 may measure second reflections 405 of coherent light 400 from surface 110 while distal end 125 moves above surface 110 and out of contact with surface 110. As used herein, the term "above the surface" broadly includes any spacing from surface 110 (e.g., if surface 110 is positioned vertically then distal end 125 may move at a certain horizontal distance from it). In some embodiments, such as illustrated in FIG. 1, processor 250 may determine the three dimensional positions of distal end 125 when tip 130 is spaced a distance D from surface 110. In some instances, D may have a value of between 0 and 30 mm, for example, D is about 10 mm, about 20 mm, or about 30 mm. A person skilled in the art would recognize that measuring the motion of an input device housing interferometer 200 when the input device is moved above surface 110 may be more challenging because the signal-to-noise ratio (SNR) will decrease as the distance to surface 110 increases. Process 1500 illustrated in FIG. 15 and described in great detail below provides signal processing algorithms that enable determining the relative motion even when D is about 30 mm.

At step 608, processor 250 may determine three dimensional positions of distal end 125 based on first reflections 405 and second reflections 405. As mentioned above, first reflections 405 may occur when distal end 125 moves in contact with surface 110 and second reflections 405 may occur when distal end 125 is spaced from surface 110. In some embodiments, processor 250 may determine an incremental position change of distal end 125 in three orthogonal directions. Processor 250 may further determine from the output of the at least three pairs of light detector 340 a differing component of the three dimensional positions. Calculating x, y, z components may occur when first reflections 405 include three non-collinear reflections 405 or second reflections 405 include three non-collinear reflections 405. But it does not necessarily mean that each of the at least three pairs of light detector 340 measure an orthogonal components. In some embodiments, processor 250 may enable determining the three dimensional positions of distal end 125 by sending information from interferometer 200 to be processed in a separate processor 250. In addition, stylus 105 may further include a movement sensor 235, and processor 250 may determine the three dimensional positions of distal end 125 based on a combination of the output of interferometer 200 and the output of movement sensor 235.

At optional step 610, processor 250 may generate writing input from the determined three dimensional positions of distal end 125, and transmitter 225 may transmit the writing input to paired device 115 to thereby cause a display of the writing input on paired device 115. Alternatively, transmitter 225 may transmit a data stream including information associated with the three dimensional positions of distal end 125 (e.g., the X and Y coordinates of a cursor position), and paired device 115 is configured to generate the writing input from the received data stream. Transmitter 225 may use a short-range communication protocol, such as Bluetooth protocol, to transmit the writing input and/or the data stream.

Figure 7:
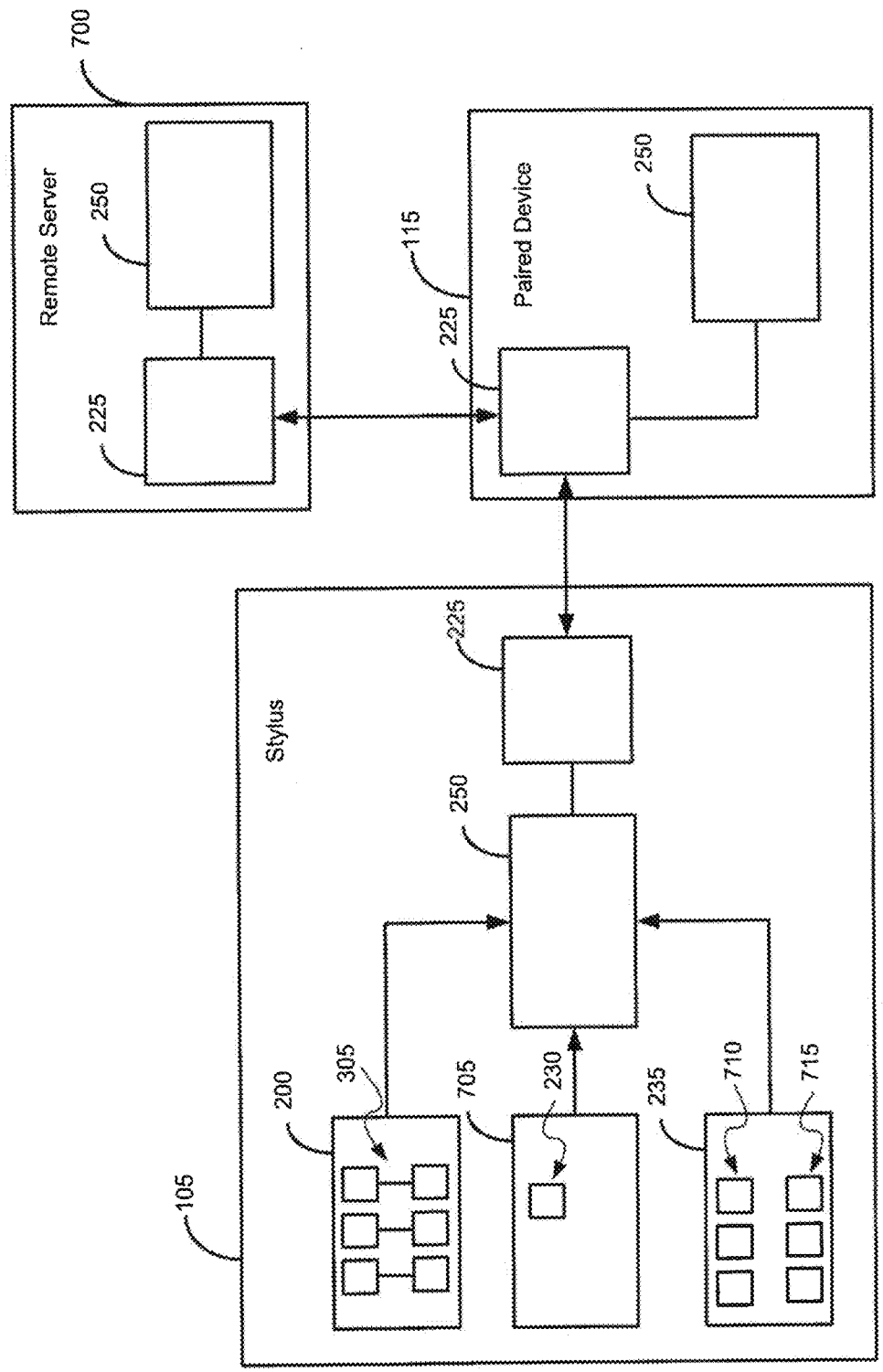
FIG. 7 is a block illustration that shows different approaches to determine the changing positions of an input device, according to some embodiments.

FIG. 7 is a block diagram illustrating some components of stylus 105, paired device 115, and a remote server 700 that may be part of the process of determining the data indicative of the changing positions of distal end 125, consistent with disclosed embodiments. FIG. 7 depicts three possible locations of processor 250. Each possible location may be associated with a different approach for determining the data indicative of the changing positions of distal end 125.

In the first approach, processor 250 may be located in stylus 105. In this approach, stylus 105 may determine the data indicative of the changing positions of distal end 125 using information received directly from at least one of: interferometer 200, force sensor 230 and movement sensor 235. Thereafter, stylus 105 may transmit the determined data to paired device 115 for generating writing input or for controlling paired device 115. For example, stylus 105 may identify a series of strokes by distal end 125 and transmit the series of strokes via transmitter 225 to cause presentation of writing input on the display of paired device 115.

In the second approach, processor 250 may be located in paired device 115. In this approach, stylus 105 may transmit to paired device 115 a raw data stream including information from at least one of: interferometer 200, force sensor 230 and movement sensor 235. The term "raw data stream" refers to any data stream that includes information that needs to be further processed in order to generate input. In one example, the raw data stream may include partially processed information. Stylus 105 may transmit raw data streams to a paired smartphone over a short range communication connection (e.g., a Bluetooth connection). Then, a previously installed off-line application on the smartphone may generate writing input from the raw data streams. In this approach, paired device 115 may store user specific information, such as calibration information associated with the way that user 100 holds stylus 105. The user specific information may assist processor 250 to accurately generate writing input for presentation on the display of paired device 115.

In the third approach, processor 250 may be located in remote server 700. In this approach, stylus 105 may also transmit raw data streams to paired device 115. In turn, paired device 115 may communicate said data streams with the remote server that can determine the data indicative of the changing positions of distal end 125 and communicate back with paired device 115. For example, stylus 105 may transmit raw data streams to a device over a short range communication connection (e.g., a Bluetooth connection). The device may not be able to determine the data indicative of the changing positions of distal end 125 from the data stream, so it forwards the data stream to an Internet server. The Internet server may identify in the determined data an authentication pattern associated with the user 100 and transmit an identification of user 100 to the device.

Stylus 105 may include interferometer 200 configured to measure reflections 405 of coherent light 400 from surface 110 as distal end 125 is moved relative to surface 110. Interferometer 200 may include a plurality of light detectors 340 to detect reflections 405 in three non-collinear directions. For example, interferometer 200 may include at least three pairs of light detectors 340 each pair configured to detect a differing reflection 405 of coherent light 400 in non-collinear spatial directions. In some embodiments, stylus 105 may further include a contact sensor 705 configured to provide feedback when distal end 125 is in contact with surface 110. One example of contact sensor 705 may include force sensor 230, which can provide a value of a parameter representative of the force applied by tip 130 on surface 110. Alternatively, contact sensor 705 may include a device, such as a force-activated switch, which may provide contact information indicative when stylus 105 is in contact and out of contact with surface 110. In addition, force sensor 230 may provide a value representing the force applied against surface 110, and processor 250 may change the input based on the value provided. For example, processor 250 may change the thickness of the writing input based on the value provided.

In addition, stylus 105 may further include a movement sensor 235 configured to detect acceleration as distal end 125 is moved relative to surface 110. In one example, movement sensor 235 may include a plurality of accelerometers 710 for detecting acceleration in two or three non-collinear directions. In addition, movement sensor 235 may include a plurality of gyroscopes 715 for detecting rotations in at least two directions. Accordingly, processor 250 may determine the three dimensional positions of distal end 125 based on at least one of: coherent light reflections information received from interferometer 200, linear and/or angular acceleration or angle information received from movement sensor 235, and contact information received from the contact sensor 705.

In one embodiment, processor 250 may use the data indicative of the changing positions of distal end 125 to authenticate user 100. For example, memory 255 [not shown in FIG. 7] may store a three-dimensional pattern information relating to a user's typical movements. Processor 250 may determine the data indicative of the changing positions of distal end 125 using information received directly from at least one of: interferometer 200, force sensor 230 and movement sensor 235. Before or during a writing session, processor 250 may compare the determined data with the three-dimensional pattern information, and determine, based on the comparison, whether a substantial match exists between the received data and the three-dimensional pattern information. When processor 250 determines that substantial match exists, processor 250 may trigger an authentication of user 100.

Figure 8:
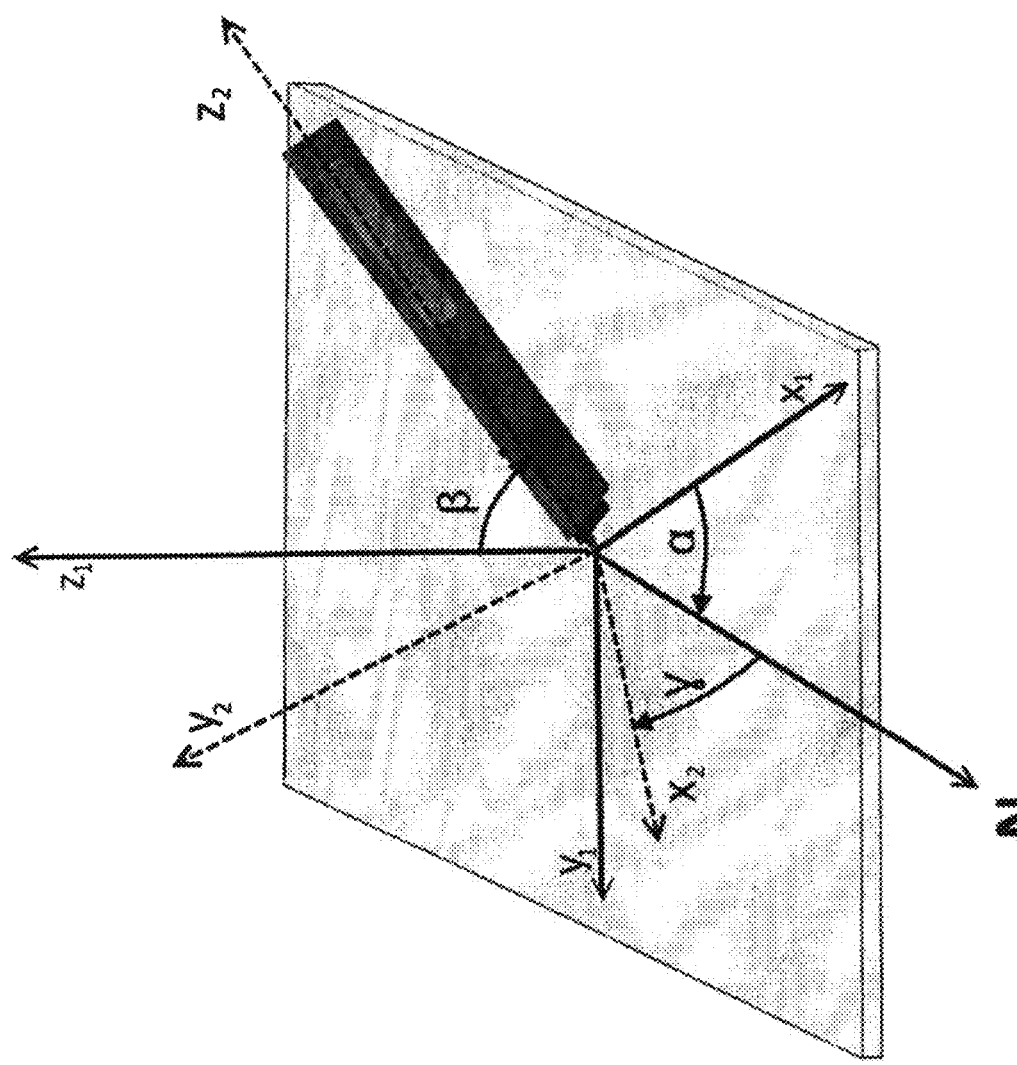

FIG. 8 is a schematic illustration of the coordinate system of surface 110 ($x_1$, $y_1$, and $z_1$) relative to the coordinate system of stylus 105 ($x_2$, $y_2$, and $z_2$). The surface's coordinate system $x_1 y_1 z_1$ is designated such that $z_1$ is along the normal to surface 110 and $x_1 y_1$ is in the plane of surface 110. The stylus coordinate system $x_2 y_2 z_2$ is designated such that $z_2$ is along the long axis of stylus 105. The intersection between planes $x_1 y_1$ and $x_2 y_2$ defines an additional axis known as "the line of nodes" N. In this figure, stylus 105 is tilted from surface 110 by angle $\beta$ (the angle between $z_1$ and $z_2$), rotated around its long axis by angle $\dot{\gamma}$ (the angle between N and $x_2$) and its horizontal direction of motion is offset from surface x axis by angle $\alpha$. Interferometer 200 may measure relative motion of stylus 105 versus surface 110. When stylus 105 is moved while in contact with surface 110, interferometer 200 may provide information regarding the tilt of stylus 105 (e.g., estimates of angles $\beta$ and $\dot{\gamma}$). Movement sensor 235 may measure the tilt with respect to earth's gravitational force, g. The relative tilts of stylus 100 with respect to surface 110 can be estimated also when distal end 125 is not in contact with surface 110 using information from movement sensor 235. In some embodiments, interferometer 200 may be used to measure motion information in the stylus coordinate system $x_2 y_2 z_2$, and movement sensor 235 may be used to measure motion information (e.g., tilt and rotation information) in the surface's coordinate system $x_1 y_1 z_1$. In other embodiments, interferometer 200 and movement sensor 235 may be used to measure motion information in the stylus coordinate system $x_2 y_2 z_2$, and motion information (e.g., tilt and rotation information) may be used to complement the information from interferometer 200. The tilt information can be used to continuously track angle $\beta$, and the rotation information can be used to continuously track angle $\dot{\gamma}$.

Consistent with disclosed embodiments, processor 250 may use the tilt information and the rotation information to continuously estimate the transformation between coordinate systems $x_1 y_1 z_1$ and $x_2 y_2 z_2$. In some embodiments, processor 250 may determine the three dimensional positions of distal end 125, when movement sensor 235 provides acceleration information in two directions and rotation information around a perpendicular direction. In other embodiments, processor 250 may determine the three dimensional positions of distal end 125, when movement sensor 235 provides acceleration information in three orthogonal directions.

When stylus 105 moves in direct contact with surface 110, there is no motion along $z_1$ direction. Accordingly, the tilt and rotation angles can be estimated by the instantaneous ratio of measured motion along $x_2$ and $z_2$ directions and $y_2$ and $z_2$ directions, respectively, and may be calculated from data received from interferometer 200. When stylus 105 moves out of contact with surface 110, the measured motion may contain a component along $z_1$ direction, which may affect the accuracy of tilt estimation from measured motion by interferometer 200. However, linear and/or angular acceleration information provided by movement sensor 235 can be used to keep an accurate estimate of the tilt and rotation angles when tip 130 does not touch surface 110. Accordingly, the information measured by movement sensor 235 may be used to improve the accuracy of the determination of the data indicative of the changing positions of distal end 125.

Figure 9:
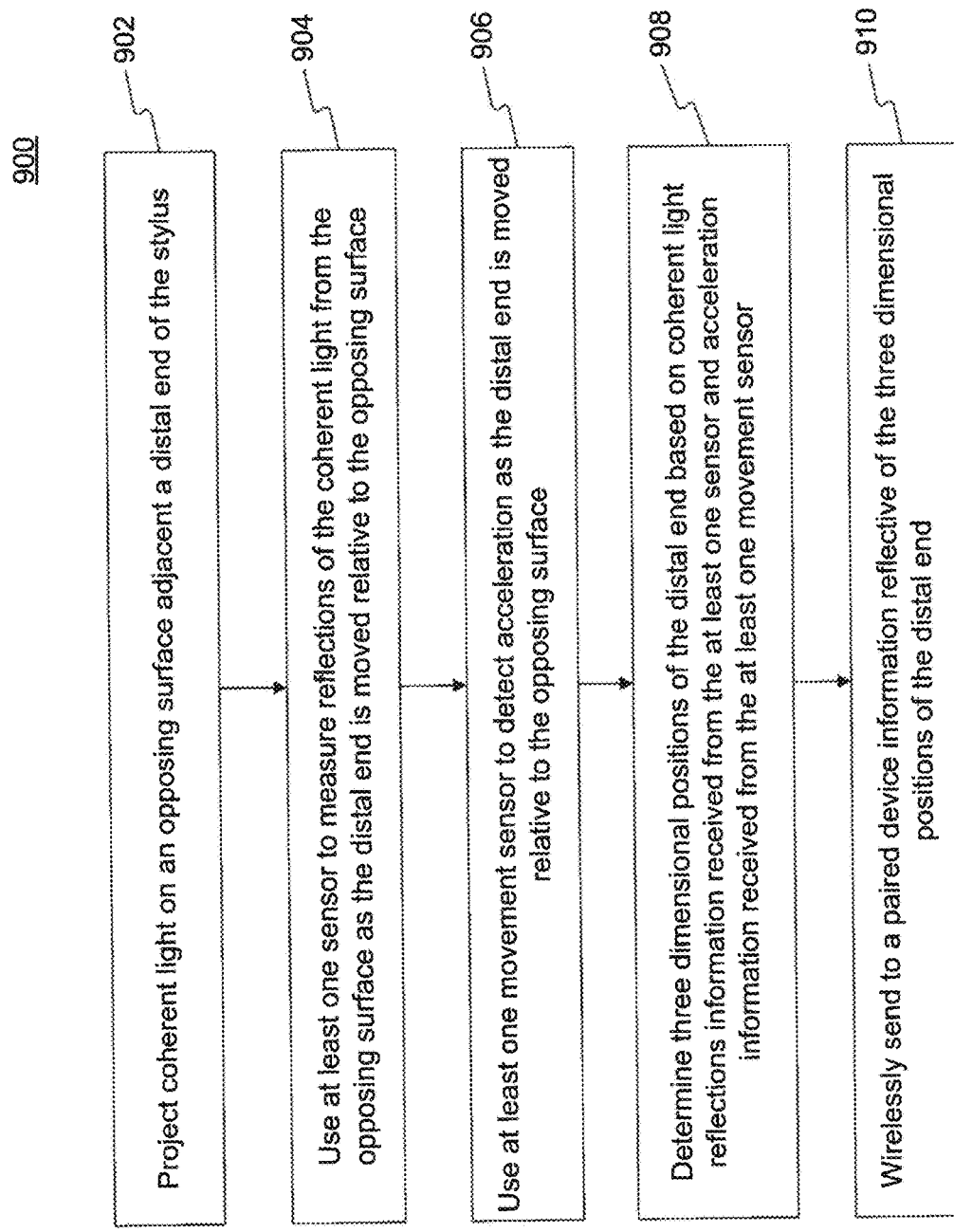
FIG. 9 is a flow diagram of an exemplary process for determining three dimensional positions of an input device, consistent with disclosed embodiments.

FIG. 9 is a flowchart showing an exemplary process 900 for determining three dimensional positions of stylus 105, consistent with disclosed embodiments. At step 902, light source 305 may project coherent light 400 on surface 110 adjacent distal end 125 of stylus 105. In some embodiments, coherent light source 400 includes a laser diode. At step 904, interferometer 200 may measure reflections 405 of coherent light 400 from surface 110 when distal end 125 is moved relative to surface 110. In some embodiments, interferometer 200 may include a plurality of light detectors and is further configured to detect reflections in three non-collinear directions.

At step 906, movement sensor 235 may detect acceleration as distal end 125 is moved relative to earth's gravitational force g. In some embodiments, movement sensor 235 may include a plurality of accelerometers 710 for detecting acceleration in at least three non-collinear directions. In another embodiment, movement sensor 235 may include a plurality of gyroscopes 715 for detecting rotations in one or more directions, for example, at least three directions.

At step 908, processor 250 may determine the three dimensional positions of distal end 125 based on coherent light reflections information received from interferometer 200 and acceleration information received from movement sensor 235. In some embodiments, processor 250 may identify a situation where the coherent light reflections information is temporarily unavailable, and determine the three dimensional positions of distal end 125 based only on acceleration information received from movement sensor 235. For example, the coherent light reflections information may be temporarily unavailable when distal end 125 is moved more than 50 mm above surface 110. In other embodiments, processor 250 may access stored pattern information and authenticate user 100 by determining whether a substantial match exists between the pattern information and the three dimensional positions of distal end 125 as determined from coherent light reflections information received from interferometer 200 and acceleration information received from movement sensor 235.

In some embodiments, stylus 105 may include contact sensor 705 configured to provide feedback when distal end 125 is in contact with surface 110. For example, contact sensor 705 may include a force-activated switch. In these embodiments, processor 250 may determine the stylus movements based on a combination of feedback from contact sensor 705, movement sensor 235, and interferometer 200. In addition, processor 250 may determine writing input based on the three dimensional positions of distal end 125 as determined from feedback from contact sensor 705, movement sensor 235, and interferometer 200.

At optional step 910, processor 250 may wirelessly send to paired device 115 information reflective of the three dimensional positions of distal end 125 as determined from coherent light reflections information received from interferometer 200, acceleration information received from movement sensor 235, and contact information received from contact sensor 705. In some embodiments, processor 250 may control a plurality of unrelated paired devices 115 based on the three dimensional positions of distal end 125 as determined from coherent light reflections information received from interferometer 200, acceleration information received from movement sensor 235, and contact information received from contact sensor 705. In addition, processor 250 may identify a selection of an unrelated device based on the three dimensional positions of distal end 125 as determined from coherent light reflections information received from interferometer 200, acceleration information received from movement sensor 235, and contact information received from contact sensor 705.

In some embodiments, stylus 105 may trigger one or more predefined functionalities in paired device 115. The term "functionality" may broadly be defined to include any operation or a set of operations that can be executed. In some embodiments, a functionality may be contained in, for example, a program, an application, a script, or a macro. In these embodiments, the term "triggering a functionality" may refer to causing execution of, for example, the program, the application, the script, or the macro. Several motivations may exist for providing stylus 105 with the capability to trigger one or more predefined functionality in paired device 115. First, providing the capability may reduce the need for user 100 to physically access paired device 115 that may not be located in a readily accessible location, such as a back-pack, a trunk of a vehicle, or a pants pocket. Second, providing the capability may reduce disruptions to user 100 while user 100 is focused on using stylus 105. For example, by providing predefined functionalities for text formatting, user 100 may create a rich text content using stylus 105 without diverting his or her attention towards paired device 115 to access the text formatting functionalities.

Some embodiments of the disclosure include implementing signal processing algorithms on the interferometer signals to determine the motion of interferometer 200 or the motion of a body of a device housing the interferometer 200. Determining the relative motion of interferometer 200 may include decoupling the X and Y components from the 3D Doppler information. Other embodiments of the disclosure may include applying signal processing algorithms to extract the motion information from the detected signals in the presence of noise, interferences, and occasional loss of signal.

As described above with reference to FIG. 3A-3E, interferometer 200 may include four light detector pairs 340 for measuring three dimensional motion, and is particularly useful for digital pen and other input devices, such as stylus 105. However, the same principles and methods may be applied to a wide range of applications using an interferometer similar to interferometer 200, which may use a smaller or larger number of light detectors 340. These may include, for example, industrial applications such as surface-independent motion encoders. In the example interferometer of FIG. 3A, the data may be received from eight analog channels, corresponding to four independent light detector pairs 340, sampled at a rate which is typically between 0.4 MHz and 1.6 MHz (per channel), with, for example, 8-bit resolution. The resolution or the sampling rate, however, can be smaller or larger depending on the specific requirements of each application.

Some implementations of interferometer 200 may use multiple light detectors 340 which are not quadrature pairs. Such an implementation may include determining the direction of motion (i.e., the distinction between positive signal frequency and negative signal frequency) by other means than the phase between the light detectors 340 in the quadrature pair, as described in the '335 patent. For example, such an implementation may include a predetermined direction of motion, which is typical in industrial applications such as conveyer belt encoders. While the processing methods described below are generally explained in connection with an interferometer that uses quadrature light detector pairs 340, the same processing methods may also be applicable to interferometers that use multiple light detectors 340 which do not form quadrature pairs and do not have a deterministic phase relationship between them.

Figure 10:
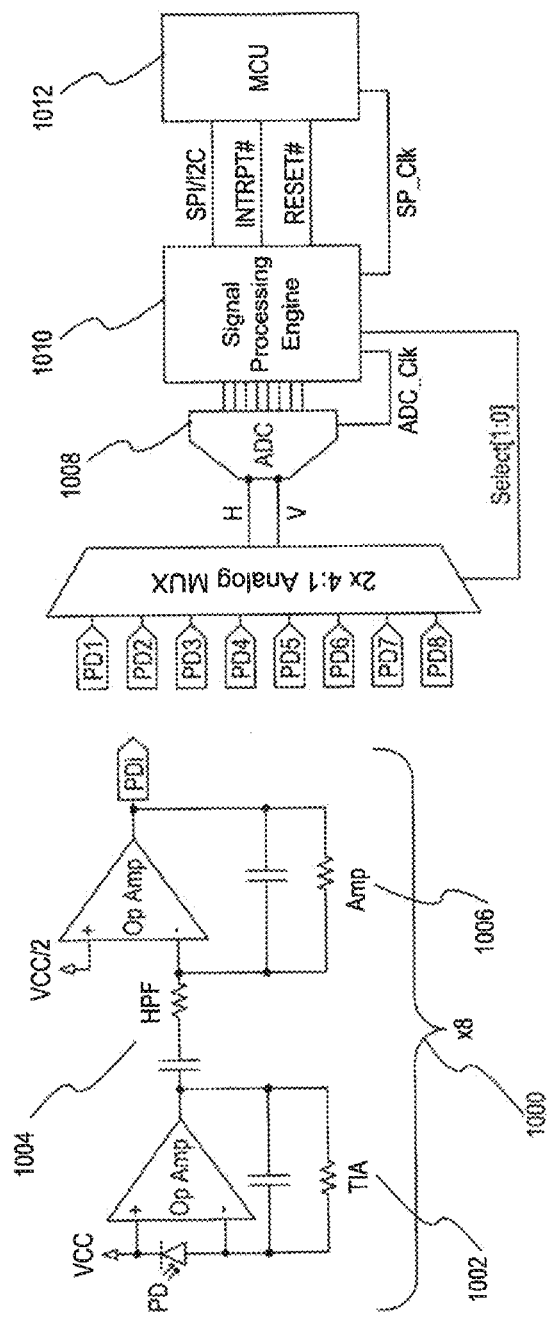
FIG. 10 is a block diagram of the electronics of an example interferometer, consistent with disclosed embodiments.

FIG. 10 is a block diagram of example electronics associated with interferometer 200 that may be used to process the interferometer signals. It includes (from left to right) eight analog photocurrent amplification channels 1000, each comprising a Trans-Impedance Amplifier (TIA) 1002, a High-Pass Filter (HPF) 1004, and a voltage amplifier (AMP) 1006. The electronics may also include a stabilized quiet power source (not shown) to drive light source 305. The stabilized quiet power source may reduce the fluctuations of light source 305 that may affect the signal quality adversely. The output of AMP 1006 may be sampled by an Analog-to-Digital Converter (ADC) 1008. In some embodiments, the ADC may be preceded by an 8:1 or 2×4:1 multiplexer, depending on the type of ADC. In some embodiments, two, four or eight ADC's can each simultaneously sample four, two or one analog input, respectively, as will be evident to those skilled in the art. The output of ADC 1008 may be sampled signals in digital form, and these are the input of the signal processing engine 1010 described herein. The signal processing engine may be part of processor 250 which analyzes the signals and calculates the motion of the interferometer relative to a surface adjacent to it and illuminated by light source 305 that may be part of interferometer 200. The output of the signal by the processing engine may be measured motion. The measured motion may be read by a microcontroller (MCU) 1012 and be sent to a display to present to user 100. The measured motion may be sent to graphics or text applications in paired device 115 to be recorded or used in any other form or for other purposes. MCU 1012 may communicate with digital processing engine 1010 using well known communication protocols such as PC or SPI, or any other useful communication protocol, and may further configure or control the digital processing using dedicated hardware lines (such as clock, reset lines, etc.) as will be evident to one skilled in the art.

An example of the data acquired by ADC 1008 is shown in FIG. 1. In one embodiment, the interferometer signals may be grouped in quadrature signal pairs, suitable as complex input buffers for complex Fast Fourier Transform (FFT) processing. For example, the eight original signals from the eight analog photocurrent amplification channels 1000 may become four "complex" signal pairs, designated XM, XP, YM, and YP. In FIG. 1, the vertical axis is the input data (i.e., ADC output values) and the lines represent signals in each member of the quadrature signal pairs. Specifically, the gray (V) line and darker gray (H) line form quadrature signal pairs—these signals have almost identical shape but are shifted in phase by about 90 degrees. This is depicted, for example, between 0.053 and 0.054 sec in the first pair signals (XM). The input data from ADC 1008 may be grouped in buffers of typically 256 samples (or 512 samples if a higher sampling rate is used). Specifically, for a sampling rate of 800 kHz, the input data stream is typically processed in slices of 128 samples, considered as "half buffers" of 256 "full buffers." This sets a time overlap between buffers that is used for windowing the input data stream. There is also an optional "non-windowing mode," where the overlap is omitted and where windowing is not applied before the FFT processing. This mode may be inferior in performance relative to the Windowing Mode, but may be used to save power consumption and optionally reduce hardware resources. For a higher sampling rate such as 1.6 MHz, a larger input data stream half-buffer may be desired, such as 256 samples.

Figure 11:
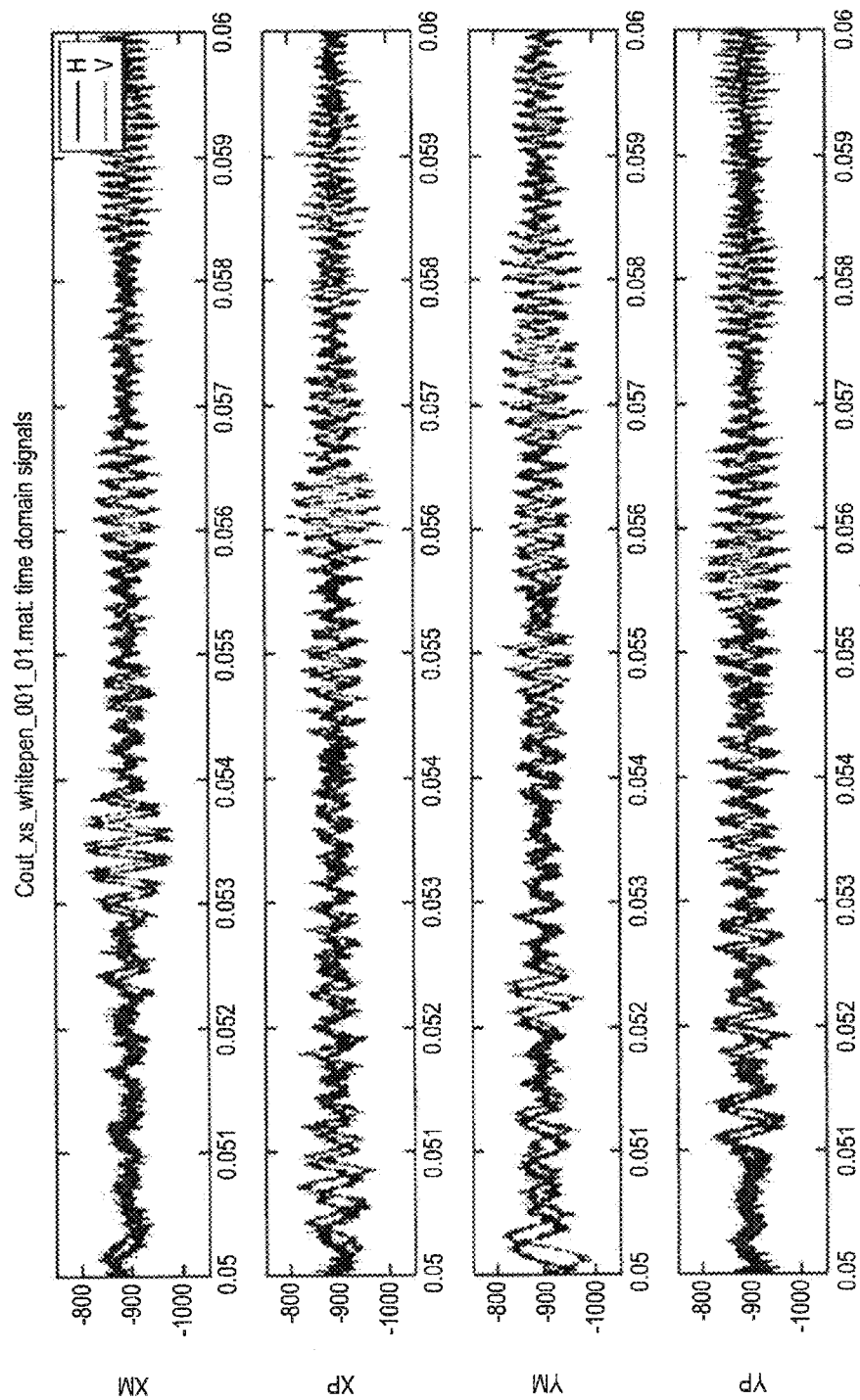
FIG. 11 is an example of a pair of signals acquired by an analog-to-digital converter, consistent with disclosed embodiments.

In the example shown in FIG. 11, the signal amplitude is typically much larger than the noise amplitude, but this may not be the case for other applications or scenarios. For example, in some applications, the signal-to-noise ratio (SNR) depends on the illumination power density and accordingly it may increase by increasing the laser power and decrease by increasing the illuminated area. Input devices consistent with the present disclosure (e.g., stylus 105) may measure speed between 1 mm/sec and 1000 mm/sec, or between 1 mm/sec and 1250 mm/sec, or between 1 mm/sec and 1500 mm/sec. However, the typical bandwidth of the electronics in these input devices may be about 400 kHz or more, the power of the laser source (e.g., light source 305) may be restricted, for example, about 0.7 mW at a wavelength of 850 nm, and the aperture of the interferometer optics (optical aperture 310) may be larger than about 3 mm$^2$. In addition and as described above, the value of the SNR may also depend on the distance of the input device from the opposing surface 110. Therefore, in some cases, the motion signal power in these input devices may have a same order of magnitude as the noise signal.

Figure 12:
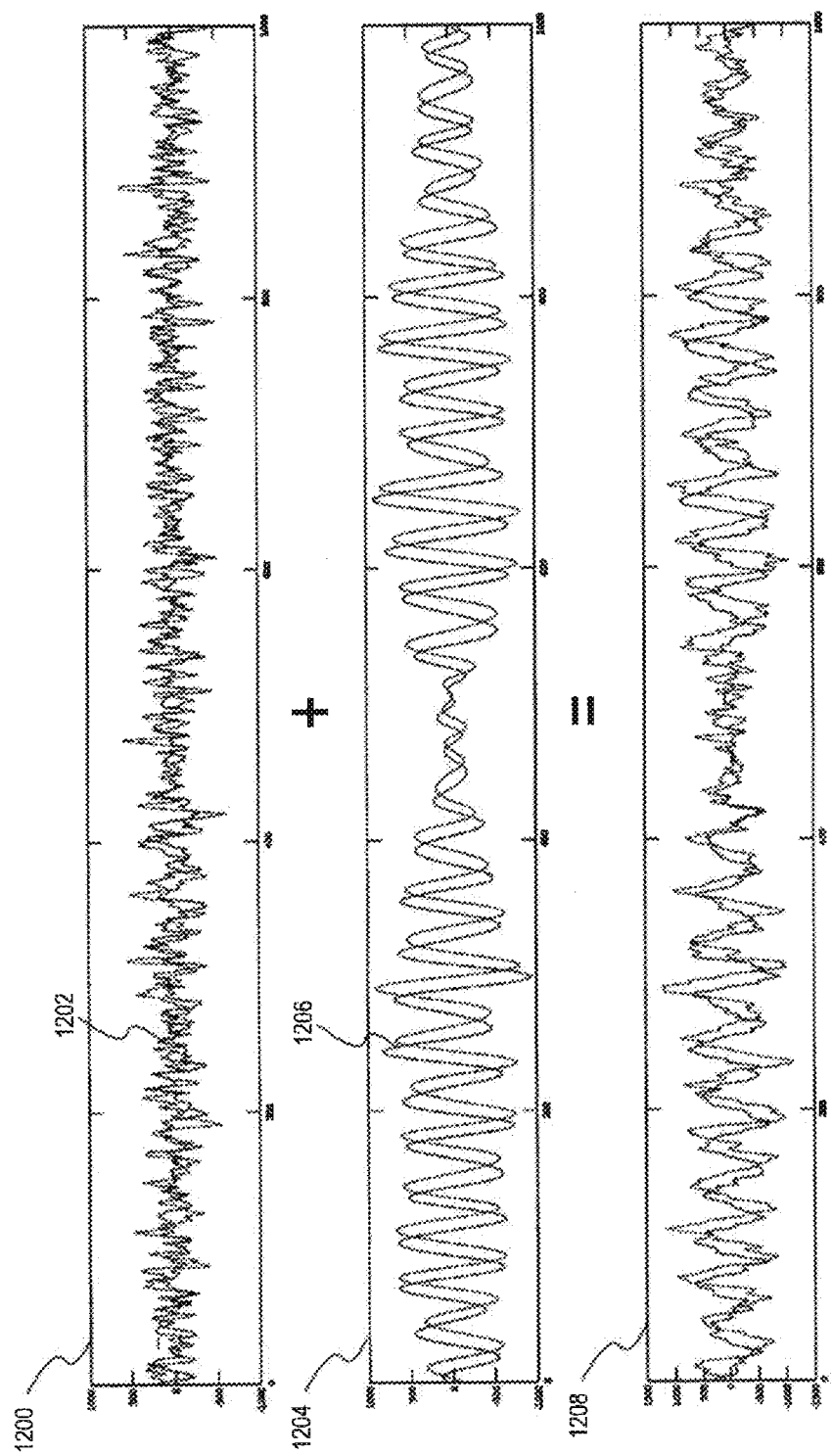
FIG. 12 is an illustration of how measured data is constructed from noise signals and motion signals, consistent with disclosed embodiments.

FIG. 12 shows an example of signals that make up the input data from light detectors 340. As depicted, graph 1200 represents noise signals 1202 in a single quadrature signal pair (e.g., one of the four "complex" signal pairs: XM, XP, YM, and YP). Consistent with the present disclosure, noise signals 1202 may be caused by electrical noise, unwanted reflections of light, fluctuations in illumination intensity of light source 305, or any combination thereof. Specifically, it is advised to minimize possible back reflections to light source 305 since that may lead to "self-modulation" of light source 305. Graph 1204 is a computer simulation illustrating how motion signals 1206 would have appeared in the same quadrature signal pair in an ideal system without noise. Graph 1208 illustrates the combination of graph 1200 and graph 1204, which is equivalent to the data acquired by ADC 1008. In some embodiments, the SNR may change due to environmental conditions. For example, the power of motion signals 1206 when surface 110 is a white paper may be about three times the power of noise signal 1202, while the power of motion signals 1206 when surface 110 is a black paper may be less than a fifth of the power of noise signal 1202. Conventional methods may not provide sufficient accuracy, as they are sensitive to temporary loss of motion signal and to interferences. Specifically, determining the relative motion between body 120 and opposing surface 110 in these situations is not possible when using signal processing algorithms such as zero-cross counting, as described in the '335 patent. Specifically, noise signals 1202, which are additive to motion signals 1206, distort the zero crossing timing of motion signal 1206 and causes zero crossing counting mechanism errors. The zero crossing counting may start to degrade when the power of motion signals 1206 is less than one or two orders of magnitude larger than the power of noise signals 1202, and will be completely dysfunctional when the power of motion signals 1206 is equal to or less than the power of noise signals 1202.

On the other hand, the combinations of processing techniques presented herein, provide an efficient and accurate determination of the motion of interferometer 200 relative to surface 110 even with a low SNR, as well as in the presence of various kinds of interferences. Moreover, even for systems with a small bandwidth (and therefore low noise power) or high power laser where the motion signal power is much larger than the noise power, the techniques disclosed herein may improve the immunity of the system to interferences, as well as improve the accuracy of the motion determination, due to the statistical nature of the motion signals and the noise signals, and when tracking high-contrast surfaces or surfaces with large variations of reflectivity.

Figure 13:
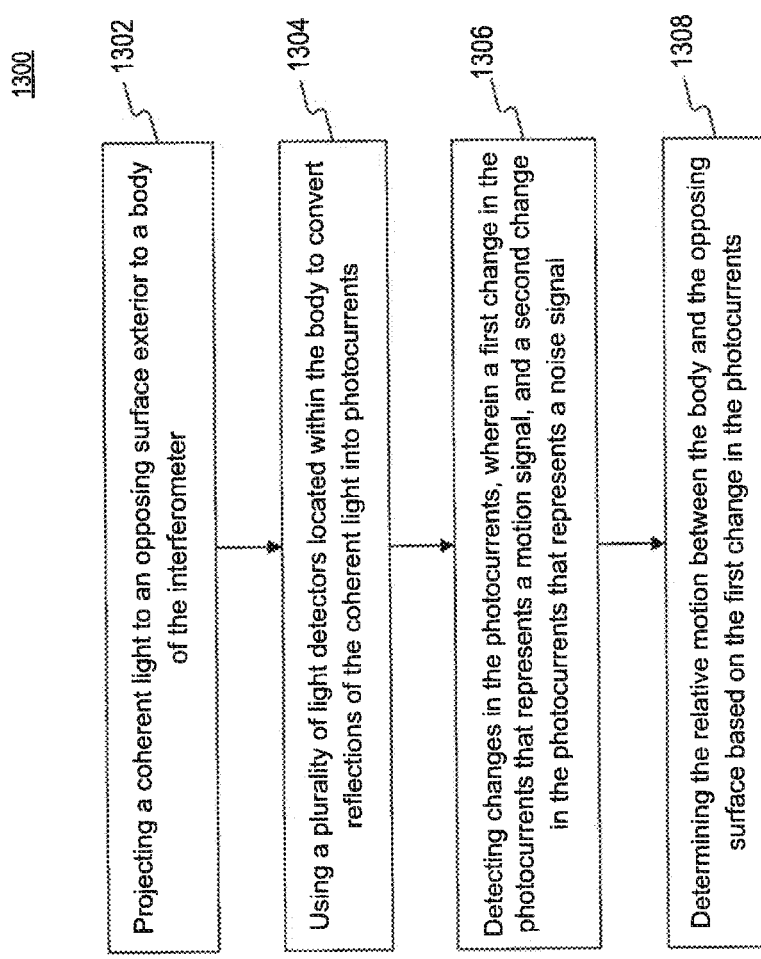
FIG. 13 is a flow diagram of an exemplary process for determining relative motion between an interferometer and the opposing surface, consistent with disclosed embodiments.

FIG. 13 is a flowchart showing an exemplary process 1300 for determining the relative motion between interferometer 200 and surface 110, consistent with disclosed embodiments. At step 1302, light source 305 may project coherent light 400 on surface 110 exterior to body 120. In some embodiments, light source 305 is configured to project substantially collimated coherent light 400 towards surface 110. In addition, light source 305 may be configured to project coherent light 400 having a wavelength between about 650 nm and about 1000 nm and having a coherence length of at least about 15 mm. The coherence length refers to the propagation distance over which a coherent wave maintains a predetermined degree of coherence. In some examples, light source 305 is configured to project coherent light 400 having a coherence length of about 25 mm, about 50 mm, about 75 mm, about 100 mm, about 500 mm, or more than 1000 mm. The proposed interferometer can determine relative motion with a velocity that ranges between 1 to 1250 mm/sec, between 0.5 to 1000 mm/sec, or 0.25 to 1100 mm/sec, while the power of the light source 305 may be lower than about 1.2 mW, lower than about 0.9 mW, or lower than about 0.7 mW.

At step 1304, interferometer 200 may use a plurality of light detectors 340 located within the body to convert reflections of the coherent light 400 into photocurrents. In one example, interferometer 200 includes four pairs of light detectors 340, wherein each pair is configured to detect a differing reflection of coherent light 400 in non-collinear spatial directions. Each of the four pairs of light detectors 340 may form a polarization sensitive quadrature signal detector. An example of the input from the four pairs of light detectors 340 is illustrated in FIG. 11. As described above, the four pairs of light detectors 340 may be arranged in a substantially co-planar relationship with respect to each other. An example configuration of the pairs of light detectors 340 in interferometer 200 is illustrated in FIGS. 3C-3E.

At step 1306, processor 250 may detect changes in the photocurrents, wherein a first change in the photocurrents represents a motion signal 1206, and a second change in the photocurrents represents a noise signal 1202. The first change occurs in response to a relative motion between body 120 and the opposing surface, and the second change does not occur in response to a relative motion between body 120 and the opposing surface. In some embodiments, the second change in the photocurrents is caused by unwanted reflections of light, electrical noise, or by fluctuations in light source illumination intensity. Processor 250 may detect changes in the photocurrents and distinguish between noise signals 1202 and motion signals 1206 when a typical amplitude of noise signals 1202 is larger than a typical amplitude of motion signals 1206 and/or when frequencies of noise signals 1202 differ from frequencies of motion signals 1206.

At step 1308, processor 250 may determine the relative motion between body 120 and surface 110 based on the first change in the photocurrents. In some embodiments, processor 250 may determine the relative motion between body 120 and surface 110 when a ratio between a power of motion signals 1206 and a power of the noise signals 1202 is below about 15, when the ratio is below about 10, when the ratio is below about 5, when the ratio is below about 1, when the ratio is below about 0.5, when the ratio is below about 0.1, when the ratio is below about 0.05, or when the ratio is below about 0.01. These values of the ratio may be when the body is in contact with surface 110 or up to a predetermined distance (e.g., 5 mm, 10 mm, 15 mm, or 25 mm) above surface 110. In one embodiment, processor 250 may determine the relative motion in three dimensions, as described with reference to FIG. 8. In addition, processor 250 may determine the relative motion substantially in real time. Consistent with the present disclosure, the term "substantially in real time" may include a small delay from time-of-movement (i.e., the time body 120 moves relative to surface 110) until time-of-determination (i.e., the time at which relative motion is determined or presented on screen 220). For example the delay may be smaller than about 0.1 sec, smaller than about 0.05 see, smaller than about 0.01 sec, smaller than about 0.005 sec, or smaller than about 0.001 sec. In addition, processor 250 may determine the relative motion between body 120 and surface 110 when body 120 moves out of contact with surface 110 and substantially parallel to surface 110. A movement substantially parallel to surface 110 includes movement in a direction orthogonal to the plane parallel to surface 110. The movement may cause the distance between the plane of motion and surface 110 to be under 10 mm, under 5 mm, or under 2.5 mm.

Figure 14:
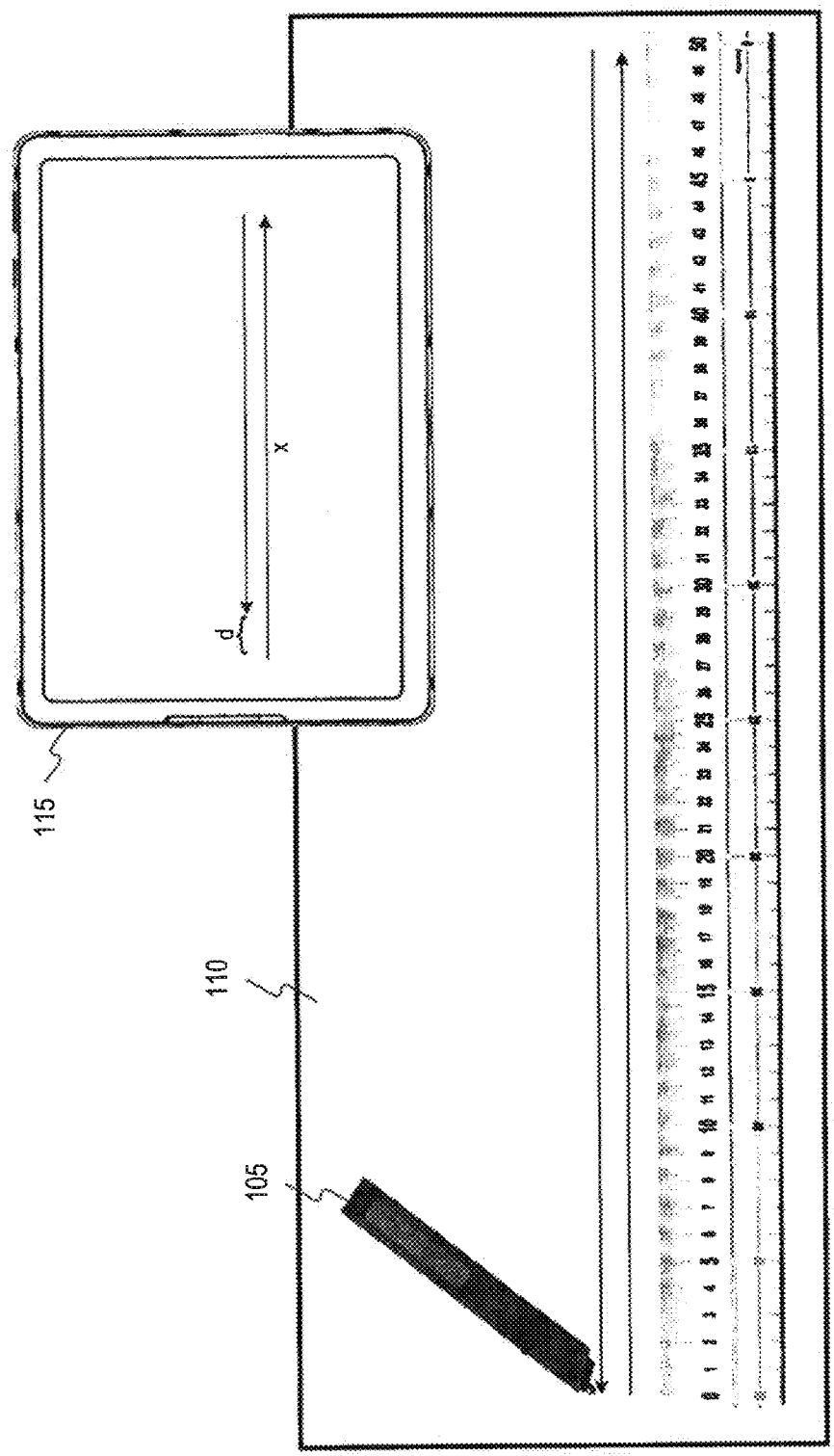
FIG. 14 is a schematic illustration of the example input device shown in FIG. 1 used to estimate the measurement error of the relative motion, consistent with disclosed embodiments.

FIG. 14 is a diagrammatic representation of user 100 (not shown in FIG. 14) moving stylus 105 relative to surface 110 to estimate the accuracy of interferometer 200, consistent with disclosed embodiments. In FIG. 14, user 100 is moving stylus 105 side-to-side for a total distance of 100 mm at a constant distance between light source 305 and surface 110, in a plane parallel to surface 110. The lines in this figure are separate for illustration purposes, a more accurate way to measure would be draw the second line on-top of the first line. FIG. 14 also illustrates the lines that displayed on paired device 115 when stylus 105 is moved. Consistent with the present disclosure, one way to calculate the measurement error may be $$\frac{d}{2x},$$

where "d" is the distance from where the line in paired device 115 ended to where it was supposed to end (e.g., the starting point), and 2x is the total length of the lines that paired device 115 was supposed to draw. In the example illustrated in FIG. 14, 2x=100 mm. In some embodiments, processor 250 may determine the relative motion with a typical measurement error below about 5%, below about 1%, below about 0.25%, or below about 0.15%.

Figure 15:
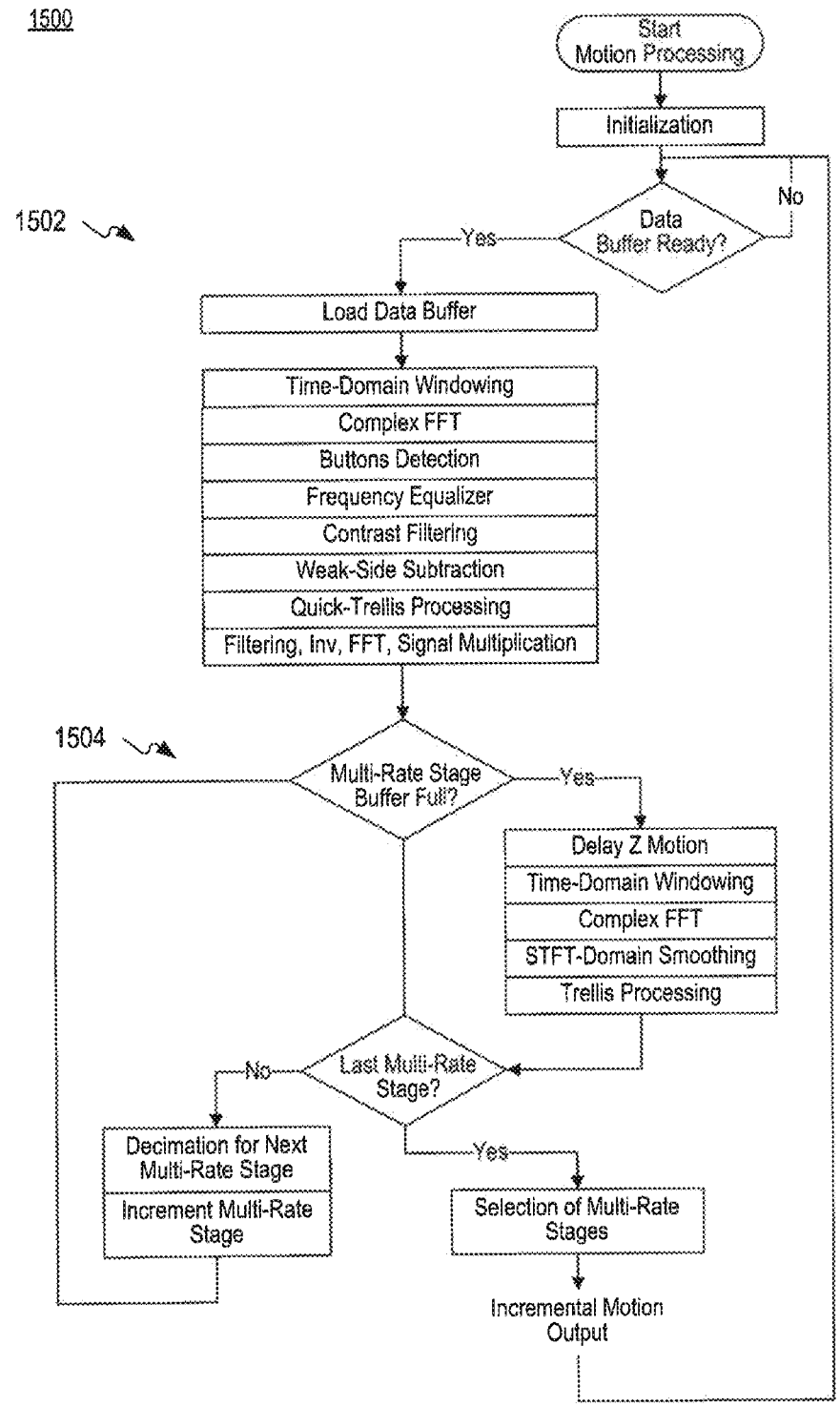
FIG. 15 is a flow diagram of an exemplary process for processing a signal to determine relative motion, consistent with disclosed embodiments.

FIG. 15 is a flowchart showing an exemplary process 1500 for determining the relative motion, consistent with disclosed embodiments. Exemplary process 1500 may be carried out in two major parts. A first part 1502 is Z-coupled processing (or ZCP processing), and a second part 1504 is Transverse Motion processing (or TM processing). In the first part, the objective is typically to roughly identify the signal frequency in each of the channels (e.g., channels 1000). Then the signals are filtered, and the Z information is decoupled from the X and Y motion signals in a signal multiplication processing step. The results are re-generated motion signals representing transverse X and Y motion. The second part is composed of several steps similar to each other, where the input data rate is reduced from each stage to the next. This may enable high accuracy tracking with wide frequency dynamic range.

Both the ZCP and TM processing parts include versions of trellis processing, which is aimed at finding the most likely frequency trace in the presence of noise, signal distortions, interferences and occasional loss of signal. Thereafter, the motion information may be projected from the interferometer X-Y plane to the surface plane using estimation of the interferometer tilt with respect to the surface 110, and converted to output pixels. Ballistics processing modifies the pixel resolution, depending on motion mode (for example pen, mouse, or other). The motion mode itself may be determined on-the-fly as part of the conversion to pixels.

In some embodiments, the ZCP processing part in the exemplary process 1500 may include a time-domain windowing step. The purpose of this step is typically to suppress edge effects of the FFT, which may cause processing noise if not suppressed using the windowing. Each buffer may be multiplied by a cosine windowing function. The window shape is kept as a table in memory for efficient calculation.

In some embodiments, the ZCP processing part in the exemplary process 1500 may include a complex Fast Fourier Transform (FFT) step. In some embodiments, other equivalent algorithms may be used for transforming signals from the time domain to a representation in the frequency domain, e.g., DFT (Discrete Fourier Transform). Using complex FFT on the input signals takes advantage of the relatively narrow frequency range of the motion signal in each time slice, compared to the broad band noise. This provides a considerable processing gain, since the motion signal power remains concentrated in one or few bins of the FFT, while the noise signal power is spread roughly evenly over all the FFT processing bins. The processing gain may be of two orders of magnitude or more for a 256-bin FFT. The FFT buffer size may be preferably 256 points, but can also be smaller or larger, depending on the application characteristics, sampling rate and implementation considerations. For example, the FFT buffer can be 32, 64, 128, 512, or 1024 points.

The complex FFT step may provide significant processing gain such that the motion signal frequency can be determined by finding the FFT bin having the maximum amplitude. For example, when the motion signal power (which may be proportional to the square of the motion signal amplitude) is at the same level as the noise signal power (which may be proportional to the square of the noise signal amplitude, where the noise signal is the signal that is present in the absence of motion). The FFT processing can be viewed as a filter that filters motion signals from noise signals, performed in the frequency domain. Other filters known in the art can also be used, such as Sine and Cosine Transforms, Wavelet Transform, Laplace Transform, correlation-based filtering and other processing techniques that are based on the short-term stable frequency and predictable phase of motion signals 1206 versus noise signals 1202.

In addition, the use of the complex FFT is both computationally efficient and uses the deterministic quadrature relation between motion signals to further increase the processing gain relative to non-quadrature interferences and noise. The use of the complex FFT can therefore be viewed as both a filter in the frequency domain and a quadrature filter. Specifically, quadrature signals may have a larger amplitude in the complex FFT than non-quadrature signals having similar power, and therefore better signal-to-noise than non-quadrature signals. As mentioned above, in some cases interferometer 200 may use multiple detectors which are not quadrature pairs. In these cases, Real FFT or other transforms intended for use on real (non-complex) data may be used. Although quadrature filtering may not be used, the processing gain may still be very large in such implementations.

Furthermore, when interferometer 200 is tracking high-contrast surfaces at high speed, a large-amplitude, low-frequency component may be added to the motion signal due to the changes in the amount of light reflected from the surface which does not contribute to the motion interference signal, as explained in the '335 patent. While this low-frequency component will often be effectively suppressed by a high-pass filter in the signal amplification channel, this will not be so for fast motion and highly contrasting surfaces, especially when interferometer 200 is also intended to track motion when the speed is very slow. The added low-frequency contrast-related signal may disrupt the operation of a zero-crossing counting mechanism such as described in the '335 patent to measure the motion, leading to temporary loss of tracking. However, by using an Analog-to-Digital Converter (ADC) to sample the interferometer signals, and as long as the combined signals are within the dynamic range of the ADC, the use of FFT, such as presented herein (or similar processing techniques as known in the art) to process the signals may effectively separate the high-frequency motion signals from the low-frequency contrast-related signals, without requiring complex optical and electrical mechanisms to do so, such as described in the '335 patent.

In some embodiments, four pairs of signal channels may be fed to complex FFT processing. Arbitrarily, the "H" channels are chosen as the "real" data and the "V" channels as the "imaginary" data. The resolution of the data and the FFT coefficients are both typically signed 16-bit. Bin 0 of the FFT result stands for the DC component of the data. It is used to update the DC level estimators, which is subtracted from the input data of the next slice. The arrays representing the complex FFT results are converted to arrays of amplitudes (real values) that represent the length of a complex vector.

Figure 16:
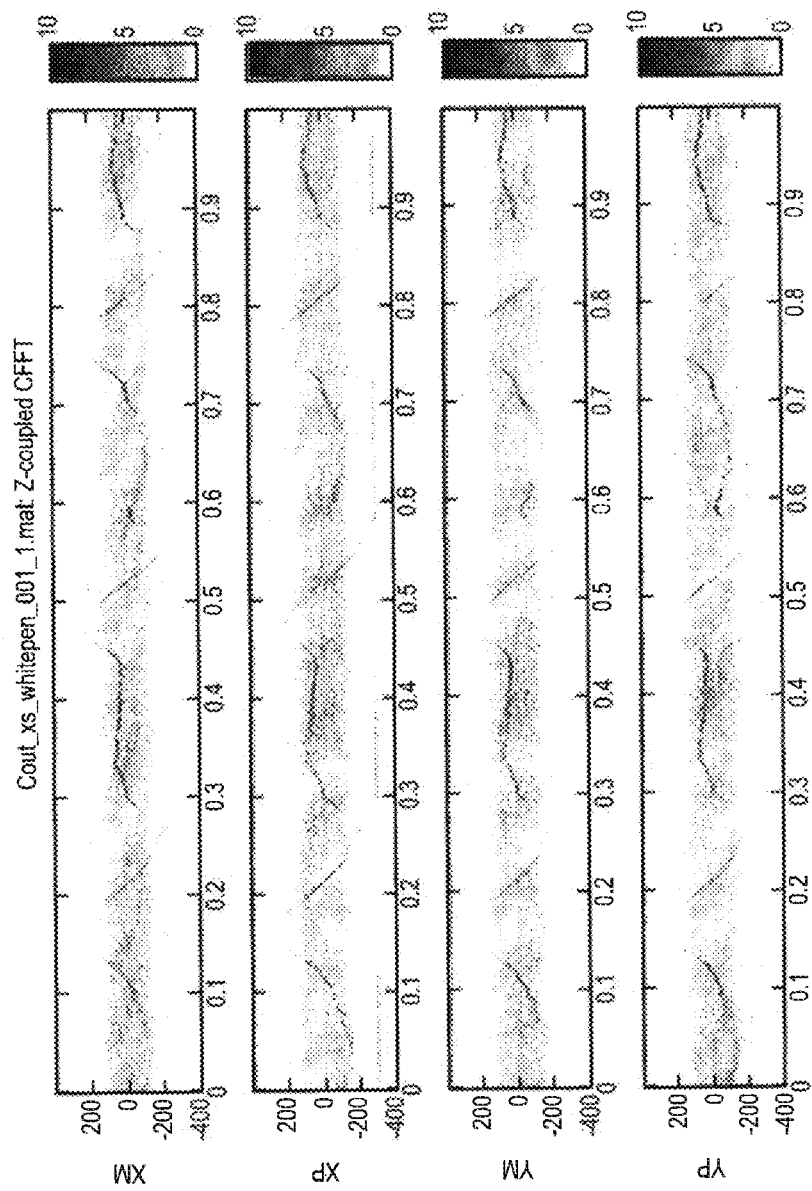
FIG. 16 is an example of the resulting spectrum after applying the complex FFT step of the exemplary process shown in FIG. 15, consistent with disclosed embodiments.

FIG. 16 shows an example of the resulting spectrum after applying the complex FFT step. The horizontal axis is time, the vertical axes are frequency [kHz], and the color scale represents the magnitude of the signal.

In some embodiments, the ZCP processing part in the exemplary process 1500 may include a button detection step. Relevant buttons that may be detected and combined with the motion data include, for example, tip and right-click buttons.

In some embodiments, the ZCP processing part in the exemplary process 1500 may include a frequency equalizer step. The purpose of the frequency equalizer step is to normalize the spectrum such that the noise spectrum will be approximately uniform and with a configurable level. This way, various configuration parameters that are noise-dependent can be independent of the signal frequency, and would not be sensitive to operating conditions (e.g., surface reflectivity) and to variations between interferometer noise levels (e.g., due to laser power) in different systems. The equalizer step has two parts. One is the estimation of equalizer curve, and the other is the application of the curve to the signal spectrum before proceeding to the following processing stages. Consistent with the present disclosure, the equalization factors may be calculated for each detector pair independently, in case there is a difference between the channels.

Figure 17:
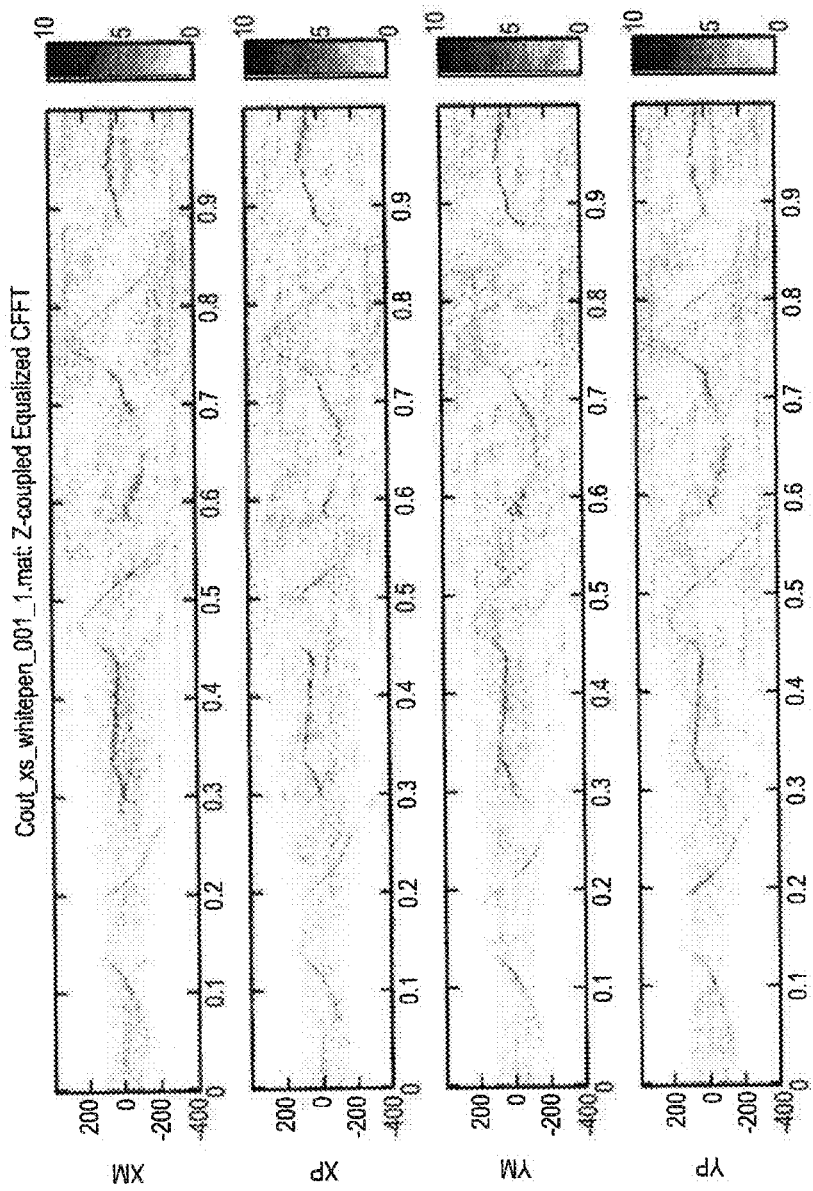
FIG. 17 is an example of the resulting spectrum after applying the frequency equalizer step of the exemplary process shown in FIG. 15, consistent with disclosed embodiments.

FIG. 17 shows an example of the resulting spectrum after applying the frequency equalizer step. The output of ZCP Spectrum is multiplied, bin-by-bin, with the corresponding equalization factor buffer. It can be seen that the noise level is gradually flattened across the frequency and is normalized to a configurable level. The signal amplitude is also factored by the same factors as the noise.

In some embodiments, the ZCP processing part in the exemplary process 1500 may include a contrast filtering step. The signal contrast in a certain frequency of the FFT spectrum may be a value between 0 and 1 that represents how well the signal is having a positive or a negative frequency following the complex FFT processing. A pure quadrature signal will have a positive-only or negative-only frequency component and will thus have a contrast of 1, while a pure non-quadrature signal having equal magnitude components of positive and negative frequencies wilt have a contrast of 0. Contrast filtering can thus by viewed as an additional quadrature filter applied on the output of the complex FFT.

The purpose of the contrast filtering step is to identify non-motion signal interferences and remove them, based on the contrast between the positive and negative frequencies of the same absolute frequency. Ideal motion signals are composed of quadrature pairs, so their contrast is close to 1

(reflecting motion frequency that is either only positive or only negative). The contrast of electrical interferences is low (theoretically zero) as they have little phase (not a quadrature signal). Likewise, pseudo-motion signals that are caused by fluctuations of the laser source due to reflections from the surface back into the laser will also have zero phase and ideally zero contrast. The contrast of random noise may be spread randomly between 0 and 1, so the part of noise having very poor contrast can be suppressed, providing additional improvement in the SNR between motion signals and noise. Other possible interferences will also likely have poor quadrature and may be effectively suppressed using the contrast filtering technique. Therefore, the contrast filtering step enables accurate determination of the motion even when noise signals 1204 much larger than motion signals 1206 are present (at frequencies other than the motion signal frequencies).

In some embodiments, the contrast filtering step is applied only to signal levels above a configurable amplitude (for example, at least four times the noise level in a specific FFT bin), in order to prevent suppression of low-amplitude motion signals due to the addition of noise (which will degrade their contrast). Thus, if the signal amplitude is large enough and the contrast between the positive and negative frequencies is smaller than a configurable threshold, the frequency component in this FFT bin is cleared to zero.

The contrast C between signals P and N (representing the non-negative magnitudes of the positive and negative frequency components of a signal) is defined as:

$$C=|P-N|/|P+N|$$

It is evident from the equation above that the contrast of pure positive (N=0) or pure negative (P=0) signal frequencies will have a value of 1, while the contrast of pure interferences (P=N) will be 0. Thus, signals may be filtered based on comparison with a minimum contrast threshold:

$$|P-N|/|P+N|<\text{min\_cont}$$

The value of min_cont is determined depending on the quality of the quadrature of the motion signal, which may be less than ideal due to imperfections of the interferometer optics or electronics. For example, min_cont of 0.2 can be used such that the likelihood of discarding motion signals will be very low, while noise and interferences will still be suppressed.

Figure 18:
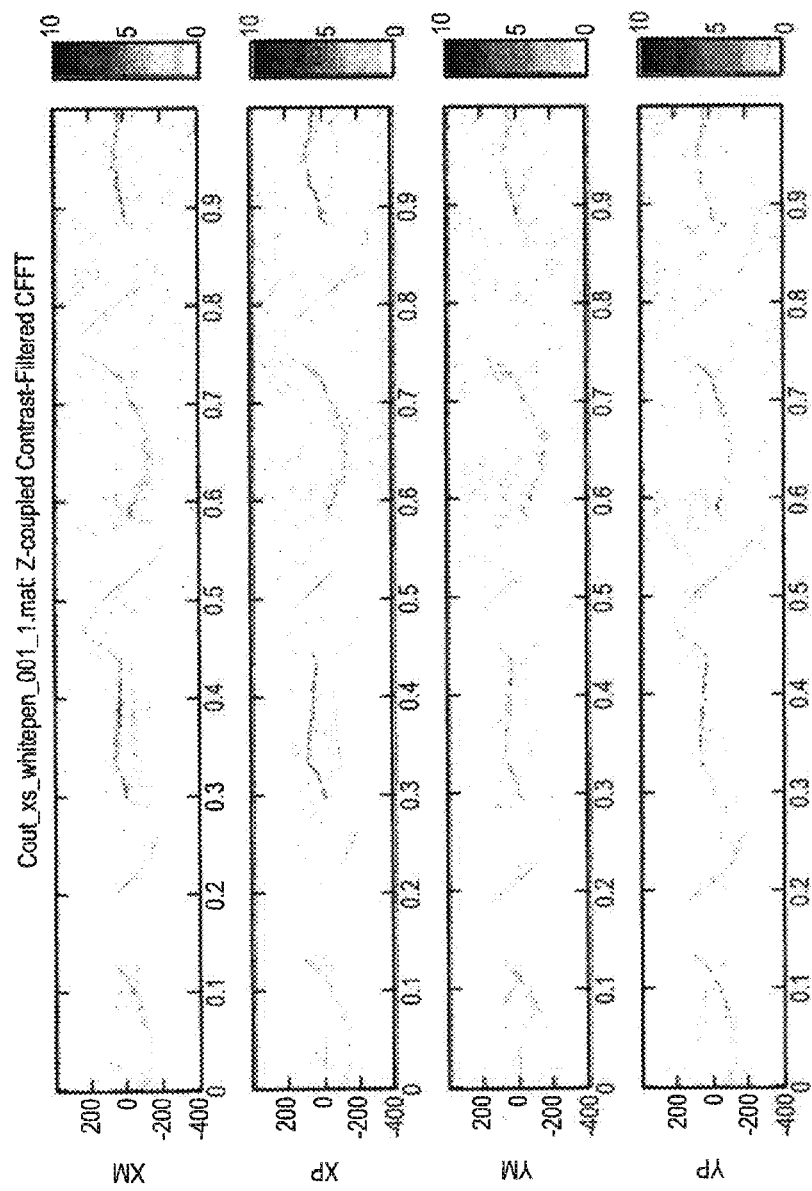
FIG. 18 is an example of the resulting spectrum after applying the contrast filtering step of the exemplary process shown in FIG. 15, consistent with disclosed embodiments.

FIG. 18 shows an example of the resulting spectrum after applying the contrast filtering step. The noise is markedly suppressed relative to the signal. It can also be seen that the 200 kHz and 300 kHz interference signals that are observed in FIG. 17 are effectively removed.

In some embodiments, the ZCP processing part in the exemplary process 1500 may include a weak side subtraction step. Ideal motion signals 1206 are expected to appear in only one side of the spectrum (either positive frequencies or negative). The magnitude of the mirror side therefore represents either noise signals 1202 or imperfections in motion signals 1206. Applying the weak side subtraction step subtracts the weak side of the spectrum (for each FFT bin independently) from both sides, after multiplying it by a configurable factor. Therefore, noise signals 1202 and imperfections in motion signals 1206 may be suppressed, and the tracking performance may be improved. Interferences that may have escaped the contrast filtering step are also suppressed as they are ideally symmetrical around the zero frequency.

The weak side subtraction step may be viewed as another quadrature filter, but while the contrast filtering step is a two-state (or Boolean) operation on each FFT bin, the weak side subtraction step is gradual. The weak side subtraction step may also be effective in rejecting non-quadrature noise signals 1202 and interferences, even if they are larger than motion signals 1206, and at least partly even if they are in the same frequency (in such case, the motion signal may at least partly survive the subtraction operation as it adds only to either the positive or to the negative frequency). Zero and Nyquist frequencies are not treated by the weak side subtraction step as they have no mirror.

Figure 19:
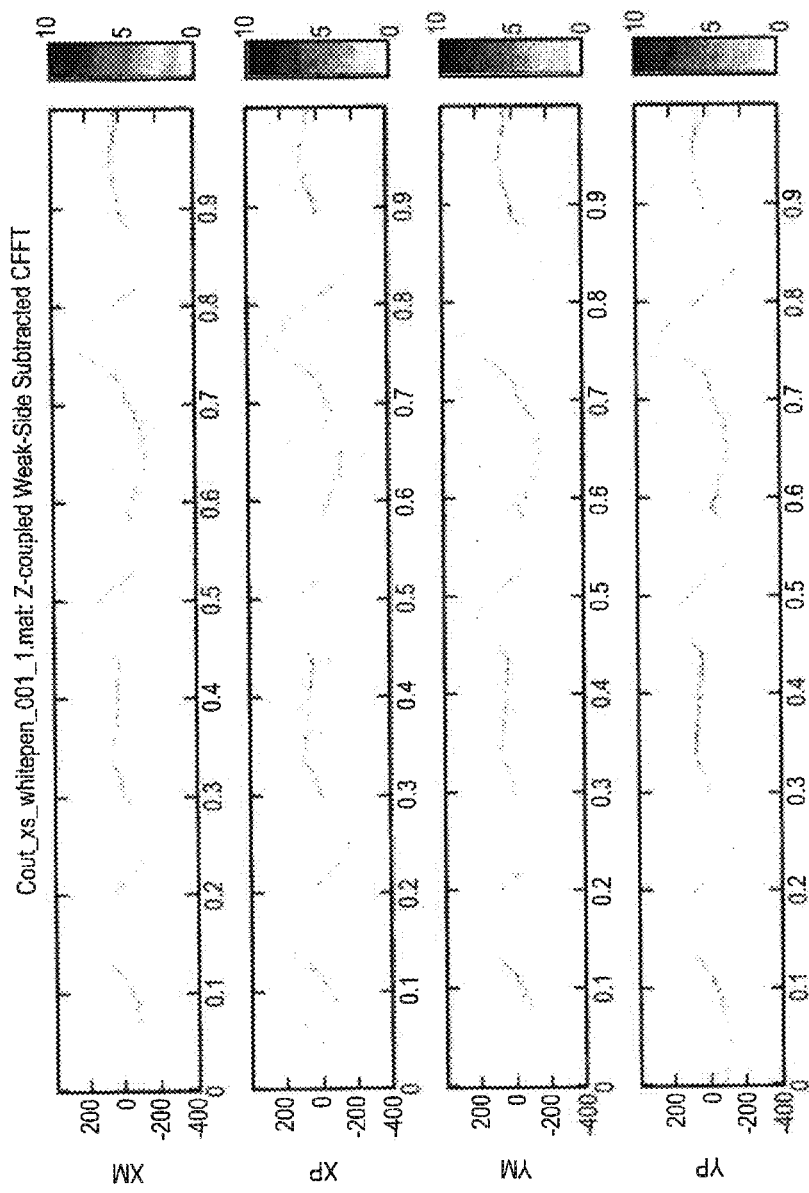
FIG. 19 is an example of the resulting spectrum after applying the weak side subtraction step of the exemplary process shown in FIG. 15, consistent with disclosed embodiments.

FIG. 19 shows an example of the resulting spectrum after applying the weak side subtraction step. It can be seen that the weak mirror traces that are evident in FIG. 18 are effectively removed and the noise level is smaller, while the signal level remains essentially the same, providing an overall improvement in the signal to noise ratio.

In some embodiments, the ZCP processing part in the exemplary process 1500 may include a trellis processing step. Specifically, the trellis processing step in the ZCP part may be a quick-trellis processing step, where the trellis is implemented with practically no latency and with minimal computational resources. The detected signals are generally combined signals of motion, noise, interferences, distortions of the motion signals, and spurious pseudo-motion signals resulting from unwanted reflections. For large magnitude motion signals, detection of the motion signal frequency can be simply the selection of the FFT bin with the largest magnitude. However, the magnitude of motion signals 1206 depends on the surface reflectivity, spacing from the surface, and angle of motion relative to the interferometer. In addition, even when all the above factors are stable, the magnitude of motion signal 1206 changes randomly in accordance to the coherent interference signal of the surface reflection components—so there is always some probability of signal magnitude being smaller than the noise level.

The purpose of the trellis processing step is to track the motion signal frequency (or declare that motion signal is absent) in the presence of noise, distortions and interferences, and to provide additional processing gain on top of the signal processing techniques described above, allowing accurate motion determination even when the signal-to-noise ratio is poor. The principle of the trellis processing step is to use the correlation between the frequencies of motion signals in time. That is, trellis processing step looks for contiguous traces of the frequency along the time domain, which are characteristic for the motion signals. It does so by defining an auxiliary metric function that takes the correlation into account, and at each time interval selecting the frequency bin with the "best" metric. It also makes use of the redundancy of signal pairs, meaning the use of four (or more) quadrature pairs for measuring motion in 3D space (instead of the minimum required three quadrature pairs for 3D motion extraction).

In some embodiments, trellis processing steps may be performed both in the ZCP Processing part and in the TM processing part, with some differences between the two occurrences. The general mechanism of the trellis processing steps provides processing gain with minimum latency, which is important for tracking motion signals in implementations requiring closed-loop control, such as in pen or mouse input devices or industrial machine-controlled conveyers. In one embodiment, the ZCP quick-trellis processing step may have substantially no latency, while the trellis processing step in the TM processing part may add a small latency. Additional adaptations to the trellis processing steps (described in detail when discussing the trellis processing step in the TM processing part) may further improve the performance by utilizing unique characteristics of suggested interferometers and their signals: peak-margin weighting, zero velocity node, detector pair redundancy interpolation node, and dead-reckoning node. The trellis processing steps can also be useful in cases where interferometer 200 uses multiple detectors which are not quadrature pairs.

In some embodiments, the ZCP processing part in the exemplary process 1500 may include a step of filtering, inverse FFT, and signal multiplication. In this processing step (which includes several substeps), signals that encode motion in the X-Y plane (decoupled of the motion component along the Z axis) are artificially synthesized from the frequency domain complex signals by the Signal Processing engine.

Initially, a common range of frequencies of interest is selected in the frequency buffers using the tracking results of the quick-trellis processing step, and further filtered around the individual detector-pair selected frequencies within these range of frequencies. Time-domain signals are then reconstructed (or synthesized) from the reduced-size and filtered frequency-domain data by using, for example, inverse FFT. Finally, time-domain X-Y signals, decoupled from Z motion are synthesized.

In an interferometer consistent with the present disclosure, such as interferometer 200, motion along the Z axis is coupled to all the detector pairs, manifested by shifting the frequency essentially identically in all detector pairs. The X-Y signals (decoupled from Z motion) may be synthesized using an operation that is not affected by frequency shift that is common to all the signals. The frequency range of the synthesized X-Y motion is smaller than the frequency range with coupled Z motion (also, the interferometer resolution in Z may be much larger than in X and Y, so the common frequency is often higher than the X-Y related frequencies). These characteristics are utilized to reduce the frequency range of interest in order to reduce the required processing power in later processing stages.

Even when the motion of interferometer 200 is parallel to the surface plane (so there is no Z motion in the surface coordinate system), a tilt between the interferometer and the surface plane may result in Z motion in the interferometer coordinate system, and therefore will cause the motion signal frequencies to be affected by this Z motion. Embodiments of the present disclosure provide effective means to accurately measure motion even when the tilt angle with respect to the vertical is large, for example, larger than about 20° degrees. Sometimes the tilt angle may be limited due to degradation of the motion signals, for example it may need to be smaller than about 70° degrees.

Also, filtering around the detected motion signals 1206 may effectively suppress noise signals 1204 that are outside a narrow range of frequencies around the detected motion signals 1206. These noise signals 1204 may include random noise such as photon noise and amplifier noise, pseudo-motion signals such as caused by unwanted reflections of light (for example into the laser source), and electrical interferences. An additional important feature is that the filtering stage clears away any residual DC and low-frequency components that may be added to motion signals 1206, which is typical for high-speed motion over surfaces with highly-contrasting features (e.g., when moving from a black-colored surface to white-colored surface and vice versa). This step may clean the signal before the non-linear operation of the Signal Multiplication takes place.

Therefore, the step of filtering, inverse FFT and signal multiplication may include a substep estimating the component of motion in the Z axis. One way to estimate the component of motion in the Z axis is using median function that is relatively immune to outliers.

In some embodiments, the step of filtering, inverse FFT, and signal multiplication may include a substep of building a smaller size ("decimated") FFT buffer with the selected and filtered frequencies. The term "decimated" actually means that the time-domain data that is represented by this FFT buffer is decimated. However, the FFT buffer itself is just reduced in size (the number of bins is reduced). The reduction in the number of samples in the time domain is possible because of the reduced bandwidth of the decimated FFT buffer (even when there is a large offset from zero frequency, due to the subsequent signal multiplication operation). Within the selected bandwidth, which may be determined by the median frequency of all detector pairs, further filtering around the specific motion signal frequency in each detector pair may be performed. When the Z-coupled FFT data is copied to the decimated FFT buffer, it is also multiplied by the equalization factor, in order to compensate for the variability of the noise in frequency and within interferometers (the equalization was not applied beforehand to this buffer but to the signal magnitude buffers).

In some embodiments, the step of filtering, inverse FFT, and signal multiplication may include a substep of inverse FFT. The application of substep inverse FFT to the decimated FFT buffer produces time-domain signals which are decimated, commonly-frequency-offset, and band-pass-filtered. These time-domain signals may then be used for the synthesis of X-Y motion-like signals. The return to the time domain before performing the signal multiplication is not mandatory (as the signal multiplication can alternatively be performed in the frequency domain using convolution), but is preferred due to better computational efficiency and simplicity.

In some embodiments, the step of filtering, inverse FFT and signal multiplication may include a substep of signal multiplication. In this substep, signals representing motion purely in X-Y plane in the interferometer coordinate system may be synthesized from the reconstructed time-domain signals after decimation and filtering. This is performed by taking two pairs of complex signals with residual Z motion coupling, and generating one pair of complex signals decoupled from Z motion by multiplying the two pairs of signals as described below. For example, a pair of complex signals with residual Z motion coupling may be signals "x+z" and "−x+z," see the '335 patent for additional information. The term "residual Z motion coupling" is used because the former decimation and filtering around the median frequencies of the four detector pairs, is shifting of the frequency range of interest and is a crude but not accurate-enough decoupling of Z motion, but may serve to decimate the sampling rate correctly in order to reduce the processing load. Also, during motion with high acceleration along the Z axis, the frequency offset due to Z motion is changing within a single buffer and therefore cannot be compensated accurately using a common frequency shift, but it may still be decoupled effectively by the signal multiplication method.

Using the following signals for detector pairs along axis R, where R stands for either X or Y, P and M stand for "Plus" and "Minus" frequencies, and H and V mark real and imaginary components of the signal:

$PH=\cos(r+z); PV=\sin(r+z)$ $MH=\cos(-r+z); MV=\sin(-r+z)$

Therefore, using simple trigonometric equations $$PH \cdot MH + PV \cdot MV = \cos(r+z) \cdot \cos(-r+z) + \sin(r+z) \cdot \sin(-r+z) = \cos(2r)$$

$$PV \cdot MH - PH \cdot MV = \sin(r+z) \cdot \cos(-r+z) - \cos(r+z) \cdot \sin(-r+z) = \sin(2r)$$

The signal multiplication thus results in quadrature signal pair that encodes the motion component along R (either X or Y), with doubled sensitivity to R motion and decoupled from motion components orthogonal to the R direction (i.e., decoupled from Z motion).

Figure 20:
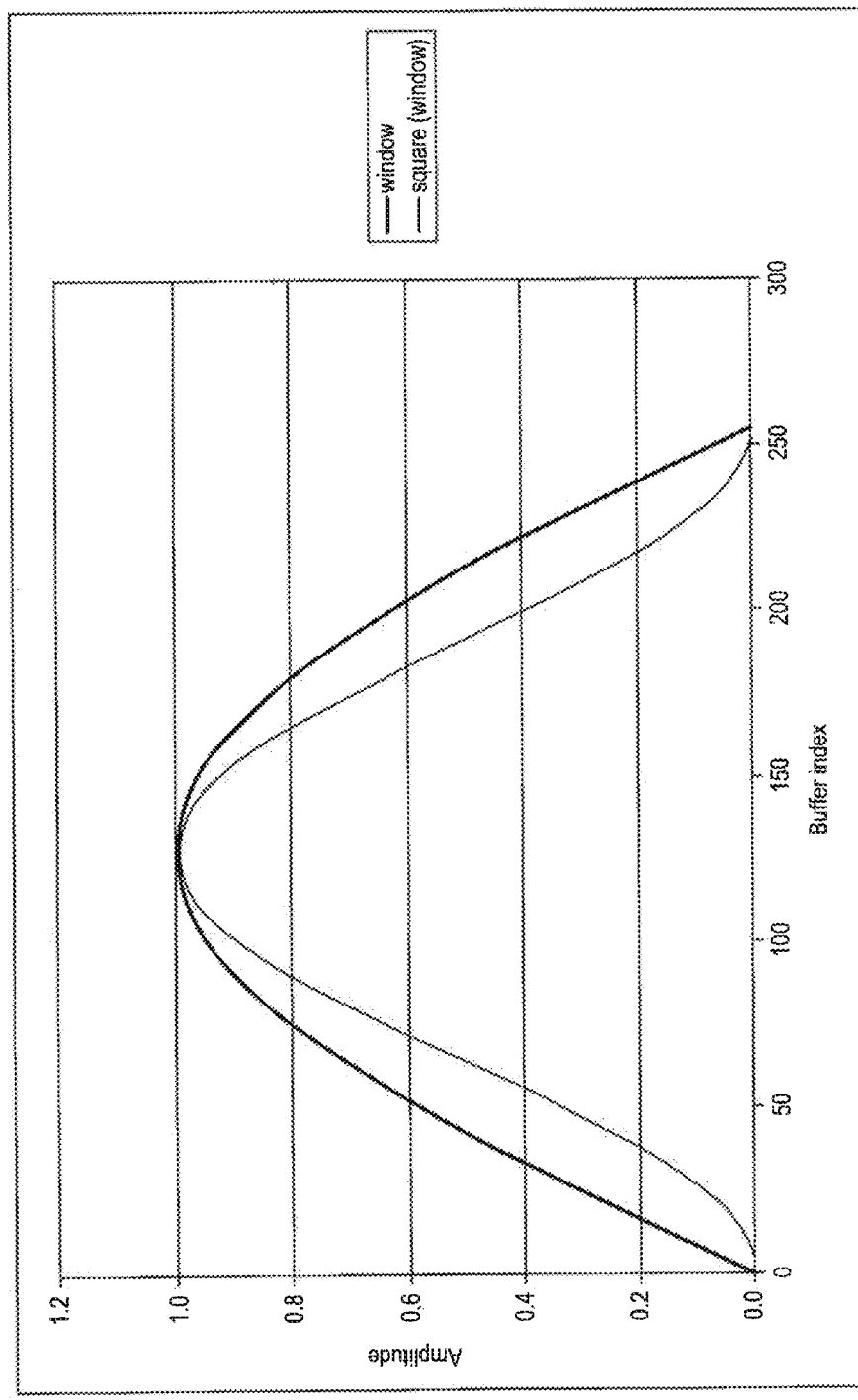
FIG. 20 is an example of the windowing function applied on time-domain signals, consistent with disclosed embodiments.

When using the windowing step on the input signals buffer, the Z-coupled signals may be multiplied by the windowing function (half cycle of sine wave) before the FFT is performed. This amplitude modulation is reconstructed in the output of the inverse FFT after the decimation and filtering. Due to the signal multiplication, the modulating function may be converted to the square of a sine wave with offset of 0.5, as shown in FIG. 20.

Figure 21:
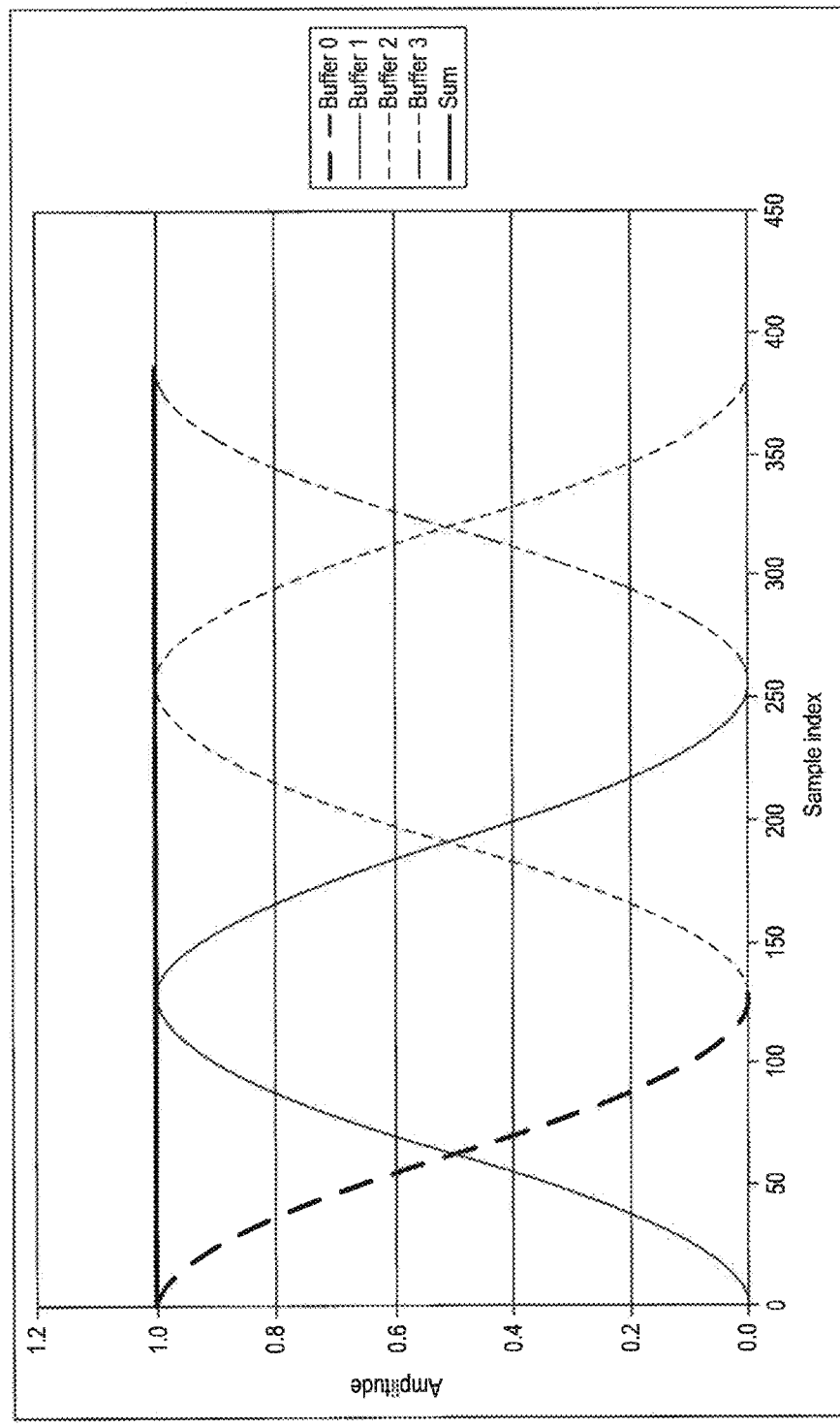
FIG. 21 is an example of the summation of overlapping sections on time-domain signals, consistent with disclosed embodiments.

In some embodiments, this amplitude modulation would generate sidebands in the FFT if time-domain signals are simply concatenated to form longer buffers, as planned during the multi-rate processing in the TM processing part. However, this example is where the overlapping of the buffers in the windowing mode is most useful. Summation of the overlapping sections results in nearly unity amplitude gain factor, as shown in FIG. 21. The small deviation from perfect unity factor is the result of using a windowing function that is zeroed on both index 0 and 255 and not on index 0 and next buffer start (256), but this has little effect on the subsequent signal processing.

Thus, in windowing mode, to perform the summation of the overlapping multiplied signals, the first half of the new buffer is added to the last half of the preceding buffer, and the last half of the new buffer is concatenated to the end of the previous buffer. If a buffer is complete and ready for processing (i.e., only after the addition of the first half of the new buffer), it can be processed. The stage before the synthesized X-Y signals are ready for the TM processing part is to take the square root of the multiplied signals, so that they have a linear relation to the original signals, and represent amplitudes and not power. In non-windowing mode, new buffers of multiplied X-Y signals are just concatenated to the previous buffers, after taking their square root.

In both the windowing mode and non-windowing mode, the TM processing may use overlapping buffers. Thus, in some embodiments, every time a TM buffer is full, the second half of it may also be used as the first half of the next buffer, as they overlap by half a buffer. The use of overlapping buffers is beneficial to give more or less equal weight to any data point in a buffer, whether it is close to an edge of a buffer or close to the center of a buffer.

As mentioned above, exemplary process 1500 may be carried out in two major parts. The second part is the TM processing part that is designed for high accuracy tracking with wide frequency dynamic range. The required motion speed range for several applications (for example, for a digital pen and mouse) is between a fraction of 1 mm/sec and more than 1000 mm/sec. That is, more than three orders of magnitude. An efficient FFT may use 256 points to analyze the motion signal frequency. Using more points in the FFT will increase the dynamic range of frequencies, but at the expense of greater sensitivity to other factors, such as accelerating motion and motion signal phase changes within the FFT buffer. Therefore, a single FFT processing stage may provide only about two orders of magnitude of frequency determination. Multi-Rate Processing (MRP) technique is used as part of the TM processing to extend the dynamic range of motion signal frequencies to the desired range of more than three orders of magnitude.

In addition, in MRP, the same signal data is often processed in more than one of the multi-rate stages, so that if the signal is temporarily poor in a fast stage, it may possibly be recovered due to processing in one of the subsequent processing stages, providing more robustness of the motion tracking to occasional loss or degradation of motion signals 1206. In some embodiments, the MRP is based on a succession of decimation steps of the signals in the time domain, which produces a series of decreasing-bandwidth buffers. Each decimation step includes filtering of the high frequency components by averaging samples and downsampling the result. Care must be taken to suppress aliasing on the one side, while not suppressing the lower frequency components too much on the other side.

The processing of each of the MRP stages may be similar (see FIG. 15), except for possible changes of optimal parameters. After performing all the processing steps including the trellis processing step for each of the multi-rate stages, a decision is taken to determine which of the stages best represents the motion (by its associated frequency). In some embodiments, the stage selection logic is based on the detected frequencies and the trellis metric results of the stages, with priority to stages representing faster possible motion if the detected signal frequency is large compared with the range of later stages. Priority to faster motion stages may be given since later stages cannot deal with signal frequencies above their range. The selected stage may be chosen as the earliest stage suitable amongst any of the axes, and this stage is then used for both axes. This logic results in better response to changes in velocity than independently choosing the stage for each axis. The MRP technique can also be useful in cases where interferometer 200 uses multiple detectors that are not quadrature pairs.

In some embodiments, the TM processing part in the exemplary process 1500 may include a delay Z motion step. The Z motion may be determined in the ZCP processing steps, as Z motion resolution is much higher than the transverse motion resolution. However, the transverse motion is determined in the TM processing, and therefore is subject to larger latency. Therefore, the Z motion is synchronized to the transverse motion using delay buffers.

In some embodiments, the TM processing part in the exemplary process 1500 may include a time-domain windowing step. The purpose of this step is to suppress edge effects of the FFT. In this step, each buffer of FFT buffer samples may be multiplied by a cosine windowing function. Optional DC subtraction can be applied before the windowing weighting. The use of overlapping buffers compensates for the weighting factor of the windowing, giving each data sample roughly equal contribution to the motion determination, irrespective of its position relative to the FFT buffer edges. The elements that are given high weight in one buffer have low gain in the other and vice versa.

In some embodiments, the TM processing part in the exemplary process 1500 may include a complex FFT step. The complex FFT step is applied on the time-domain buffers corresponding to the TM synthesized and decimated signals, arranged in "complex" pairs (one pair for each axis X or Y). Like in the case of complex FFT step in the ZCP processing part, using complex FFT on the synthesized signals in the TM processing part may provide a considerable processing gain for finding the synthetic motion signal frequencies relative to other processing methods. In one example, the FFT buffer size may be 256 points, but can also be smaller or larger, depending on the application characteristics and implementation considerations. For example, the FFT buffer can be 32, 64, 128, 512, or 1024 points. In cases where interferometer 200 uses multiple detectors which are not quadrature pairs, Real FFT or other transformations for real (non-complex) data may be more preferable or computational efficient than complex FFT.

In some embodiments, the TM processing part in the exemplary process 1500 may include a Short-time Fourier Transform (STFT)-domain smoothing step. The STFT-domain smoothing step may improve the SNR by averaging each of the spectrum bins along the time axis for a given length of time. For example, in the case of motion at constant velocity, the noise will be flattened while the motion will generate a peak in amplitude above the noise at the motion frequencies. In such cases, even motion signals 1206 much smaller than the typical noise signals 1202 may be detectable (depending on the smoothing time). This method may be particularly effective in combination with the step of trellis processing. The length of the smoothing buffer may be determined as a trade-off between SNR improvement, latency, and agility to motion changes. Providing processing gain with minimum latency may help in tracking motion signals in implementations requiring close-loop control. For digital pen and other applications, for example, the length of the STFT smoothing buffer is selected to add typical latency of 1 mSec and up to about 10 mSec, providing a favorable balance between processing gain on the one hand, and agility to acceleration and latency to the user. In addition, the smoothing can be performed using many weighting functions, such as triangular, cosine, or rectangular functions. A triangular function may be preferable as it is smoother than rectangular (leading to smaller effective latency) but simpler to implement than cosine. Other smoothing techniques can also be implemented. The STFT-domain smoothing step can also be useful in cases where interferometer 200 uses multiple detectors which are not quadrature pairs.

In some embodiments, the TM processing part in the exemplary process 1500 may include a trellis processing step. This step may help determine the most probable frequency of the motion signal in each time slice of the FFT buffer, for each of the detector pairs (i.e., for each axis at TM processing part). Ideally, the motion signal follows a relatively slowly-varying and continuous frequency trace. One method to determine the motion signal frequency is by selecting the peak amplitude in the FFT buffer. However, in practice, there may be limitations to choosing the peak amplitude, such as, for example: when there is no motion, noise would be selected, causing jittery erroneous motion; for weakly reflecting surfaces or large spacing between the interferometer and the surface, the noise amplitude is often larger than the motion signal, even after utilizing the processing gain of the FFT and other SNR improvement techniques described earlier, residual spurious signals or interferences may occasionally have larger amplitude than the motion signal. A simple "strongest bin" selection mechanism will therefore be prone to occasional irregularities, causing large tracking errors; and the statistical nature of the diffuse reflection from the surface, as well as occasional large motion acceleration, broaden the spectrum of the motion signal, so the bin with maximum amplitude does not always coincide with the frequency that corresponds to the actual motion velocity.

Thus, the information in the FFT buffer over time is a manifestation of the hidden actual motion. The trellis processing step may include an adaptation of the Viterbi Algorithm, which is designed for similar tasks in the field of communication. The logic behind the trellis processing as applied in process 1500 will be explained below, by considering the difficulties it solves. The trellis processing step can also be useful in cases where interferometer 200 uses multiple detectors which are not quadrature pairs.

Figure 22:
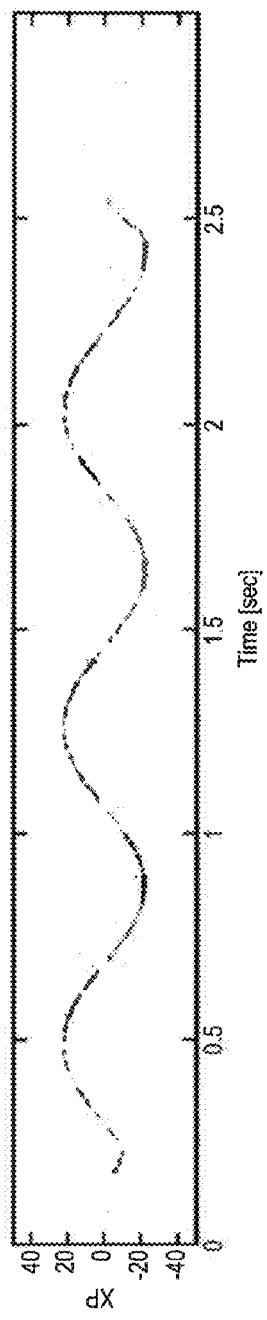
FIG. 22 shows a FFT buffer resulting from interferometer tracking on a smooth surface in a circular motion, consistent with disclosed embodiments.
Figure 23:
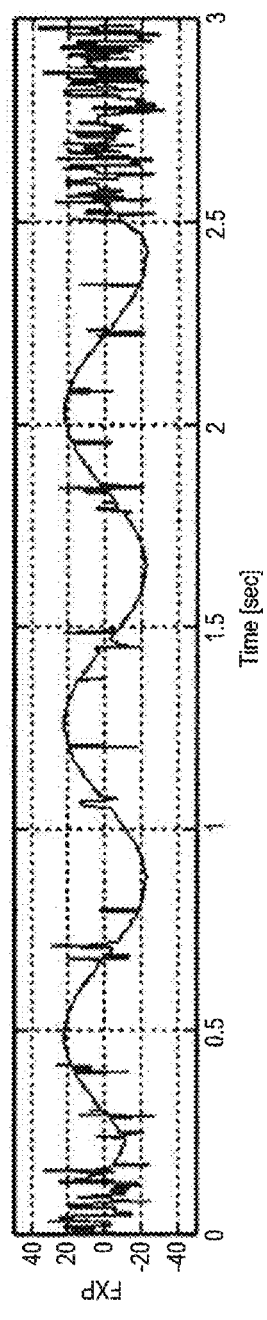
FIG. 23 shows the FFT buffer of FIG. 22 after applying a simple peak-amplitude selection, consistent with disclosed embodiments.
Figure 24:
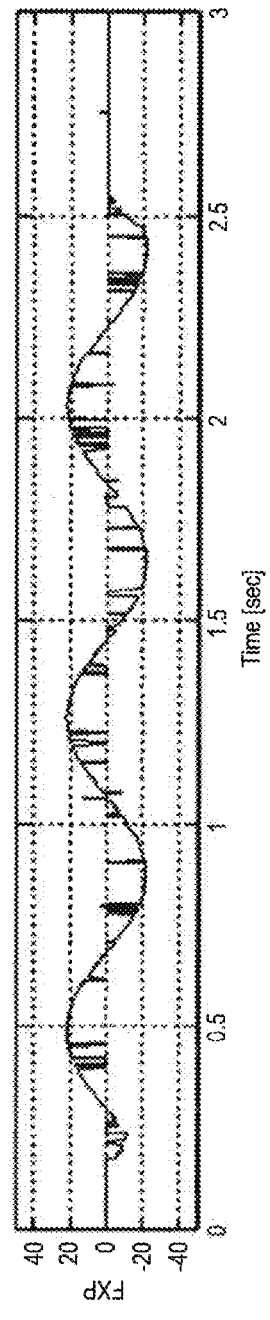
FIG. 24 shows the FFT buffer of FIG. 23 when a threshold of minimum required signal amplitude is used, consistent with disclosed embodiments.

One way to estimate the motion signal frequency is to find the peak in the FFT buffer. FIG. 22 shows the FFT buffer resulting from an interferometer tracking on a smooth surface (e.g., glass) in a circular motion. As shown in FIG. 23, simple peak-amplitude selection may result in large and frequent errors when there is no motion (Time<~0.2 sec and Time>~2.6 sec), and occasional errors during the circular motion. In order to avoid selection of noise as motion, a threshold can be set, such that noise would not be considered as motion. FIG. 24 shows the result when using a threshold of minimum required signal amplitude. The errors due to noise may be reduced, at the cost of additional motion signal that may be lost (e.g., time just before 2.0 sec).

As mentioned above, the trellis processing step may include an adaptation of the Viterbi Algorithm. The Viterbi Algorithm may be based on the following assumptions:

For each time slice, each of the FFT buffer bins represents a potential state (or node) of the hidden real motion signal.

The likelihood of a node to correspond to the hidden real motion state increases with the amplitude of the FFT buffer at this node.

The likelihood of a transition from one node to the next node (as time advances) decreases as the difference between the node frequencies increases. This assumption is based on the expectation of generally contiguous and relatively slowly changing nature of motion velocity with time (although there are exceptions, like starting to track when the interferometer approaches from high above the surface, and when there is a very high acceleration).

The most likely node at each time slice is determined based on past information, and may be based on information at a later time (up to an allowed output latency).

Figure 25:
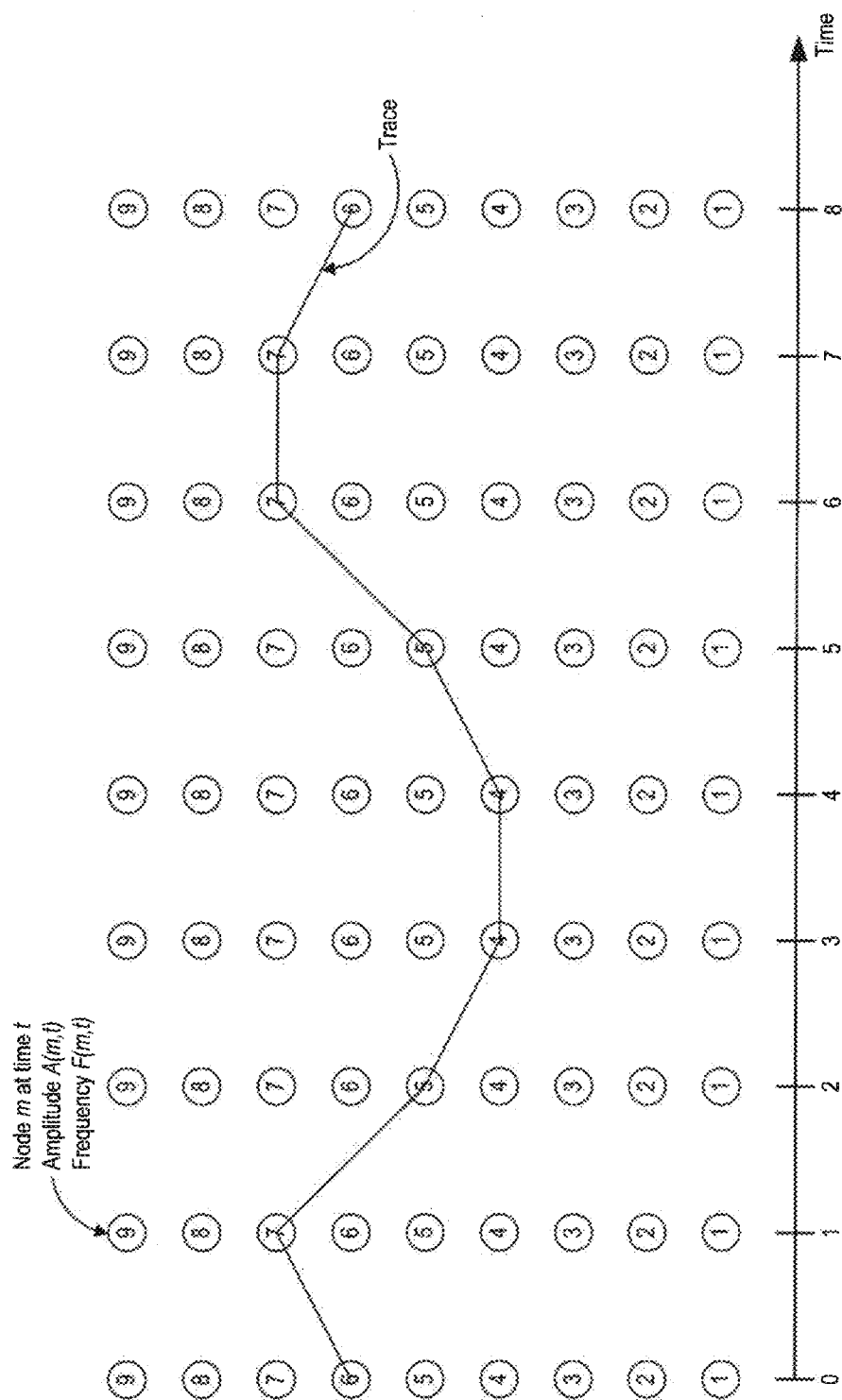
FIG. 25 is an illustration of a section of Trellis graph for an FFT Buffer, consistent with disclosed embodiments.

The set of nodes over time may form a trellis graph. A succession of nodes within the trellis graph represents a possible trace of motion. An example for a section of a trellis graph for the detected signals is presented FIG. 25. The likelihood of a particular trace is represented by the value of a metric at the end node of the trace. In the most general case, the best trace should be selected amongst all possible traces. For example, if for any time slice there are N nodes, and there are M time slices of interest, then there are a total of N^M possible traces. Calculating a metric for each of the possible traces in the graph for a reasonable extent of time is not practical for the problem at hand, and also not required. The Viterbi Algorithm is an efficient method for finding the most likely trace, enabled using a suitable kind of metric and selection method. The Viterbi algorithm includes the option of "back-tracking" from a good signal to determine the best path. The amount of back-tracking steps dictates the added latency due to the trellis processing. When no back-tracking is used, the added latency is negligible (such as in the case of the quick-trellis performed in the ZCP processing part order to reduce latency and minimize processing resources). However, a back-tracking period of about 15 mSec enables better filtering of noise, spurious signals, and interferences, at the expense of relatively small latency. Achieving good tracking accuracy with small latency is particularly important in many applications such as input devices, as well as industrial closed-loop-control machines.

In principle, the number of possible states is equal to the number of FFT bins (256 in the examples above). However, this requires unnecessarily high processing power and large memory. Significant saving of resources may be obtained by selecting a number Trls_N of the largest amplitude points and define the trellis by them. Increasing the number of points improves the tracking for weak motion signals, but rapidly increases the required processing power (roughly as the square of the number of points). In order to further minimize the number of Trellis nodes (and so utilize the available processing power efficiently), for each selected large-magnitude node, the magnitudes of adjacent nodes within a configurable frequency band around the selected peak may be reduced according to a configurable factor. This way, additional nodes which are very close to an already selected peak in magnitude may not add a likely important alternative trace, while weaker but more distant nodes may be more important as candidates in the search for the "most likely trace."

Consistent with the present disclosure, the motion tracking engine may include four pairs of light detectors 340, each corresponding to a component of the motion in 3D space linearly independent of any two of the other components. For strong motion signals 1206, a selection of any three of the pairs is sufficient to decode the 3-D motion. Therefore, the four components of motion may include a redundancy wherein the frequency of an "excluded" signal pair can be inferred from the frequencies of the three "selected" signal pairs. This redundancy may be used to generate additional nodes in the trellis graphs (also noted as "interpolated nodes"). Redundancy and interpolated nodes may be used in the ZCP processing part, since the TM processing part may not include redundant synthesized signal pairs. However, in some applications redundancy may also be desirable also in TM processing step. In such cases, signal multiplication step may include generating more than one quadrature signal pair per axis. For example, up to six possible combinations of any two quadrature signal pairs from four pairs of light detectors 340 in the ZCP processing part can be used to synthesize one signal pair for TM processing part, providing considerable redundancy in TM processing part, in exchange for an increase in computational resources, complexity and load.

While interferometer 200 may be used to measure 3D motion, with a redundancy of one pair of light detector 340, the same principles as described herein can be generalized to other interferometers having more than four pairs of light detectors, or measuring motion in less than three spatial dimensions. In the more general case, whenever the number of the pairs of light detectors is larger than the number of degrees of freedom of motion of the interferometer, redundancy may be used to improve the tracking performance. For example, an interferometer for measuring motion in two dimensions may have at least two pairs of light detectors, but may use redundancy with additional detector pairs to increase the measurement accuracy and robustness. This may be useful for various applications requiring highly accurate relative motion determination, such as in conveyer belts in production lines and in other industrial uses which often require motion measurement accuracies, for example, better than 1% or better than 0.1% for motion of 100 mm. In such cases, the degree of redundancy can be optimized according to the required performance and the system cost and complexity limitations: utilizing the redundancy of detector pairs in the Trellis Processing improves the tracking of weak motion signals, and can compensate for temporary (for example 1 mSec or 10 mSec) and in some cases even permanent loss of motion signals 1206 in any one of the pairs of light detectors 340. For each of the pairs of light detectors 340, an additional node in its trellis graph may be added as follows, for example: the nodes with the maximum amplitudes in each of the other three pairs are selected; the frequency of the additional node in the excluded pair is determined based on the frequencies of the selected nodes of the other pairs, using the fact that they all measure the same motion in 3D space; and the amplitude of the additional node may be determined as the minimum amplitude of the selected nodes of the other pairs.

Figure 26:
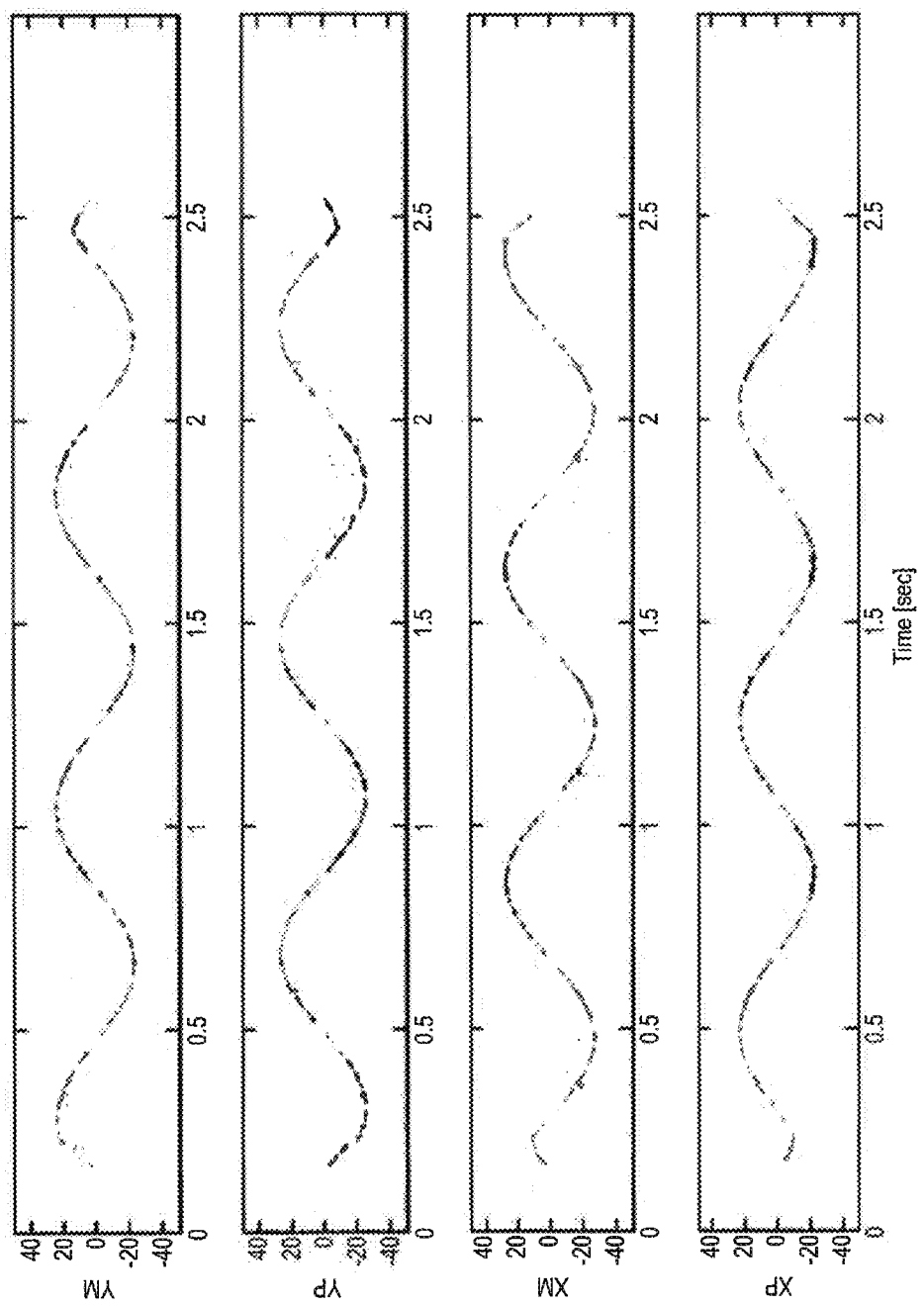
FIG. 26 shows the FFT buffer input to trellis processing when circular motion is applied, consistent with disclosed embodiments.
Figure 27:
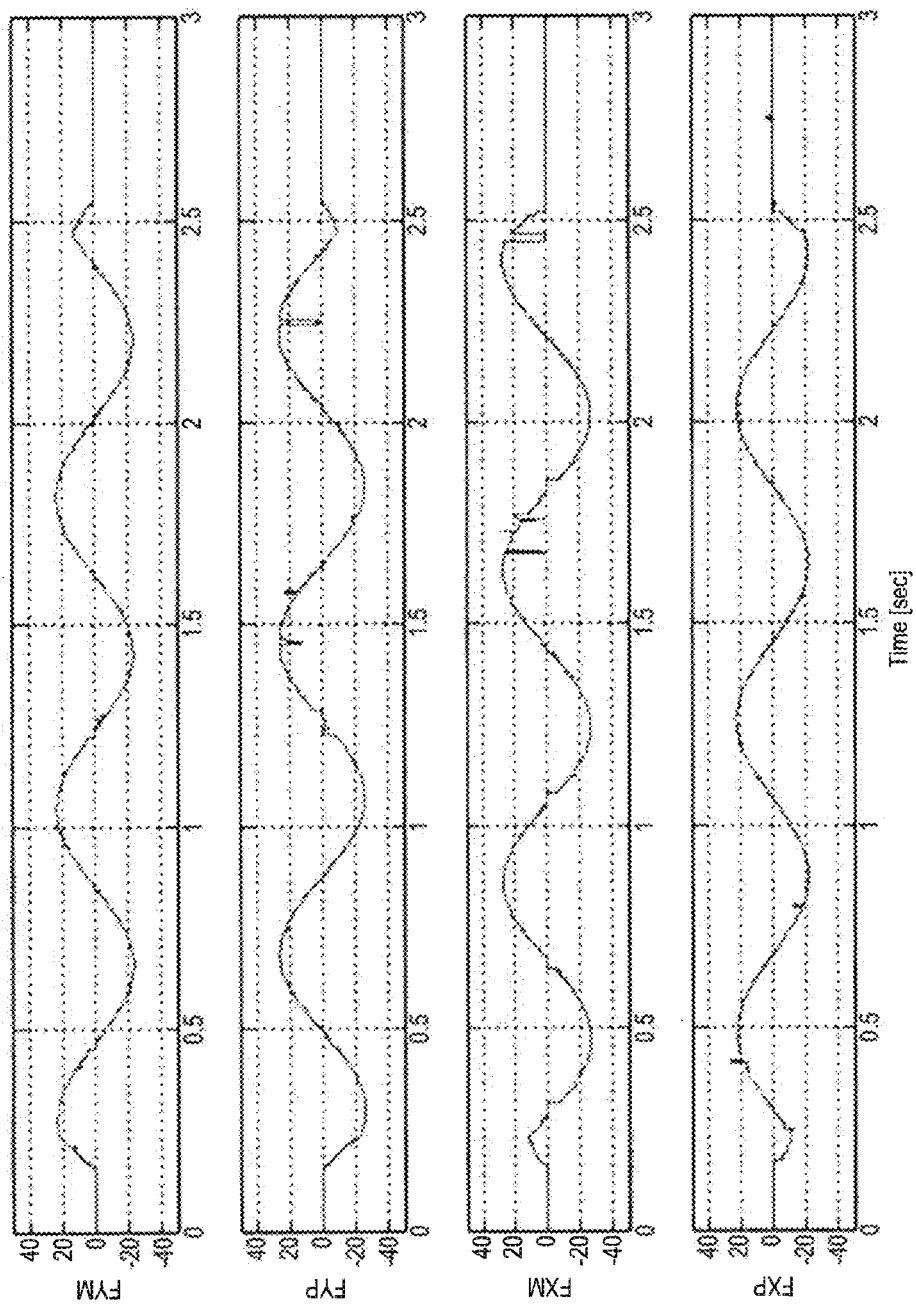
FIG. 27 shows the FFT buffer illustrated in FIG. 26 after applying trellis processing without detector-pairs redundancy.
Figure 28:
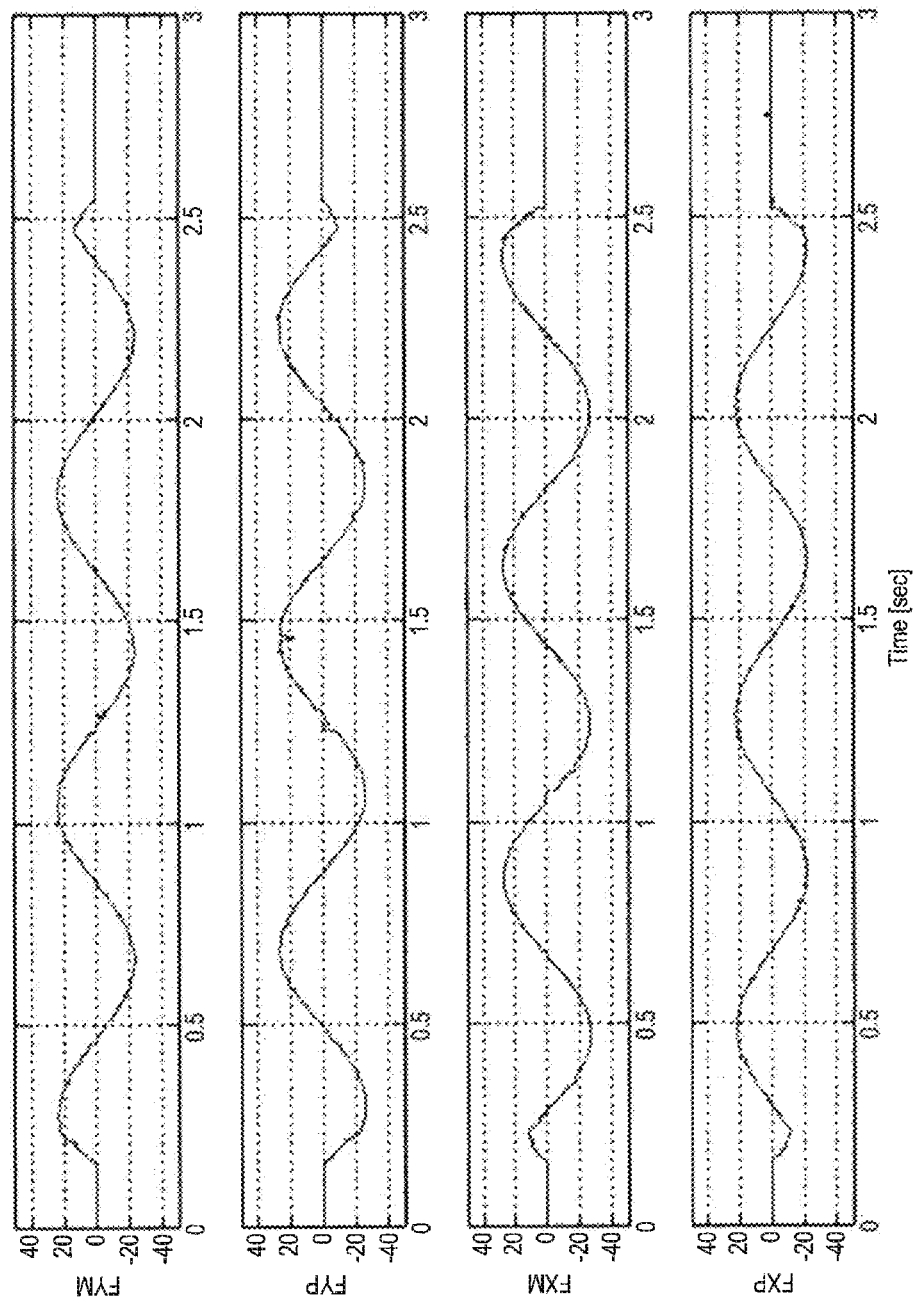
FIG. 28 shows the FFT buffer illustrated in FIG. 26 after applying trellis processing with detector-pairs redundancy.

FIG. 26 shows an example of the four pairs of the input FFT buffer to the Trellis algorithm. The output of the trellis processing step without and with the use of Detector Pairs Redundancy (DPR) is presented in FIG. 27 and FIG. 28, respectively.

While one method to exploit detector pair redundancy for improving motion tracking is described above, other methods may also be preferred in some applications of interferometer 200. For example, if an interferometer with N detector pairs is used to measure motion in M dimensions (N>M), then at each processing interval M detector pairs with best SNR can be used to determine the motion. Or, any number of detector pairs that is at least M can be used, or multiple processing schemes can be performed in parallel, each with a different selection of at least M detector pairs, and the resulting motion measurement is calculated based on the results of the multiple schemes (for example by averaging, median, weighting, or any other decision logic). These methods are particularly useful to compensate for long-term or permanent loss of signal in redundant detector pairs.

In some embodiments, the exemplary process 1500 may include a step for selection of multi-rate stages. As illustrated in FIG. 15, in some embodiments, when the TM processing part is applied, the multi-rate stage which is likely to provide the most accurate estimation of motion rate is determined. The selection of the stages from which to take the motion information may be based on a set of heuristic rules and metrics. The stages are tested from large to low frequency range. In general, larger-range stages are preferred unless there is a reason to prefer the smaller-range stages. One reason to prefer the smaller-range stages may be that the detected frequency is too small, compared to the stage range, to be reliable or accurate. Another reason to prefer the smaller-range stages may be that the metric and frequency of the detected frequency in the smaller-range stage are sufficient.

The processing of each of the MRP stages may be identical, except for changes of optimal parameters. The stages are interleaved such that the processing of a particular stage takes place when the stage's decimated buffer is ready, and also such that the processing load is uniform in time. The highest rate stage is processed on every step, but only one (or zero) decimated rate stages are processed in parallel to it. This may be established by introducing a suitable "phase" to each of the MRP stages at "time zero."

Figure 29:
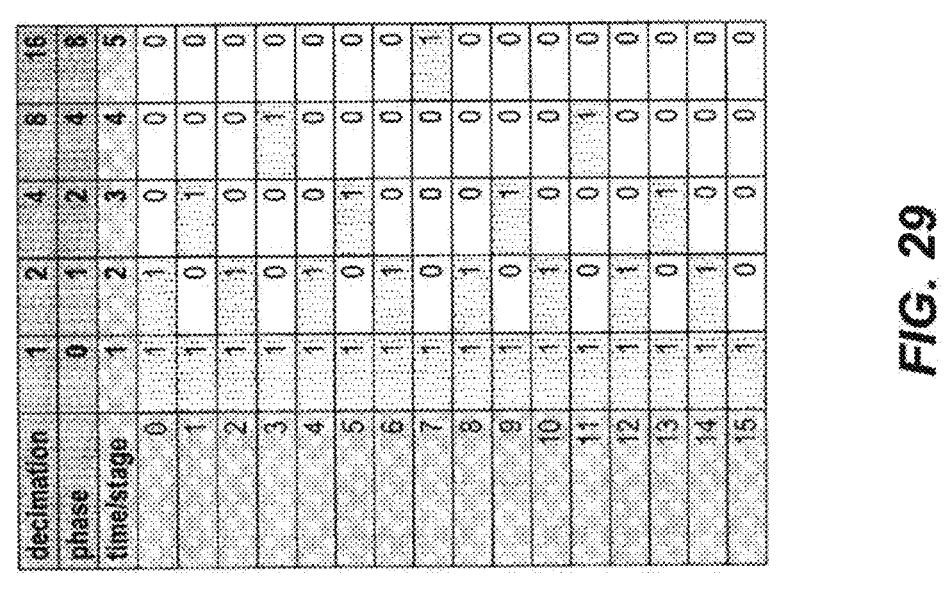

FIG. 29 shows the interleaving principle for decimation of a factor of 2 between successive multi-rate stages. The highlighted cells indicate buffer-ready events. The non-decimated buffer (highest rate) may be ready on each time slice (indicated in the leftmost column, with phase 0). The buffer of the next stage may be ready once per two slices, and the n-th stage is ready once per $2^{(n-1)}$ time slices. When the start of each stage time buffer is set to $2^{(n-2)}$ (except for stage 1), the buffer-ready events are evenly distributed such that the processing load is uniform (except for a residual vacancy due to the finite number of stages as in the last row 15 in FIG. 29).

After performing all the processing steps up to the trellis processing for each of the multi-rate stages, a determination is made as to which of the stages may best represent the motion (by its associated frequency). For each candidate stage, the detected frequencies of a few of the previous (faster) stages may be compared with the candidate stage frequency range (for each of the detector pairs independently). If the faster stage frequencies are too high, the use of the slower stage may be prohibited (as they cannot possibly detect such frequency and would therefore provide meaningless information). In some embodiments, the transition to the candidate stage may be possible if at least one of the following conditions is satisfied: the faster stage detected frequencies are below a predetermined threshold, e.g., a maximum "reliable" frequency; and the candidate stage metric result is large enough compared with the faster stage metric results, and the candidate stage frequency is large enough compared with the faster stage frequencies.

The incremental motion in 3D is converted from the interferometer's coordinate system to the surface coordination system. In general, interferometer 200 can be tilted with respect to the surface plane, and also rotated and flipped (i.e., one with a "right-handed" coordinate system and the other with a "left-handed" coordinate system). For use as part of a writing instrument, such as a digital pen, the tilt of the interferometer may be continuously estimated when the tip indicates that the tip touches the surface. Then, the motion is projected on the surface coordinate system using the estimation of tilt. Rotation and flipping are applied according to fixed user preferences or calibration. When the tip is lifted long enough above the surface, the conversion from translation in mm to pixel output may be turned from a fixed linear scale to acceleration ballistic function, to provide more convenient cursor control. While the incremental motion processing is described herein in connection to a digital pen product, it may be used in other applications and products that use interferometers similar to interferometer 200. The signal processing engine may convert the synthesized transverse motion signal frequency selected for each axis to velocity (e.g., in mm/sec), according to a fixed scaling ratio.

In some embodiments, the transverse motion velocities are translated to spatial dimensions (e.g., mm). The Z motion is already saved in spatial dimension, and only needs to be synchronized with the correct latency. Thereafter, the interferometer coordinate system tilt with respect to the tracked surface may be estimated. Estimation of the tilt and compensating for it are useful both as information that is characteristic to the user (for example in signature-authentication application), and in order for the output motion to be independent of the interferometer tilt and have equal scale in all directions of motion along the surface plane. Estimating the tilt and compensating for it using the interferometer motion signals are important since other means for measuring tilt (e.g., using an accelerometer that measures the direction of gravity) may not take into account a possible tilt of the surface relative to gravity and motion not relative to the surface (such as when the device in a moving vehicle), thereby degrading the system performance instead of improving it.

In order to estimate the interferometer tilt angles relative to the surface plane, the angle of the surface normal (N) in the coordinate system of the pen may be estimated when the pen touches the surface. This is made possible because when the pen touches the surface, it by definition moves at constant Z in the coordinate system of the surface, so Z motion (measured in the interferometer's coordinates) in this state is associated with the tilt of the pen coordinate system relative to the surface. To estimate the tilt, the tracking should be long enough and also substantial enough in distance. Otherwise, the tilt estimation will not be reliable.

The tilt estimation results in the representation of a unit vector normal to the surface plane, in the coordinate system of the interferometer. To find this unit vector, a control loop mechanism is used. For each incremental motion along the surface plane, the dot product (or scalar product) of the motion vector and estimated surface normal unit vector is checked. When the estimated surface normal unit vector is indeed orthogonal to the motion vector, the dot product will be zero. A non-zero dot product can thus be used to rotate the surface normal unit vector towards the correct orientation relative to the interferometer axes.

Each incremental motion may provide potential corrective information in the plane that is common to the surface normal unit vector and the incremental motion vector, but not outside of this plane. Therefore, an estimate of the interferometer tilt may require substantial motion in two dimensions on the surface (that is, not along only one line on the surface). Following the determination of the surface normal unit vector, the determination of the unit vectors of the transverse coordinates is made, where they are placed such that their projections onto the interferometer transverse coordinates are symmetrically distributed near the interferometer's transverse coordinates (since the projections of the surface transverse axes onto the interferometer transverse axes are not orthogonal due to the tilt). Regardless of whether the stylus 105 is touching the surface or not, the motion is projected from the interferometer's coordinate system to the surface's coordinate system using the tilt estimation to represent the motion in the surface coordinate system.

In some embodiments, the signal processing engine may convert the measured incremental motion from special fixed coordinates (e.g., mm) to pixels. This conversion uses a fixed ratio (or resolution) when stylus 105 is touching the surface. After long enough time where stylus 105 is not touching the surface, ballistic acceleration is gradually applied, providing better control for the mouse-like control function. This automatic transition from the fixed scale to the agile ballistics scale may be useful when using stylus 105 for both writing and drawing (where fixed scale is preferable) to device control functions (where ballistics provides better user experience). In addition, the rotation and flipping of the axes according to user preferences and calibration may be applied, to take into account the specific way stylus 105 is held in the hand and particularly its rotation with respect to the intuitive transverse axes as perceived by the user.

Consistent with some embodiments, stylus 105 may apply a user calibration process. The user calibration is a procedure that may generally be implemented externally to the signal processing engine. In this mode, user 100 may draw one or more lines in a known orientation with respect to the surface, for example, a line along the user subjective "X-axis" along the surface. The stylus 105 motion output is not sent to paired device 115, and is instead accumulated as long as the tip is detected as touching the surface (that is, the incremental motion when the pen is not touching the surface is ignored). At the end of the calibration, the rotation angle between the signal processing representation of the surface transverse axes and the user subjective axes is calculated. Thereafter, an inverse rotation matrix can be applied on the signal processing motion output signals to align them to the user subjective axes. In some embodiments, the calibration mode can have an optional input to take into account the line direction (for example +X if the user is right handed or −X if the user is left handed), or can work independently of this information if the rotation angle between the axes is assumed to be within certain limitations (e.g., ±45°).

In accordance with a disclosed embodiment, an interferometer is provided (e.g., interferometer 200). The interferometer may include a body, a light source located within the body and configured to project a coherent light along a projecting path to an opposing surface exterior to the body, a plurality of pairs of light detectors located within the body and configured to measure reflections of the coherent light, and at least one processor. The at least one processor may be configured to receive data input from the pairs of light detectors. The at least one processor may be also configured to apply a plurality of quadrature pair filters to the data input, wherein each quadrature pair filter is associated with a differing pair of light detectors. The at least one processor may further be configured to refine the data input by removing non-quadrature signals from the data input, and to determine relative motion between the body and the opposing surface based on the refined data input. In addition, the at least one processor may remove non-quadrature signals only above a predetermined amplitude.

In related embodiments, the refined data input has higher signal-to-noise ratio than the data input. The data input may include interfering signals caused by unwanted reflections of light, and at least some of the interfering signals are non-quadrature. Alternatively, the data input may include interfering signals caused by electrical noise, and at least some of the interfering signals are non-quadrature. Alternatively, the data input may include interfering signals caused by fluctuations in light source illumination intensity, and at least some of the interfering signals are non-quadrature. Alternatively, the data input may include motion signals and interfering signals, and frequencies of the interfering signals differ from frequencies of the motion signals. Alternatively, the data input may include motion signals and interfering signals, and a typical amplitude of the interfering signals is larger than a typical amplitude of the motion signals.

Consistent with another disclosed embodiment, an additional interferometer is provided. The interferometer may include a body, a light source located within the body and configured to project a coherent light along a projecting path to an opposing surface exterior to the body, wherein a power of the light source is lower than about 0.9 mW. The interferometer may also include a grating located in the body along the projecting path and configured to reflect a portion of the projected light, and at least three detectors located within the body and configured to measure first reflections of the coherent light from the grating and second reflections of the coherent light from the opposing surface. The interferometer may further include at least one processor configured to receive input from the at least three detectors, and determine relative motion between the interferometer and the opposing surface based on the first reflections and the second reflections, wherein a velocity of the determined relative motion ranges between 0.5 to 1000 mm/sec. In addition, the at least one processor may determine the relative motion in three dimensions.

In related embodiments, the area of illuminated opposing surface is larger than 3 mm$^2$ and the optical power of the light source may be lower than about 0.8 mW, lower than about 0.7 mW, lower than about 0.6 mW, or lower than about 0.5 mW. Moreover, the values of the determined relative motion may be between about 0.5 to 250 mm/sec, between about 0.5 to 500 mm/sec, between about 1 to 250 mm/sec, between about 1 to 500 mm/sec, or between about 1 to 1000 mm/sec. Consistent with these embodiment, the at least one processor may apply a fast Fourier transform (FFT) algorithm to convert the input from the at least three detectors to a representation in the frequency domain, and use the representation for determining the relative motion with low latency. In addition, the at least one processor may determine the relative motion with a measurement latency under about 15 mSec, under about 10 mSec, under about 7.5 mSec, or under about 5 mSec.

Consistent with yet another disclosed embodiment, another interferometer is provided. The interferometer may include a body, a light source located within the body and configured to project a coherent light to an opposing surface, and a plurality of light detectors located within the body and configured to convert reflections of the coherent light into photocurrents. The interferometer may also include at least one analog-to-digital converter for generating from the photocurrents a data stream including information regarding a movement of the apparatus in at least two non-collinear directions, and at least one processor. The at least one processor may be configured to identify a common range of frequencies of interest in the data stream, and remove from the data stream information associated with frequencies out of the common range to generate a reduced-size data stream. The at least one processor may also be configured to determine relative motion between the body and the opposing surface from the reduced-size data stream.

In related embodiments, the at least one processor may determine the relative motion substantially concurrently with respect to the relative motion. The term substantially concurrently may include a delay smaller than about 0.1 sec, a delay smaller than about 0.05 sec, a delay smaller than about 0.02 sec, or a delay smaller than about 0.01 sec.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices; for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A stylus for generating writing input, the stylus comprising: an elongated body having a distal end; an interferometer including: a light source configured to project a coherent light along a projecting path to an opposing surface; an optical aperture located in the projecting path through which the coherent light is configured to pass; a lens located in the projecting path and configured to direct the coherent light toward the opposing surface; a grating located in the projecting path and configured to reflect at least three non-collinear beams; an optical wedge located in the projecting path, the optical wedge being angled to suppress reflections of the coherent light from impinging on the light source; and a plurality of light detectors arranged in a coplanar arrangement peripheral to the light source and being configured to coherently detect reflections from the opposing surface and reflections from the grating: and at least one processor configured to receive input from the interferometer and to determine motion of the distal end based on the detected reflections.

2. An interferometer, comprising: a light source configured to project a coherent light along a projecting path to an opposing surface: an optical aperture located in the projecting path through which the coherent light is configured to pass; a lens located in the projecting path and configured to direct the coherent light toward the opposing surface; a grating located in the projecting path and configured to reflect at least three non-collinear beams; and an optical wedge located in the projecting path, the optical wedge being angled to suppress reflections of the coherent light from impinging on the light source: and a plurality of light detectors arranged in a coplanar arrangement peripheral to the light source and being configured to coherently detect reflections from the opposing surface and reflections from the grating.

3. The interferometer of claim 2, wherein the light source is configured to project a coherent light having a wavelength between 650 nm and 1000 nm.

4. The interferometer of claim 2, wherein the optical aperture is located between the light source and the lens and has an opening size of between 2.8 mm and 8 mm.

5. The interferometer of claim 2, wherein the lens is located between the optical aperture and the grating, and the lens is configured to collimate coherent light projected from the light source.

6. The interferometer of claim 2, wherein the lens is located between the optical aperture and the grating, and the lens is configured to focus light reflected from the grating and from the opposing surface.

7. The interferometer of claim 2, wherein the grating is located between the lens and the optical wedge, the grating includes a two-level pattern, and a distance between the two levels is smaller than a wavelength of the light projected by the light source.

8. The interferometer of claim 2, wherein the optical wedge has an angle of between 7.degree. and 15.degree.

9. The interferometer of claim 2, wherein the optical wedge is further configured to suppress reflections of the coherent light from impinging on the plurality of light detectors.

10. The interferometer of claim 2, further comprising a beam splitter configured to split reflections of the coherent light and to direct a plurality of separated beams towards the plurality of light detectors.

11. The interferometer of claim 10, further comprising a circular polarizer located between the grating and the optical wedge, and the beam splitter is a polarization beam splitter.

12. The interferometer of claim 10, wherein the beam splitter is configured to split each of the at least three non-collinear beams reflected from the grating to two spatially separated beams, and to direct at least six separated beams towards at least six light detectors.

13. The interferometer of claim 2, wherein the plurality of light detectors and the light source are mounted on a common substrate.

14. The interferometer of claim 2, wherein the plurality of light detectors includes four pairs of light detectors arranged in a rectangle and the light source is located in a center of the rectangle.

15. The interferometer of claim 2, wherein the plurality of light detectors includes a plurality of pairs of light detectors, each pair having an inner detector and outer detector, each inner light detector having a width and each inner light detector in a pair being spaced from an adjacent inner light detector from another pair by a distance, and a ratio between the width and the distance is greater than 0.2.

16. The interferometer of claim 15, wherein the ratio enables the plurality of pairs of light detectors to measure at least three non-collinear reflections of the coherent light.

17. The interferometer of claim 15, wherein the width is a diameter of a light detector having a round shape and the distance is a distance between centers of a pair of light detectors.

18. The interferometer of claim 15, wherein a ratio between the width and the distance is less than 0.7.

19. An interferometer, comprising: a light source configured to project a coherent light along a projecting path to an opposing surface; an optical aperture located in the projecting path through which the coherent light is configured to pass; a lens located in the projecting path and configured to direct the coherent light toward the opposing surface; a grating located in the projecting path and configured to reflect at least three non-collinear beams; and a beam splitter configured to split the at least three non-collinear beams and to direct at least six separated beams towards at least six light detectors; wherein the at least six light detectors are arranged in a coplanar arrangement peripheral to the light source and are configured to coherently detect the at least six separated beams transferred via the beam splitter.

20. The interferometer of claim 19, wherein the plurality of light detectors includes four pairs of light detectors arranged in a rectangle and the light source is located in a position at the center of the rectangle.

* * * * *